INVENTORS
WILLIAM R. AYRES
& JOEL N. SMITH
BY Morris A. Rabkin
ATTORNEY

INFORMATION HANDLING SYSTEM

Filed July 1, 1954

10 Sheets-Sheet 2

INVENTORS
WILLIAM R. AYRES &
JOEL N. SMITH

BY Morris L. Rabkin

ATTORNEY

INVENTORS
WILLIAM R. AYRES
& JOEL N. SMITH
BY Morris Rabkin
ATTORNEY

Nov. 22, 1960 W. R. AYRES ET AL 2,961,643

INFORMATION HANDLING SYSTEM

Filed July 1, 1954 10 Sheets-Sheet 4

INVENTORS
WILLIAM R. AYRES
JOEL N. SMITH
BY Morris L. Rabkin
ATTORNEY

INVENTORS
WILLIAM R. AYRES
& JOEL N. SMITH
BY Morris [signature]
ATTORNEY

Nov. 22, 1960 W. R. AYRES ET AL 2,961,643

INFORMATION HANDLING SYSTEM

Filed July 1, 1954 10 Sheets-Sheet 6

INVENTORS
WILLIAM R. AYRES &
JOEL N. SMITH
BY Morris B. Rakin
ATTORNEY

Nov. 22, 1960 W. R. AYRES ET AL 2,961,643

INFORMATION HANDLING SYSTEM

Filed July 1, 1954 10 Sheets-Sheet 7

INVENTORS
WILLIAM R. AYRES
& JOEL N. SMITH

BY Morris A. Rahan

ATTORNEY

INVENTORS
WILLIAM R. AYRES &
JOEL N. SMITH
BY Morris A. Rabkin
ATTORNEY

INVENTORS
WILLIAM R. AYRES &
JOEL N. SMITH
BY Morris Rahn
ATTORNEY

Nov. 22, 1960 W. R. AYRES ET AL 2,961,643

INFORMATION HANDLING SYSTEM

Filed July 1, 1954 10 Sheets-Sheet 10

INVENTORS
William R. Ayres &
BY Joel N. Smith
Morris A. Rabkin
ATTORNEY 2,961,643
Patented Nov. 22, 1960

2,961,643

INFORMATION HANDLING SYSTEM

William R. Ayres, Wichita, Kans., and Joel N. Smith, Westmont, N.J., assignors to Radio Corporation of America, a corporation of Delaware Filed July 1, 1954, Ser. No. 440,646

37 Claims. (Cl. 340—174)

This invention relates to an information handing system and particularly to a system for rearranging information encoded on magnetic tape. The present invention also relates to other aspects of an information handling system including integral testing and error correcting.

Large business and governmental organizations receive large masses of new information daily. In order to handle and analyze this new information, automatic accounting and inventory systems have been employed. Many present-day automatic accounting and inventory systems are using complex electronic machines of the digital type for handling and analysis chiefly because of their high speed, accuracy, and precision.

It has often been found convenient to store the incoming information on magnetic or paper tape because a large quantity of information can be stored on a small bulk of tape. The usual method of encoding the information on the tape is to record the information in the form of a binary digital code, although other codes such as the pure binary and the cylical binary also have been employed.

One of the recurring problems in handling information encoded on tape arises from the fact that the information stored on the tape is not immediately available when it is desired. Most efficient operation of the automatic accounting and inventory systems is attained when the information is organized into some predetermined logical order such that a particular unit of information is available at the desired instant.

Thus, sorting and collating machines have been designed to organize the incoming information into a predetermined order or sequence. Efficient operation also requires that provision be made to extract one or more units of information from among those stored on the tape. Further, it is often desirable to merge onto a single output tape all of the units of information which have been placed in order on two input tapes.

DEFINITION OF UNITS OF ENCODED INFORMATION

In the present embodiment of the invention, the incoming information is encoded on the magnetic tape as described below:

*Bit.*—A bit is a single binary digit having the value of either 1 or 0. The so-called non-return-to-zero method of recording may be employed. Thus, a binary 1 is represented by a magnetized spot on the tape and a binary 0 is represented by the absence of a magnetized spot.

*Character.*—A character is made up of a permutation of 7 bits in parallel across the tape. Six bits of each character are information bits and the seventh is an odd-even check or parity bit. A permutation of six bits is sufficient to represent all the required symbols since six bits provide for 63 binary numbers exclusive of zero. The binary numbers representing the letters of the alphabet are normally kept in sequence in the binary system of notation. The binary numbers assigned to represent the decimal digits zero to nine are larger in binary notation than are the binary numbers assigned to the letters of the alphabet. The six-bit combination also provides for the representation of special symbols which are used for tape-monitoring purposes.

*Item.*—An item is composed of a group of one or more characters having some particular significance, such as a decimal number, an alphabetical name, a street address, or a stock number composed of mixed letters and numbers, etc.

*Message.*—A message consists of one or more items which are to be processed as a unit. A message is the basic unit of information which is written on the tape, or transferred from one tape to another. Consecutive messages on the magnetic tape are separated by a blank space to allow time for the tape to be accelerated and decelerated during an operation. A special symbod, termed herein the "start message" symbol, is always the first character of a message, and a special symbol, termed herein the "end-message" symbol, is always the last character of a message.

*Document.*—A document consists of one or more messages which are to be taken as an entity. After the messages have been combined into a document, all of the messages in a document are handled as a unit. If a document is broken up for any reason, it ceases to be a document and the messages are handled individually.

ARRANGEMENT OF THE UNITS OF INFORMATION

Arrangement of the bits to form characters: The seven bits of each character are recorded side-by-side across the tape in seven parallel channels. All seven bits of an individual character are recorded on the tape simultaneously and are read from the tape simultaneously.

Arrangement of characters to form items: All characters are recorded on the tape and read from the tape serially such that the characters forming an item follow one another in sequence. In the present arrangement, the sequence is from the most significant to the least significant, both in entering on the tape and reading out of the tape.

Arrangement of items to form messages: The items of a message follow one another in sequence. A special symbol, termed herein an item-separator symbol, serves to separate the last character of an item from the first character of the succeeding item. Each item-separator symbol is associated with the item immediately following it. In addition, each item of a message is assigned a specific location with respect to the start of the message. For a given type of message, these locations will be the same in each message. Thus, if the item-separator symbols are counted, starting with the first one following the start message symbol, each item can be identified by the count of its item-separator symbol. If any particular item of information should be missing from a message, its item-separator symbol is nevertheless recorded on the tape in its proper location, unless all of the items that follow it are also missing. In this case, the end-message symbol can be written in the location that would be occupied by the item-separator symbol of the first of the series of consecutive missing items. By writing the end-message symbol immediately, the necessity of writing a number of consecutive item-separator symbols at the end of the message is eliminated. This is the only condition under which the item-separator symbol of a missing item is omitted.

A "header-message" is a special message containing some information that applies to all messages of a document. This is usually fixed information, such as an address, upon which no computation is performed. The header-message is composed of items and characters. The first character of the header-message is the start message symbol. Following the start message symbol is a special symbol, herein termed a document symbol, and following after the start document symbol is the first item-separator symbol of the first item of the header-message. The last character of the header-message is the end-message symbol.

In the present system, the message-identifying characters are located within the first 64 character spaces including the start message symbol as a character space. This character space is termed herein the "sorting zone." Thus, the total maximum number of characters required by the items containing the identifying information, including the special symbols, does not exceed 64 characters.

Arrangement of messages to form documents: The messages of a document follow one another in a predetermined sequence. The first message of each document is a header-message. The start of each document is identified by the presence of the document symbol in the header-message. A document can be broken into individual messages by disregarding the header-message.

Arrangement of the messages and documents on the magnetic tape: The individual messages are recorded on the tape, with the same spacing between messages, regardless of whether the message is to be handled as an entity by itself or as a part of a document. The intermessage spacing is described more specifically in the detailed description of the system.

The incoming information is arranged on the magnetic tape as described above; however, the messages themselves may be in random order on the tape. Even if the messages were arranged in a sequence, it may be necessary or desirable to rearrange them in some other logical order, as may be required, for further handling of the messages.

Therefore, it is desirable to have an information handling system capable of performing certain basic operations upon the recorded messages. The first operation is that of sorting the messages into a predetermined sequence. One of the methods used to sort messages into a desired sequence is known as the strings-of-two method. The strings-of-two method of sorting is disclosed in an application Ser. No. 427,167 entitled "Sorting Apparatus," filed by Howard P. Guerber on May 3, 1954.

In the strings-of-two method, the incoming messages are evenly divided between two input tapes. A dummy message may be employed if the division is not exactly even. One message is selected from each of the input tapes and compared one with the other. The two selected messages are then recorded in sequence on one of two output tapes. The next message of each input tape is then selected and the two messages compared one with the other. These two messages are then recorded in sequence on the second of the output tapes. This procedure is followed until all of the messages recorded on the two input tapes have been recorded in sequential groups of two on the output tapes. Odd groups are recorded on the first of the output tapes and even groups are recorded on the second of the output tapes. A complete re-recording of the messages from the input tapes is termed a "pass." On the second pass, the output tapes become the new input tapes. During the second pass, the groups of two messages are rearranged in sequential groups of four on two different output tapes. Again, odd groups are recorded on the first of the output tapes and even groups are recorded on the second of the output tapes. The re-recording of the messages continues during a number of passes until all of the original messages have been rearranged into one sequential group. The number of messages transferred from each input tape to a single output tape, herein termed a "string," increases as a power of two with each pass.

Another of the basic operations which is desirable in an information handling system is "merging." In the merging operation, two tapes, upon which messages have been arranged in order, are merged into a single tape upon which the messages contained on the original tapes are rearranged in a predetermined order. The merge operation is based on some particular piece of information contained in each message. Only one pass is required for a merge operation.

A third basic operation which is desirable in an information handling system is the extraction of all messages of a particular class. This type of extraction is termed herein "extract by class." In this operation, messages may be extracted from a single tape containing messages in random order. A certain piece of information, called the class-item, is given in advance. Three types of classes of messages may be extracted:

(*a*) Those messages in which a certain piece of information is less than the class-item;

(*b*) Messages containing a certain piece of information that is equal to the class item;

(*c*) Messages containing a certain piece of information that is greater than the class-item.

A fourth basic operation which is desirable in an information handling system is the extraction of all messages based on the identifying information contained in a list of messages. This type of extraction is termed herein "extract by list." The messages from one serially-ordered tape are extracted, based on the identifying information contained in a serially ordered list of messages on a second tape. Each message on the first tape, which contains a given piece of information that is equal to the identifying information in any one of the list of messages on the second tape, is transferred to a first output tape. All other messages from the first input tape are transferred to a second output tape. None of the list of messages on the second input tape is transferred to either output tape.

Further, it is desirable to have an information handling system that is capable of performing the four basic operations upon either messages or documents.

Therefore, it is an object of the present invention to provide an improved information handling system for sorting units of information encoded on an input tape into a predetermined sequence on an output tape.

Another object of the present invention is to provide an improved information handling system for merging ordered units of information encoded on two input tapes into a single ordered sequence on an output tape.

Still another object of the present invention is to provide a novel information handling system for rearranging the units of information encoded on an input tape in accordance with an item of information which is used as a standard.

Yet another object of the present invention is to provide a novel information handling system for rearranging units of information encoded on an input tape in accordance with a list of units encoded on a different input tape.

It is a further object of the present invention to provide a novel information handling system for rearranging units of information encoded on input tapes, wherein the basis for the rearrangement is one or more characters located within a specified sorting zone.

An additional object of the present invention is to provide an improved information handling system wherein the movement of the input and output tapes is monitored by special symbols correlated with the four basic operations of sorting, merging, extracting by list, and extracting by class.

A still further object of the present invention is to provide an improved information handling system wherein the decision to start the tapes is routed through a testing unit which is integral with the information handling system.

Another object of the present invention is to provide an improved information handling system for selectively rearranging units of information in which the information is parity-checked by one or more parity checkers, wherein apparatus is provided to automatically cause an operation to be repeated upon the detection of an error by a parity checker.

A further object of the present invention is to provide an improved information handling system in which one or more parity checkers are used in conjunction with apparatus which automatically causes a repeated operation upon the detection of a first parity error and stops operation upon the detection of another parity error by the same parity checker.

A still further object of the present invention is to provide a novel information handling system for performing the four basic operations of sorting, merging, extracting by list, and extracting by class, wherein the spacing between any two messages is maintained within a specific distance along the tape.

These and further objects are carried out by providing a pair of input tapes upon which the information to be rearranged is recorded, a pair of output tapes for receiving the transferred information and electrical circuitry connecting the input and output tapes. A data selector may be provided for each input tape for selecting the sorting criteria which is the basis for rearranging the information. A pair of memory units are connected individually to each of the selecting units. The memory units serve to store the sorting criteria respectively selected from each of the input tapes. A comparator unit is connected to the memory units and compares the sorting criteria to determine their relative order of precedence.

A logical control unit is connected to the outputs of the comparing unit. Tape-monitoring signals are supplied to the logical control unit by code-recognition gates in order to aid it in deciding which of the input tapes is to run and which of the output tapes is to run. The decision of the logical control unit is based on the relative order of precedence of the sorting criteria and the tape-monitoring signals.

The foregoing and other objects, advantages and novel features of the invention will be more fully apparent from the following detailed description when read in connection with the accompanying drawing in which like refrence characters refer to the same parts and wherein:

Fig. 1 is a symbolical illustration of the spacing between the alpha and beta reading heads and the intermessage spacing;

Fig. 2 diagrammatically illustrates the general arrangement of the complete information handling system;

DETAILED DESCRIPTION

Figure 1:
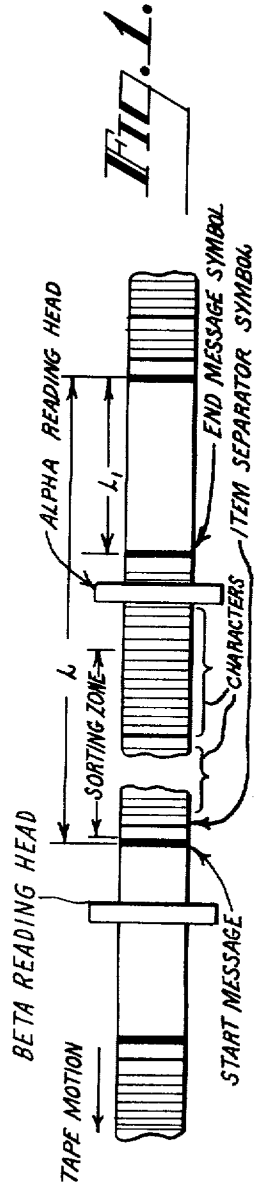

Fig. 1 shows the arrangement of the messages on the tapes. Two distances are important with respect to the arrangement of the messages on the tapes: (1) the distance between the start of one message and the start of the next as shown by the distance L, and (2) the distance between the end of one message and the start of the next as shown by distance $L_1$. The direction of the tape motion is shown by the arrow at the left. Insofar as the transfer of information is concerned, the unit of information is the message. In the situation where the rearranging of the information is carried out by documents, the header message is the basis upon which the transfer of the document is determined.

The messages are read to the output tapes by the beta reading head. The alpha reading head is used to read the sorting criteria to the internal system. The blank portion of the tape between the end of one message and the start of the next, as shown in Fig. 1, is termed herein "intermessage spacing" which is maintained equal to, or greater than, the distance $L_1$ as explained below.

The beta reading head is always in a condition to read out any portion of a message passing beneath it to an output tape. Therefore, it is necessary to insure that a portion of a message does not come beneath the beta reading head until a decision has been reached that the entire message is to be read out. Otherwise, the unit of information would be broken up and the information would be scrambled rather than rearranged.

During operation, the tape advance is not stopped until the alpha reading head has detected and read into the system the sorting criteria of the $(n+1)$th message which follows the $n$th message read out by the beta reading head. Therefore, in the ideal case, the distance L must be no less than the spacing between the beta and alpha reading heads. Actually, this minimum distance must be greater because of the tolerance of the start and stop times of the tape-drive mechanism. Thus, the minimum distance L is equal to the length of the sorting zone, plus the distance it takes to stop the tape movement, plus the distance it takes before the tape is brought up to a suitable recording speed by the tape-drive mechanism. The distance $L_1$ must be no less than a minimum distance also. The minimum distance $L_1$ is necessary because the tape advance cannot be stopped or started instantly. Thus, if the distance $L_1$ were too small, a portion of the message following the one last read-out by the beta reading head would coast beneath the beta reading head. The beta reading head would then read out this portion even though correct operation required that this portion be retained on the input tape until some later time. In actual practice, a small portion of tape in excess of the minimum distance $L_1$ is left blank in order to avoid working too closely to the minimum distance. Any intermessage spacing in excess of the distance $L_1$, plus the small added portion, is termed herein "dead space."

In order to insure that the minimum distances are maintained, the output tape to which a message is transferred is not stopped until a short interval after the end message symbol has been detected by the beta reading head of the input tape. Then, in order to prevent overspacing of the messages, the intermessage spacing of the messages encoded on the input tapes is monitored by a "dead space detector" which is associated with the "logical control unit" described more fully hereinafter.

Figure 2:
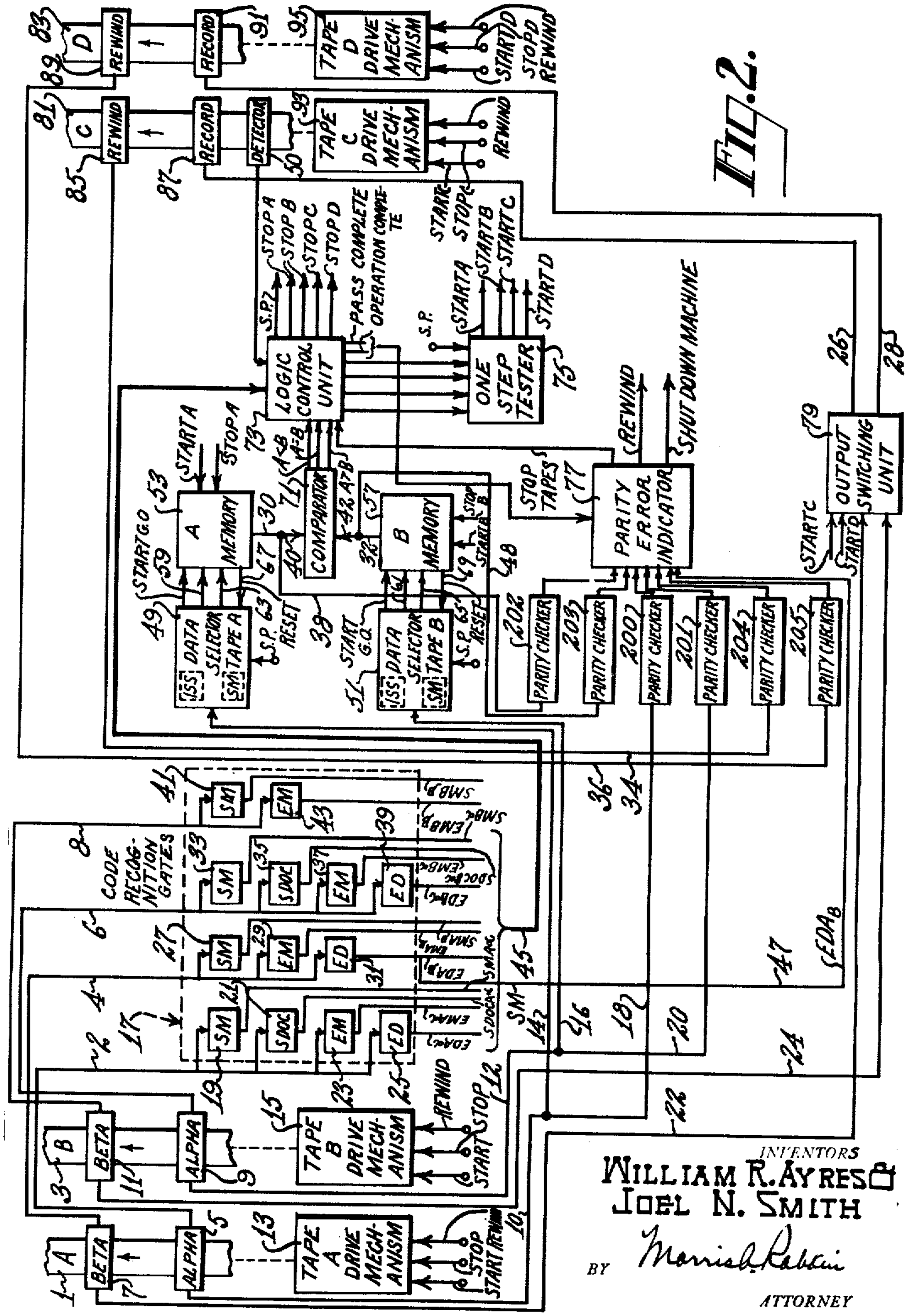

Fig. 2 shows the general arrangement of the information handling system of the present invention.

Two input tapes 1 and 3 are provided. The input tape 1, designated as input tape A, has an alpha reading head 5 and a beta reading head 7 associated therewith. The input tape 3, designated as input tape B, has an alpha reading head 9 and a beta reading head 11 associated therewith. The units of information are encoded on input tapes A and B as described in connection with Fig. 1. Each of the reading heads has seven channels for detecting the seven bits of a character. Input tape A is driven by a tape drive mechanism 13, and input tape B is driven by a tape-drive mechanism 15. Each of the tape-drive mechanisms is provided with a start, a stop, and a rewind input. When a signal is received at the start input of a tape-drive mechanism, the tape-drive mechanism advances the corresponding tape in the direction of the arrow shown on the tape. A suitable tape-drive mechanism is described in the copending application Serial Number 248,765, filed by Joseph M. Uritis on September 28, 1951, entitled "Valve Actuating Mechanism," now Patent No. 2,750,961, issued June 19, 1956.

The manner of connecting the tape-drive mechanism will be apparent to those skilled in the art.

The seven channels of the alpha reading head 5 are connected via a cable 2 to the four-code recognition gates shown in the first column of the dotted block 17.

A code-recognition gate is a special gate which can be preset to respond to one, and only one, particular combination of bits. A suitable code-recognition gate is disclosed in Patent Nnmber 2,648,829 entitled "Code Recognition System," issued to William R. Ayres and Joel N. Smith, August 11, 1953.

The SM code-recognition gate 19 is responsive to the combination of bits representing the start message symbol and furnishes an output signal which is denoted as the SMA$\alpha$ signal.

The SDOC code-recognition gate 21 is responsive to the combination of bits representing the document symbol and furnishes an output signal which is denoted as the SDOCA$\alpha$ signal.

The EM code-recognition gate 23 is responsive to the combination of bits representing the end message symbol and its output signal is denoted as the EMA$\alpha$ signal.

The ED code-recognition gate 25 is responsive to the combination of bits representing the end data symbol and its output signal is denoted as the EDA$\alpha$ signal.

The seven channels of the beta reading head 5 of input tape A are connected via a cable 4 to the inputs of the second column of code-recognition gates 27, 29, and 31 of the dotted block 17.

The latter three code-recognition gates 27, 29, and 31 furnish the SMA$\beta$, the EMA$\beta$, and the EDA$\beta$ signals respectively.

The seven channels of the alpha reading head 9 of input tape B are connected via a cable 6 to the third column of code recognition gates of the dotted block 17.

The code-recognition gates 33, 35, 37, and 39 respectively furnish the SMB$\alpha$, the SDOCB$\alpha$, the EMB$\alpha$, and the EDB$\alpha$, output signals.

The seven channels of the beta reading head 11 of input tape B are connected via cable 8 to the fourth column of code-recognition gates of the dotted block 17.

The code-recognition gates 41 and 43 respectively furnish the SMB$\beta$ and the EMB$\beta$ output signals.

The output signals of the code-recognition gates of the dotted block 17 are applied to the inputs of a logical control unit 73 via a trunk line 45.

The significance of the output signals of the code recognition gates is discussed in detail hereinafter.

The seven channels of the alpha reading head 5 of input tape A are also connected via cables 10, 14, to the input of a data selector 49. Likewise, the seven channels of the alpha reading head 9 of input tape B are connected via cables 12, 16 to the inputs of a similar data selector 51.

A suitable data selector unit is described in detail in application, Serial Number 418,679, filed March 25, 1954, by Joel N. Smith, entitled "Information Selecting Circuit," now Patent No. 2,854,692.

The code-recognition gates responsive to the combination of bits, representing the start message symbol and the item separator symbol, are shown as dotted blocks in the data selectors 49 and 51.

As has been previously pointed out, the sorting zone of each unit of information contains 64 character spaces. Out of these 64 character spaces, any number up to 32 consecutive characters may be selected as the basis for rearranging the input messages or documents. The number of characters selected is termed the sorting criterion. The storage capacity of the internal memory determines the maximum number of characters which can constitute the sorting criterion. It is apparent that the sorting criterion may be enlarged or reduced by increasing or decreasing the storage requirements of the memory by a corresponding number of characters.

The function of the data selectors 49 and 51 is to exclude all characters other than those of the sorting criterion from reaching the internal memory. Each data selector is made up of counters, logical "and" and "or" gates, code-recognition devices and related electronic units.

Because the items of each message have been arranged in order, it is possible, by counting the item separator symbols preceding each item, to select the same item from every message of any given tape. Even in the situation where no characters are associated with an item, the item separator symbol is still present. Thus, it is possible to select a number of characters within an item by inhibiting the count of the characters until the proper item separator symbol has appeared.

A two-position switch (not shown) is also provided in the data selector so that the sorting criterion may be selected on the basis of items alone or on the basis of characters within a particular selected item.

The start pass signal S. P. applied to the data selector serves to reset the counters and gates within each data selector.

The sorting criterion selected from the A tape is passed by data selector 49 to the A memory 53 via cable 63, and the sorting criterion selected from the B tape is passed by data selector B to the B memory 57 via cable 65.

Suitable memories may be stepping registers of the magnetic-core type, as described in an article by An Wang, entitled "Magnetic Delay-Line Storage," published at pp. 401–407 of the April 1951 issue of the "Proceedings of the I.R.E."

The memory unit may be of the form disclosed in detail in an application by William R. Ayres and Joel N. Smith entitled "Serial Memory" and filed concurrently herewith.

In the present embodiment the sorting criteria may be any number of characters up to thirty-two; thus, there are thirty-two stages provided in both the memory units 53 and 57.

Only one input tape is running at any one time. Therefore, the sorting criterion stored in the one memory is recirculated as described in the aforementioned application. This recirculation insures that the sorting criteria pass to the A and B inputs of the comparator 71 in synchronism. A gated oscillator (not shown) is a part of each memory unit. This gated oscillator is used because of the nature of the stepping register. Thirty-two pulses are required to step a character from the first stage of the stepping register to the output stage. Each advance pulse is generated upon the receipt of a character of a sorting criterion at the input of the memory unit. However, the sorting criterion may consist of less than thirty-two characters. Therefore, the advancing pulses are generated artificially in case there are less than thirty-two characters. Each data selector is set-up to count the characters of the sorting criterion. If the count is less than thirty-two, a start signal is sent by a data selector 49 or 51 to the gated oscillator of the corresponding memory unit via a start gated oscillator (start G.O.) lead. The gated oscillator then generates advance pulses which are applied to the stepping register of the A and B memory units. The gated oscillator pulses are also fed back via a reset lead 67 or 69 to reset the data selector associated therewith. The pulses from the gated oscillator are added to the count already present in the character counter of the data selector; and when the sum total reaches thirty-two, a stop pulse is sent to the gated oscillator via stop G.O lead 59 or 61.

The output of the A memory 53 is applied via cables 30 and 40 to the input of a comparator 71. Likewise, the output of the B memory unit 57 is applied via cables 32 and 42 to the input of comparator 71.

The comparator unit 71 may be of the type described in application Serial Number 394,693, entitled "Message Comparator," filed November 27, 1953, by William R. Ayres and Joel Newton Smith. The comparator determines the relative order of precedence between the A and B sorting criteria. Alternatively, the comparator unit 71 may be arranged similarly to the comparator system described in Patent No. 2,785,856, issued March 19, 1957, on an application filed by Linder C. Hobbs on August 26, 1953, Serial No. 376,714, entitled "Comparator System for Two Variable Length Items." The comparator 18, described in the aforesaid Hobbs patent, corresponds to that described in copending application filed by William R. Ayres on November 20, 1952, Serial No. 321,697, entitled "Comparing System," now Patent No. 2,844,309. Because the code used to store the information on the input tapes is an alpha-numeric code, a switch (not shown) is provided for justifying right or justifying left. This justify switch corresponds to the switches 10 and 36 of aforesaid Hobbs Patent No. 2,785,856. When the switch is in the justify right position, the comparator 71 does not furnish an output signal until the end of one or the other, or both, sorting criteria have been reached. Thus, the justify right position allows for the comparison of multi-digit numbers. When the switch is in the justify left position, the comparator 71 furnishes an output upon the first occurrence of an inequality in the sorting criteria. Thus, the justify left position allows for the comparison of alphabetical words.

The comparator 71 furnishes three output signals to the logical control unit 73. These signals are representative of the relative order of the sorting criteria, and are supplied via the $A<B$, $A=B$ or $A>B$ leads.

Two output tapes 81 and 83 are provided for receiving the units of information transferred from the input tapes A and B. Output tape 81 is designated as output tape C, and output tape 83 is designated as output tape D.

The tape-drive mechanism 93 is associated with output tape C and the tape-drive mechanism 95 associated with output tape D are similar to the tape-drive mechanisms 13 and 15. The output tapes C and D are advanced in the direction of the arrow shown thereon when a start signal is received by the corresponding tape drive mechanism 93 or 95.

A seven-channel recording head 87 is used for recording the information on output tape C, and a seven-channel recording head 91 is used for recording the information on output tape D.

Output tape C has a reading head 85 which is used for reading the seven bits of each character when output tape C is being rewound. Reading head 89 serves the same function for the characters recorded on output tape D as reading head 87.

The physical end of output tape C is also monitored by a suitable detector. This may be done by punching holes near the end of the tape and detecting the passage of the holes by a suitable photo-electric device shown as a "detector" 50. Such photo-electric devices are well-known in the art, are available on the market, and need not be further described herein. The output signal of the photoelectric device, representing the physical end of tape C, is applied as an input of the logical control unit 73.

The start C and start D output signals of the logical control unit 73 are applied to an output switching unit 79 which regulates which of the output tapes receives the units of information transferred from the A and B input tapes. The characters detected by the beta head of the running tape are passed through the switching unit 79 to either output tape C or output tape D.

The output switching unit may include two different sets of "and" gates with seven different "and" gates constituting a set. Each of the "and" gates of a set is provided with two inputs and one output lead. Each of seven channels of the beta reading head 7 of input tape A is individually connected via cable 22 directly to one of the inputs of each of the sets. Likewise, the seven channels of the beta reading head 11 of input tape B are individually connected via cable 24 directly to the same input as was used for the beta reading head 7 of input tape A. The second input of the first set of seven "and" gates is primed by the start tape C signal, and the second input of the second set of seven "and" gates is primed by the start tape D signal. The seven outputs of the first set of "and" gates are individually connected via cable 26 to the seven channels of the recording head 87 of output tape C. Likewise, the seven outputs of the second set of seven "and" gates are individually connected via cable 28 to the seven channels of the recording head 91 of output tape D.

Thus, the signals detected by the beta reading head of the input tape, which is running, are passed either to output tape C or output tape D in accordance with output signals from the logical control unit 73. An output switching unit similar to the unit of the present invention is disclosed in the aforementioned application, Serial Number 427,167, filed by Howard P. Guerber.

The logical control unit 73 also supplies stop and start signals to the memory units 53 and 57, as shown by appropriate leads. These stop and start signals are used respectively to close and open the gates in the recirculating loops of the A and B memory units 53 and 57.

The information handled by the system of the present invention is checked at six different places in order to determine whether an information bit has been added to, or dropped from, any one character. The even-parity check is used, that is, every combination of bits defining a character is make to contain an even number of bits. If the original code combination of six bits happens to be an odd number, an extra bit called the "parity bit" is added to the combination before it is encoded on an initial tape. Parity checking is known in the electrical computer arts. One method of parity checking is to add the bits of the combination. If the sum is an odd number, an error is indicated; if the sum is an even number, it is assumed that the combination is correct and the operation is allowed to proceed.

In the present embodiment, parity is checked: (1) when the characters pass beneath the alpha reading heads 5 and 9 of the input tapes A and B; the seven channels of alpha reading head 5 are connected via cables 10 and 18 to the inputs of parity checker 200, and the seven channels of alpha reading head 9 are connected via cables 12 and 20 to the inputs of parity checker 201; (2) when the characters are furnished by the memories 53 and 57 to the comparator 71, the output of memory 53 is connected via cables 30 and 38 to the inputs of parity checker 202, and the output of memory 57 is connected via cables 32 and 48 to the inputs of parity checker 203, and (3) the rewind reading heads 85 and 89 of the output tapes C and D, the seven channels of reading head 58 are connected via cable 34 to the inputs of parity checker 204, and the seven channels of reading head 89 are connected via cable 36 to the inputs of parity checker 205. The output signal of each of the parity checkers 200–205 is connected via an individual conductor to an input of a parity-error indicator 77. A more detailed description of the parity indicator 77 is supplied hereinafter in connection with Fig. 4 and Fig. 6.

Figure 3:
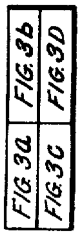
Fig. 3 shows the arrangement of the drawings of Figs. 3*a*, 3*b*, 3*c*, and 3*d* in order to attain the detailed drawing of the logical control unit which is shown in block form in Fig. 2.

The data selectors 49 and 51, the memory units 53 and 57, the code-recognition gates 17, the parity-checker circuits 200–205, the parity-error indicator 77, and the comparator 71 function in the same manner for each of the four basic operations. Control of the system operation is governed by the logical control unit 73 in accordance with the signals received at its inputs. The logical control unit 73 operation will now be described in detail by referring to Fig. 3. Fig. 3 is composed of Figs. 3*a*, 3*b*, 3*c*, and 3*d* assembled as shown. As shown in Figs. 3*a* to 3*d*, the logical control unit 73 is made up of a number of electronic components. Each of the components is designated by a functional name.

Among various circuits shown in Figs. 3*a* to 3*d*, there are flip-flop circuits (FF), "and" circuits, "or" circuits, and buffer circuits. The definitions for these circuits have been formulated by the Subcommittee on Definitions of Electronic Computer Terms, published in an article entitled "Standards on Electronic Computers: Definitions of Terms, 1950" in the March 1951 issue of the Proceedings of the I.R.E., pp. 270 to 277.

The A and B message counters are well-known in the art as predetermined counters. A predetermined counter is an electronic circuit which furnishes an output signal only after its input has been stimulated by a predetermined number of input signals. A suitable predetermined counter has been described by J. J. Wild in an article entitled "Predetermined Counters," published in volume 20, pp. 120–123 of the March 1947 issue of "Electronics."

D.C. "AND" GATE (GENERAL)

The D.C. (direct current) "and" gate is described in Fig. 4 of the copending application, Serial Number 419,226 of Joel N. Smith and William R. Ayres entitled "Message Spacing Control System," filed March 29, 1954, now Patent No. 2,907,002.

The D.C. "and" gate is a coincidence-type circuit which is responsive to a predetermined number of input signals.

A number of two-input and two-five-input D.C. "and" gate circuits are employed in the logical control unit. The purpose of the two-input and five-input D.C. "and" gates is to provide the logical "and" function with the added feature that the input signals need not occur simultaneously. Therefore, a D.C. "and" gate differs from the ordinary "and" gate in that the conventional "and" gate requires substantial coincidence of the input signals. Briefly, the two-input D.C. "and" gate is composed of a two-input Rossi-type coincident circuit. One of the inputs of the Rossi gate is controlled by a first flip-flop, and the second input is controlled by a second flip-flop. When either flip-flop is in its set stable state, the Rossi gate is primed. Thereafter, when the other flip-flop receives a set input signal, its output causes the Rossi gate to furnish an output signal. Likewise, when either of the flip-flops is in its reset stable state, no output signal is furnished by the Rossi gate when a set input signal is received by the other flip-flop. In the drawing (Figs. 3*a*, *b*, *c*, and *d*) the set input of each flip-flop is designated as S1 and S2 respectively and the corresponding reset input is designated R1 and R2 respectively. Subsequent to each operation of the Rossi gate of a D.C. "and" gate, the control flip-flops are reset.

In addition, the start-pass signal is also used as a reset signal for one of the control flip-flops of any two-input D.C. "and" gate. In some instances, a connection is shown coupling the output signal of the two-input D.C. "and" gate to one or more reset inputs of the same gate and, in the same instances, to the reset input of an additional gate. For example, with reference to gate G–12 of Fig. 3*b*, the output signal is shown coupled to the reset inputs R1 and R2. This self-reset is necessary because, during an operation, the gate must be reset after each actuation. The situation wherein two signals are applied to the same input is shown in the drawing by indicating the two inputs with the designation "or" therebetween. The presence of the "or" indicates that the input signals are passed through a buffer circuit.

Two five-input "and" gates G–27 and G–31 (Fig. 3*c*) are provided. Each five-input "and" gate consists of a five input Rossi-type coincidence circuit. Each of the inputs is controlled respectively by one of five different control flip-flops. Thus, when four of the flip-flops are in the set stable state and a signal is applied to the set input of the fifth flip-flop, an output signal is furnished by the Rossi gate. However, no output signal is furnished when one or more of the control flip-flops are in the reset stable state. The set input of each one of four control flip-flops of gates G–27 and G–31 is respectively connected to a stop tape lead. The reset input of each one of four of the control flip-flops of gates G–27 and G–31 is respectively connected to a start tape lead. Each set input of "and" gates G–27 and G–31 is designated with the letter "S," followed by a subscript, indicating the particular flip-flop controlled thereby. Thus, the set inputs of the control flip-flops connected to a stop tape lead are designated S2, S3, S4, and S5, respectively. Set input S1 indicates the control input of the fifth flip-flop of the "and" gates G–27 and G–31. The reset input of gates G–27 and G–31 is indicated by the letter R followed by the same subscript designating the corresponding set input. Thus, the reset inputs are designated R1 through R5, respectively.

D.C. "AND" GATE (DETAILED DESCRIPTION)

Figure 3A:
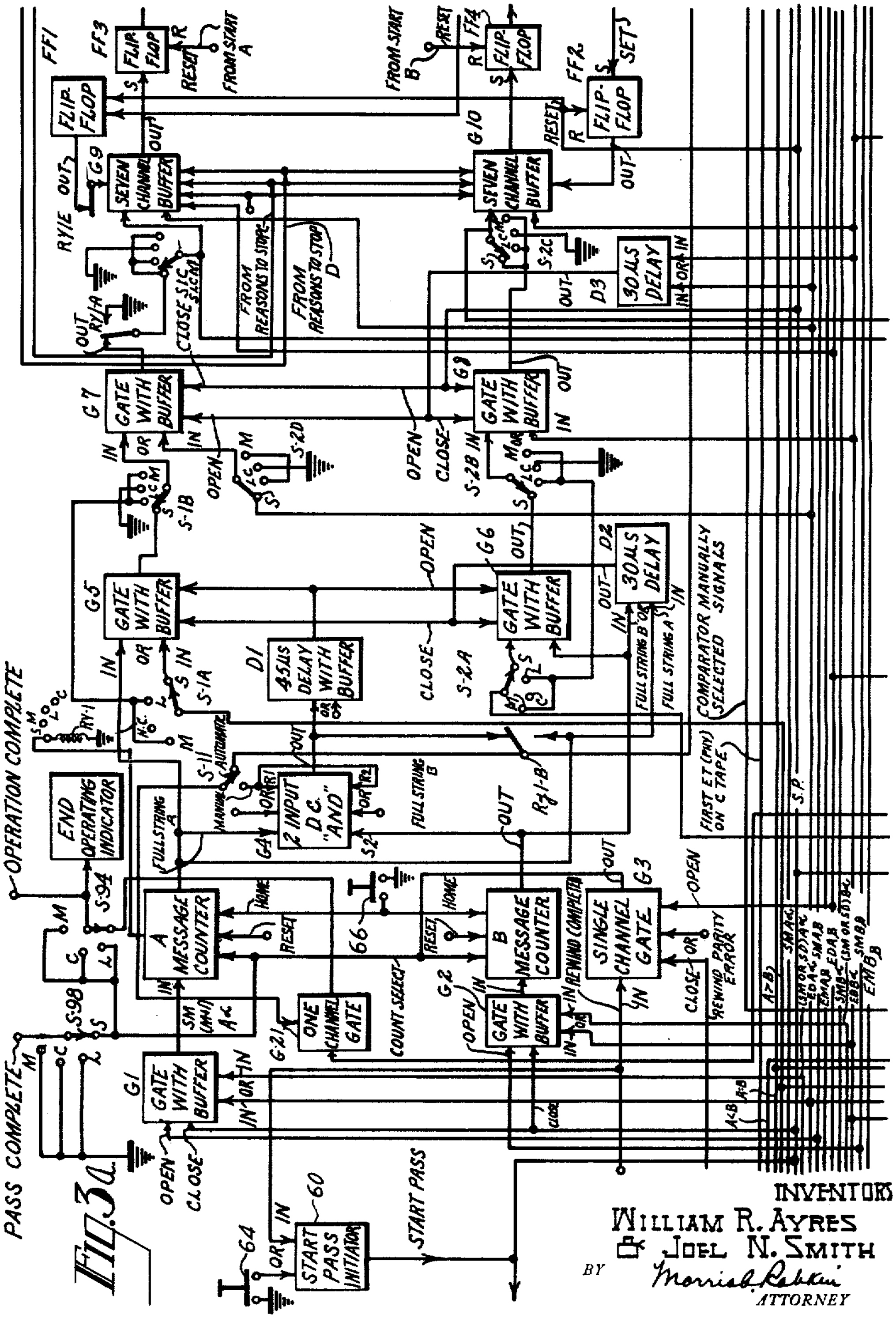
Figure 8:
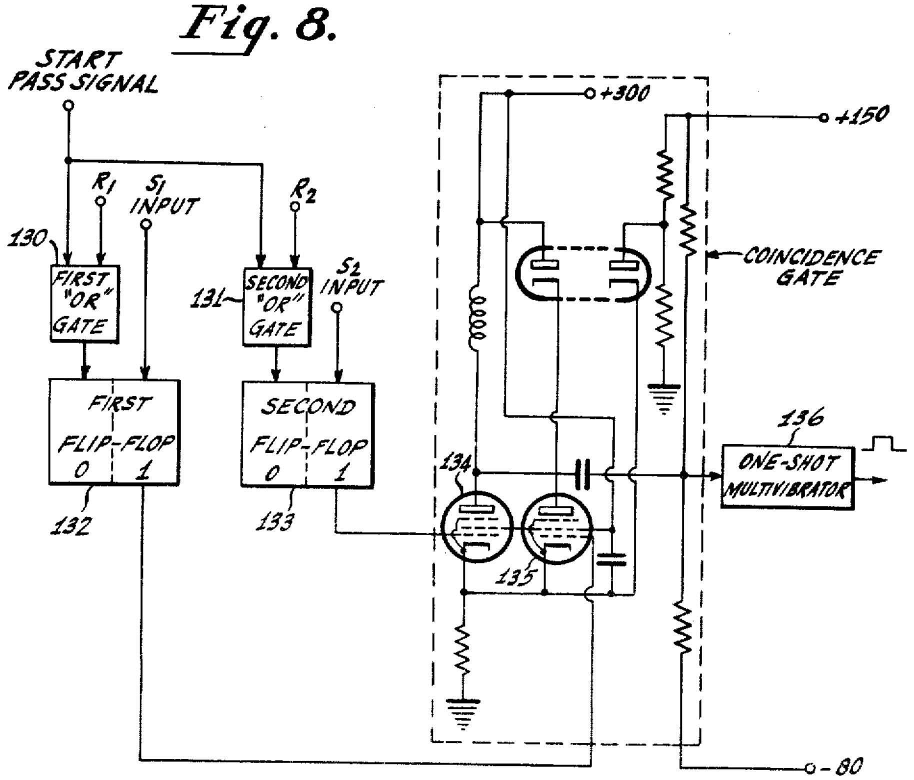
Fig. 8 is a schematic diagram of a D.C. "and" gate useful in the present invention.

One embodiment of a D.C. "and" gate, for example, the two-input "and" gate G–4 of Fig. 3*a*, is shown in Fig. 8. A start pass signal S.P. is coupled to one input of each of a pair of two-input "or" gates, 130 and 131 of the gate G–4. A second input of each of the "or" gates 130 and 131 is responsive to reset signals from different sources within the system. The output of the first "or" gate 130 is coupled to the reset section R1 of a first flip-flop 132, and the output of the second "or" gate 131 is coupled to the reset section R2 of a second flip-flop 133. Separate setting signals S1 and S2 are applied to the first and second flip-flops 132 and 133. The output terminals of the flip-flop used in Fig. 8 have been designated for illustrative purposes as "0" and "1" terminals. Systems which employ this designation often utilize the high level output at a terminal, so that in these systems a flip-flop is in a binary "1" condition when providing a high level output from the "1" terminal. Here, however, as will be apparent later, the flip-flop output which is employed as a signal in the successive coincidence gate is the low level output. Thus, a flip-flop 132 or 133 is said to be set when providing a low level potential at its "1" terminal. It follows that when reset, a flip-flop 132 or 133 provides a low level potential on its "0" terminal and the potential of the "1" terminal is not useful in actuating the coincidence gate.

The "1" outputs of the first and second flip-flops 132 and 133 are individually coupled respectively to the control grids of the first and second control pentodes 134, 135 within a Rossi type coincidence gate, shown enclosed by a dotted line. The anodes of the first and second pentodes 134 and 135 are connected together as are their screen grids. The suppressor grid of each pentode is connected to each respective cathode. The cathodes of both pentodes are connected together and through a common cathode resistor to a common conductor, here designated by the conventional ground. The commonly connected anodes of the pentodes are coupled through a parallel inductor and a diode to a +300 volt source and also through a coupling capacitor to the input of a one-shot multivibrator 136. The one-shot multivibrator is well known in the art. An output pulse of substantially rectangular waveshape is provided by the one-shot multivibrator in response to an input signal. The input to the one-shot multivibrator 136 is applied from the midpoint of a pair of resistors which constitute a voltage divider between a +150 volt source and a −80 volt source. The commonly connected cathodes of the two pentodes 134 and 135 are coupled through a capacitor to the commonly connected screen grids, and thence to the +300 volt source. The commonly connected cathodes are also connected to the cathode of a clamping diode, the anode of which is connected to the midpoint of a second voltage divider consisting of a pair of resistors coupled between the +150 volt source and ground. The output of the one-shot multivibrator 136 represents the output of this D.C. "and" gate circuit.

In operation, upon occurrence of the start pass signal (S.P.), the first and second flip-flops 132 and 133 provide high level potential "1" outputs. In this condition, the control grids of the pentodes are thus at high potentials and both the pentodes are conducting. With both pentodes conducting, their cathodes are held at a positive potential because of (1) the potential of the control grids, (2) the flow of current from the +150 volt source through the clamping diode, and (3) the common cathode resistor coupling the cathodes to ground. When a setting signal is applied to either one of the flip-flops 132 or 133, its "1" output is at relatively low potential, the pentode connected to this flip-flop is cut-off. However, the commonly connected cathodes of both pentodes experience little change in potential due to the continued conduction of the other pentode so that the current flow through the coupled anode inductor changes only slightly in value. Thus, no appreciable output is provided to trigger the one-shot multivibrator 136.

When both flip-flops 132 and 133 receive a set signal, both control pentodes 134 and 135 are cut-off. As a result, the current flowing in the pentodes drops rapidly, causing an induced sine wave (due to the "inductive kick" from the anode inductor) of voltage on the anodes of the control pentodes 134 and 135. The diode in parallel with the inductor damps out all but the first positive half cycle of the sine wave. The positive half cycle, however, provides a sharp voltage spike which triggers the one-shot multivibrator 136. The one-shot multivibrator 136 in turn provides an output of fixed duration and amplitude having a substantially rectangular waveform.

Note that the number of control flip-flops and control pentodes may be increased, since each is essentially in parallel with and independent of the others. For example, in a 5-input D.C. "and" gate, three additional flip-flops, not shown, are employed in conjunction with three additional control pentodes, not shown. The additional control pentodes have their anodes, screen grids, and cathodes each connected to the like elements of the other pentodes. The control grids of the five pentodes then are coupled respectively to the "1" terminals of the five flip-flops. The Rossi coincidence gate, then, provides an output when and only when all five flip-flops are in the set state. The output of the one-shot multivibrator 136 also may be fed back through an additional input of one or more of the "or" gates as a reset signal for one or more of the flip-flops.

The "single channel gate" combination consists of a two-input coincident circuit having one of its inputs controlled by a flip-flop. One stable state of the flip-flop is designated the closed state. When the flip-flop is operated to its closed state, signals applied to the second input of the coincident circuit are blocked. Correspondingly, the other stable state of the flip-flop is designated the open state. When the flip-flop is operated to its open state, signals applied to the second input of the coincidence circuit are passed therethrough.

A "gate with buffer" combination is similar to the "single channel gate" with the exception that the second input of the coincidence circuit is connected to the output lead of an "or" gate. Thus, the second input of the coincidence circuit may be stimulated by either one of two input signals.

The "dual buffer" circuit consists of two different "or" gate coincidence circuits.

The seven-channel buffer consists of a seven-input "or" gate. An output signal is furnished upon receipt of an input signal at one or more of its inputs.

Each of the delay units may be of the well-known delay-type multivibrator.

A number of four-position switches are shown on the schematic diagram. Position "S" of the switch corresponds to the sort operation; position "M" corresponds to the merge operation; position "L" corresponds to the "extract by list" operation, and position "C" corresponds to the "extract by class" operation. These switches are all positioned prior to the start of an operation. The contact arms of switch S–8 are ganged together. In the drawing (Fig. 3*c*), the arms of S–8A, S–8B, and S–8C are shown in the SLM position. The remaining two positions are used in the "extract by class" operation.

Figure 3B:
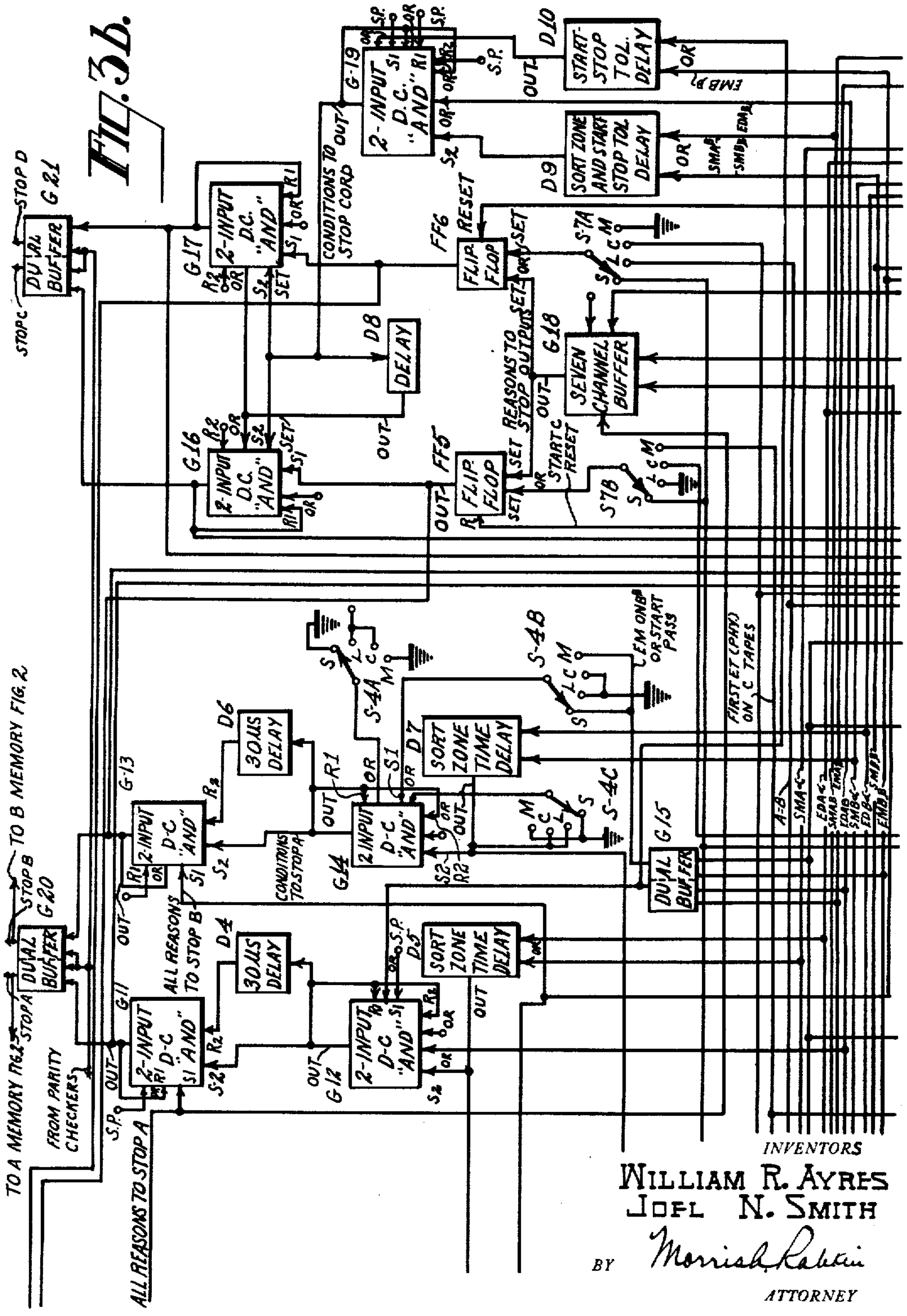
Figure 5C:
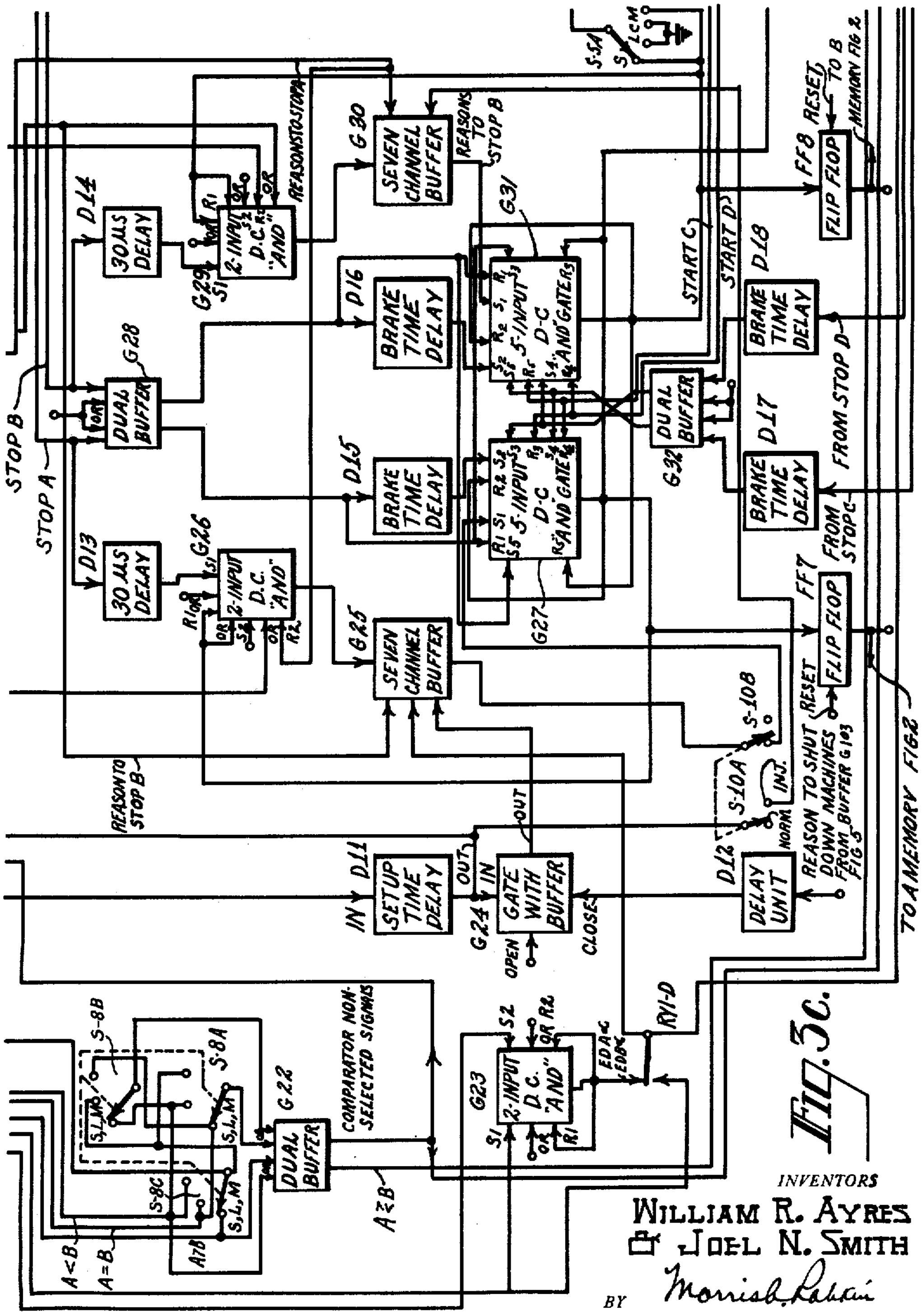
Figure 3D:
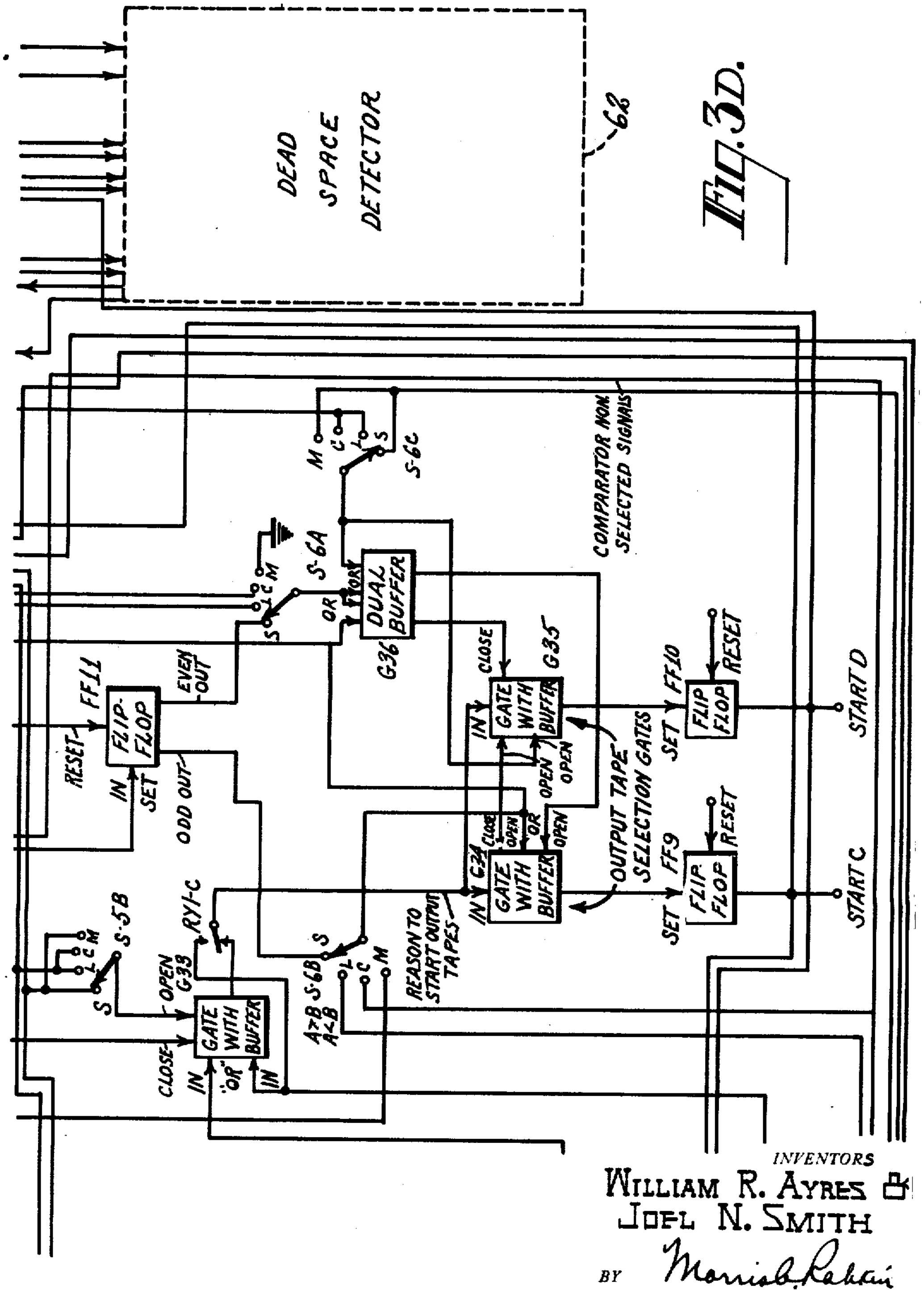

The large block shown in Fig. 3*d* is the "dead space detector" circuit 62. The details of this circuit have been described in the aforementioned application, Serial Number 419,226, filed by Joel N. Smith and William R. Ayres, on March 29, 1954, entitled "Message Spacing Control System."

The "dead space detector" is responsive to the tape-monitoring signals received from the input tapes. The function of this detector is to stop whichever output tape may be running, whenever the inter-message spacing of the messages encoded on the input tapes is excessive. The output tape which is to receive the transferred message is stopped for a short period in response to an output signal from the "dead space detector." This stopping of the output tape operates to close the gap between te messages transferred to the stopped output tape. Upon completion of the stopped period of the output tape, the input tape which is running is also stopped. This insures that both input and output tapes are started at the same time. Otherwise, the input tape would have been running at its full speed while the started output tape was accelerating up to speed. If, at this time, a decision had been made to transfer the messages from the input tape which was running, then the characters would be spaced too closely together on the output tape. However, by stopping all the tapes after the dead space period, correct spacing of the messages on the output tapes is maintained.

The dead space detector 62 (Fig. 3*d*) operates in this system to stop only the output tapes for the period during which excessive blank space is present on an input tape. When such a "dead" space is detected, the impulse provided from the dead space detector 62 activates one input of the seven channel buffer G–18 (Fig. 3*b*). The output of the gate G–18 accordingly activates one output of each of the "and" gates G–16 and G–17. When the conditions for stopping, described more fully hereinafter, are satisfied, an output is then provided from one of the "and" gates G–16 or G–17 to stop the output tape then being used.

Figure 9:
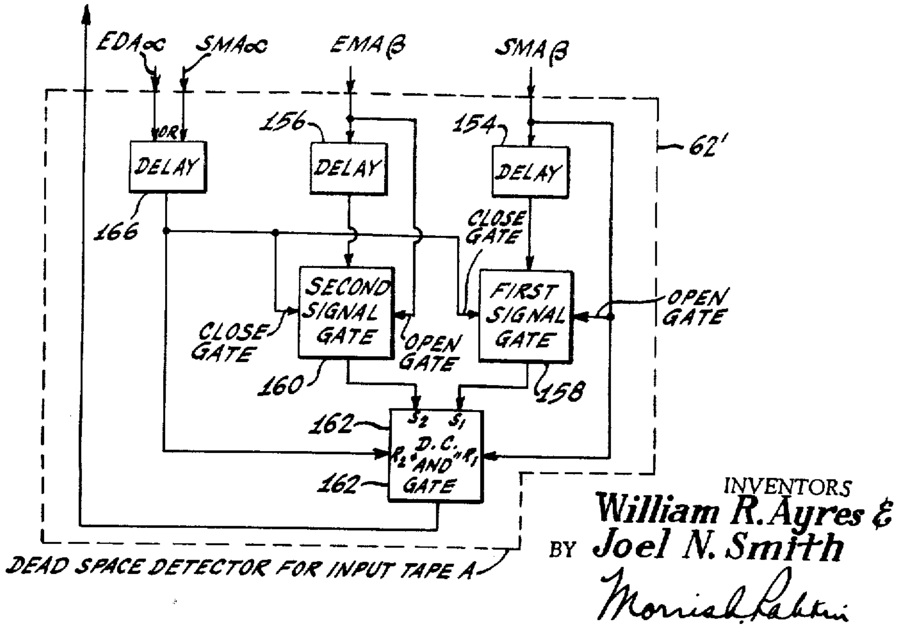
Fig. 9 is a schematic diagram illustrating details of the Dead Space Detector of Fig. 3*d*.

For convenience of drawing and description, the schematic diagram 62′ of Fig. 9 is used to explain the arrangement and operation of the dead space detector 62. The diagram 62′ of Fig. 9 shows only the portion of the circuitry responsive to signals received from the alpha and beta reading heads of the A input tape. Similar circuitry (not shown) responds to the signals received from the alpha and beta reading heads of the B input tape. The SMA$\beta$ and EMA$\beta$ signals are coupled individually through delay lines 154, 156 to the signal inputs of first and second signal gates 158, 160, respectively. The SMA$\beta$ signal is also connected directly to the open gate input of the first signal gate 158 and to a reset input of a D.C. "and" gate 162. The signal gates 158, 160 herein employed may be "opened" and "closed" by signals applied to open and close inputs, respectively. When open, the gates 158, 160 each provides an output signal in response to a signal applied to its signal input. Circuits for such a signal gate is well-known. The signal gate 158 or 160 may consist, for example, of a flip-flop combined with a two section Rossi coincidence gate. One of the quiescent potential levels on one of the terminals of the flip-flop in one stable state may be employed to activate one section of the Rossi gate, so that application of an input signal to the second section of the Rossi gate provides an output signal from the gate. A close signal for this arrangement is thus a signal which switches the flip-flop so that the one section of the Rossi gate is not activated.

The SMAα signal is coupled through a delay line 166 to a reset input of the D.C. "and" gate 162 and also to the close gate inputs of the first and second signal gates 158, 160. The outputs of the first and second signal gates 158, 160 are coupled to the signal inputs of the D.C. "and" gate 162, and the output of the latter gate 162 is coupled to the reset input of the D.C. "and" gate 128. The D.C. "and" gate 162 may be of the type described in connection with Fig. 8.

The EDAα signal is used to reset the dead space detector, so that a pass may be completed despite the existence of further dead space on the A input tape. Completion of the pass after the end data signal is desired because no further information is recorded on the tape, and no further sorting operation is employed. Thus the EDAα signal is directed through the delay unit 166 to the close inputs of the signal gates 158 and 160 and to the reset input R2 of the D.C. "and" gate 162.

In the normal course of operation, messages composed of trains of characters pass sequentially beneath the alpha reading head and then the beta reading head of the A tape. The SMAα signals are applied to one reset input of the D.C. "and" gate 162 in the dead space detector 62', and commence the sequence of operations. The desired minimum space between messages is then provided, and dead spaces greater than a predetermined maximum length are reduced to the predetermined length under the control of the setting of the delay lines 154, 156 and 166. The SMAα signal is directed through the delay line 166, which retards it sufficiently to allow for mechanical inertia effects due to starting and stopping of the A tape, and the delay line 166 output is then passed to the close gate input of the first signal gate 158, the close gate input of the second signal gate 160 and to one reset input R1 of the D.C. "and" gate 162. The D.C. "and" gate 162 provides an output on receiving successive signals on its two inputs S1 and S2. When an excessive dead space is present between successive messages on the A tape, the S1 and S2 signals are supplied from the beta reading head of the A tape. The SMAβ signal provides an open gate signal to the first signal gate 158 and a reset signal to the D.C. "and" gate 162. The D.C. "and" gate 162 still awaits the two signal inputs S1 and S2 at this point in time. The SMAβ signal is delayed sufficiently to permit passage of a tape at normal speed from the alpha to the beta reading head, and then this signal is employed as an input to the first signal gate 158. Since the first signal gate 158 has already been opened by an undelayed SMAβ signal, the first signal gate 158 provides an output which becomes the signal input to one input of the D.C. "and" gate 162.

When the termination of a message passes under the beta reading head, the EMAβ signal is directed without delay to the open gate input of the second signal gate 160, and, after a delay in the delay unit 156 sufficient to compensate for the inertia effects of the A tape mechanism, is applied to the signal input of the second signal gate 160. Since the second signal gate 160 is opened by the undelayed EMAβ signal, the second signal gate 160 provides an output. This output becomes a signal on the second signal input 52 of the D.C. "and" gate 162. Thus, both signal inputs of the D.C. "and" gate 162 are primed or activated by successive signals, without the intervention of other signals. The D.C. "and" gate 162, therefore, provides an output, which is utilized in the manner described more fully hereinafter to stop the running output tape C or D. In summary, an output is provided from the dead space detector 62 once a predetermined set of conditions have been satisfied and a delay greater than a predetermined amount follows an end message signal.

The start-pass signal previously referred to in connection with the data selectors is generated by the start pass initiation circuit 60 shown in the left-hand portion of Fig. 3*a*. This circuit may be a conventional pulse generator type such as a Schmitt trigger circuit. The start-pass signal is used to open and close various gates in the logical control unit, as well as the data-selector units 49 and 51, and the memory units 53 and 57.

In order to reduce the number of leads coming from the start-pass initiation circuit 60, the lead for the start-pass signal is shown as a short lead connected as an input to the various components in the logical control unit which is responsive thereto. Each of these connections is labeled S.P., as may be seen by referring to gate G-4 of Fig. 3*a*.

The start-pass initiation circuit 60 has two inputs. The first input is connected to a push button switch 64 which is manually operated at the beginning of an operation. The second input is a rewind completed signal. A number of passes are always required in the sort operation. A number of passes may be required during the other three basic operations due to an error being detected by a parity-checker circuit. Therefore, the system of the present invention automatically begins a new pass subsequent to the completion of the prior pass in the sort operation, and when an error has been indicated by a parity-checker circuit in the other three operations.

A suitable generator for the rewind completed signal may be four photo-electric devices (not shown), one device being associated individually with each of the tapes. A combination of holes are punched close to the physical end of each of the tapes. Each photoelectric device is responsive to the passage of these holes in the corresponding tape and furnishes an output signal. Thus, when each tape has been rewound, an output signal is furnished by the photo-electric device associated with the tape. A coincidence-type circuit (not shown) may be associated with each of the photoelectric devices. Such a coincidence device, for example, may be a four input D.C. "and" gate. Upon the occurrence of all four photoelectric-device output signals at the inputs of the coincidence circuit, an output signal is furnished to the second input of the pass initiation circuit 60. Other well-known means for sensing the physical end of an output tape may also be employed.

The operation of the logical control unit 73 depends upon the following basic plan:

(1) *Basis for starting and stopping tapes*

Because the basic unit of information transferred is a message, all starting and stopping of tapes is related to a complete message unit. An input tape is not stopped until the sorting zone of a message has appeared beneath the alpha reading head. Any time a stop signal is received by an input tape before the entire sorting zone of a message is read by the alpha head, the input tape is allowed to run until the entire sorting criterion has been read into the corresponding memory unit.

(2) *Conditions for starting and stopping the tape*

A start or stop signal generated by the logical control unit 73 (Fig. 2) is not effective to start or stop a tape until certain conditions have been satisfied. The conditions are determined by the presence or absence of the special signals which are supplied to the inputs of the logical control unit 73. In certain situations, the output signal from the comparator 71 is overridden by the tape monitoring signals.

(3) *General discussion of the basic operations*

(3.1) *Sort*

Sorting is carried out according to the "strings-of-two" method of sorting. Thus, a predetermined number of messages or documents is transferred from each input tape to a single output tape to form a sequential group thereon. The entire number of messages transferred from one input tape is termed a full string. The number of messages constituting a full string is a function of the pass number, increasing as a power of two with each pass. Thus, on the first pass, one message constitutes a full string, on the second pass two messages, on the third pass four messages, etc.

The initial split in which the new information is evenly divided among two tapes is, in a sense, a sorting operation. That is, assuming that the messages originally appear on a single tape, this tape is then connected in the A-tape position. The system then operates to transfer the messages on the input tape to the output tapes, alternating the transfer of the messages between output tapes C and D. Thus, upon the completion of the initial pass, the incoming messages are evenly (or with one in excess) divided onto the output tapes C and D.

Sorting of the messages on two tapes A and B is commenced by starting input tape A. If, at any time, during the operation, an equality is indicated, input tape A is arbitrarily caused to be advanced. Output tape C receives the first strings of messages from the input tapes, the second strings of messages are received by output tape D, and so on, alternately. Upon the completion of the sorting operation, the sorted information appears on output tape C. At the end of any pass, the end data symbol (ED) is read from input tape A to both output tapes C and D. The logical control unit 73 is set up for the sorting operation by manually setting the four position switches to position "S" (Figs. 3*a–d*).

(3.2) *Merge*

In the merge operation, the messages previously ordered on input tapes A and B are merged onto output tape C. If the capacity of output tape C is exhausted, as indicated by the receipt of the physical end of tape C signal, which is furnished by detector 50 (Fig. 2), tape C is stopped and tape D is started. The remaining information on the input tapes A and B is then transferred to output tape D. The logical control unit 73 is set up for the merge operation by manually setting the four position switches to the "M" position (Figs. 3*a–d*).

(3.3) *Extract by class*

In the extract-by-class operation, the input information is placed on the A input tape. The class item which may be defined as a sorting criterion, which represents the standard upon which the selection is to be determined, is designated by the setting of switch S–8 of the logical control unit 73 (Fig. 3*c*) to one of its three positions, that is, $A<B$, $A=B$, or $A>B$. If the setting is placed at $A<B$, the messages on the A tape, having a sorting criterion less than the class item, are transferred to output tape C. All other messages on the A input tape are transferred to output tape D. The logical control unit is set up for the extract-by-class operation by setting the four position switches to the "C" position.

(3.4) *Extract by list*

In the extract-by-list operation, the B input tape is used for the extraction criteria. The extraction criteria are arranged in serial order on input tape B. The information from which the extraction is to be performed is placed on input tap A. The extracted information is transferred to output tape C, and all other information is transferred to output tape D. The logical control unit 73 (Fig. 2) is set up for the extract by list operation by setting the four position switches to position "L."

(4) *Special nomenclature*

(4.1) *Logic*

Throughout the following description of the detailed operation of the logical control unit 73, the subscript "*n*" refers to the message being, or just transferred to, an output tape. The subscript "$n+1$" refers to the message whose sorting zone is or has just passed the alpha reading head of the input tape during the read-out of the "*n*th" message.

(4.2) *Special symbols*

The special symbols encoded on the input tapes are detected and read out by the alpha or beta reading heads of the input tapes. The signals representative of the special symbols are shown as inputs to the logical control unit at the left side of Figs. 3*a* and 3*c*. Each of these special signals has a particular significance as follows:

(4.2.1) *ET (phy) on C tape*

This signal indicates that the physical end of output tape C has been reached. It will be recalled that, in the merge and extract operations, the information is transferred to output tape C. Thus, the ET symbol is a warning that output tape C is filled and that the remaining information should be transferred to output tape D when the system is performing a merge operation.

(4.2.2) $A<B$

This signal originates in the comparator unit 71 (Fig. 2) and indicates that the sorting criterion of the A message is less than the sorting criterion of the B message. Therefore, because the system is arranged to order the information in an ascending sequence, this signal indicates that the message stored on the A input tape should be the one transferred to an output tape. However, the logical control circuit 73 does not reach its decision on the basis of this signal alone. Also, before this signal is effective to start the A tape running and so on, the necessary prerequisites must also be present.

(4.2.3) $A=B$

The explanation of the $A=B$ signal is the same as the $A<B$ signal since the system operates to arbitrarily transfer the message encoded on the A input tape in case of an equality in the sorting criteria.

(4.2.4) $A>B$

The explanation of the $A>B$ signal is the same as the $A<B$ signal. The $A>B$ signal indicates that the sorting criterion of the message encoded on the A input tape is greater than the sorting criterion of the message encoded on the B input tape, and that, in the sort operation, the message encoded on the B input tape should be the one transferred to an output tape. Of course, in the extract-by-class or extract-by-list operations, the setting of switch S–8 (Fig. 3*c*) determines which output tape is to receive the transferred message. Again, this signal alone is not determinative of itself and may be overriden.

(4.2.5) *SMAα*

During an operation, the logical control unit 73 must be able to recognize whether it is controlling the transfer of the "*n*th" or the "$(n+1)$th" message. Therefore, input signals are furnished to the logical control unit 73 by the code recognition devices 17 connected to the alpha and beta reading heads of the input tapes. The SMAα signals are interpreted by the logical control unit 73 to mean that the start message symbol of the "$(n+1)$th" message has passed beneath the alpha reading head of the A input tape.

This determination is required because an input tape is allowed to run until the sorting zone of the "$(n+1)$th" message has passed beneath the alpha reading head.

(4.2.6) *(SM or SD) Aα*

This signal is an alternative one and is required because the system is capable of operating on the basis of messages or documents. If the operation is on the basis of messages, the corresponding code-recognition gate of the data selectors 49 and 51 will be set to respond to the usual start message symbol. If the operation is on the basis of documents, this code-recognition gate will be set to respond only to the document symbol of the header message. Thus, when the operation is on the basis of documents, this signal indicates that the document symbol of the "$(n+1)$th" header message has passed beneath the alpha reading head of the A input tape.

(4.2.7) *EDAα*

This symbol indicates that the end of the information encoded on input tape A has been reached; in other words, no more messages are encoded on input tape A. Thus, for example, in the sort operation, this signal indicates that input tape A should be stopped irrespective of the results of the comparisons of the "*n*th" messages and, further, that if there are any more messages encoded on input tape B, they should be read out to an output tape.

(4.2.8) *SMAβ*

This signal indicates that the start-message symbol of the "*n*th" message has passed beneath the beta reading head of input tape A.

(4.2.9) *EDAβ*

This signal indicates that all of the information encoded on the A input tape, including the end data symbol, has been transferred to an output tape. Therefore, either a new pass should be started or the operation stopped.

(4.2.10) *SMBα*

The explanation for this signal is identical to that given for the SMAα signal with the exception that it is applicable to the B input tape.

(4.2.11) (*SM or SD*) *Bα*

The explanation for this signal is identical to that given for the (SM or SD) Aα signal with the exception that it is applicable to the B input tape.

(4.2.12) *EDBα*

The explanation of this signal is the same as that given for the EDAα signal except that it is applicable to the B input tape.

(4.2.13) *SMBβ*

The explanation for this signal is the same as that given for the SMAβ signal except that it is applicable to the B input tape.

(4.2.14) *EMBβ*

The EMBβ symbol indicates that there are no more messages remaining on input tape B. Therefore, input tape B should be stopped and input tape A started unless the EMAβ symbol has also been detected.

DETAILED DISCUSSION OF THE BASIC OPERATIONS (5.1) *Sorting*

Each of the four basic operations is one of selection; that is, one message is selected from one of the input tapes and transferred to one of the output tapes. In general, selection is made on the basis of the signals furnished by the comparator unit 71 (Fig. 2). However, before the selection becomes final, a number of conditions must be satisfied. In the following subparagraphs, a brief description of the circuits of the logical control unit, which are responsive to the various combinations of input signals, is set out in terms of the tapes operated thereby. It is to be understood that the basis for the sorting operation may be the sorting criterion of the "header" messages of a plurality of documents encoded on the input tapes.

(5.1.1) *Circuit responsive to the $A=B$ or $A<B$ signals*

The $A=B$ or the $A<B$ signal from the comparator 71 (Fig. 2) is applied through switch contacts S–8A and S–8B which are set to the "S" position to an input of the right side of a dual buffer G–22 (Fig. 3*c*, upper left corner). The output signal of the dual buffer G–22 passes through switch S–2A (Fig. 3*a*, rear center) to an input of a gate G–6. The gate G–6 is closed whenever an output signal from a delay unit D–2 is present. The output signals of predetermined counters A and B are applied to the inputs of delay unit D–2. Thus, when a full string is transferred from input tape A, the $A=B$ and the $A<B$ signals are blocked from passing through gate G–6.

The output signal of gate G–6 passes through switch S–2B to an input of a gate G–8. Gate G–8 is closed whenever an EDAα or EDBα signal is present. The EDAα or EDBα signals pass through a delay D3 to the close input of gate G–8. If gate G–8 is open, the $A=B$ or $A<B$ signal is passed through the "S" contact of switch S–8C to an input of gate G–25 (Fig. 3*c*). The output signal of gate G–25 is applied to the $S_1$ input of a 5-input "and" gate G–27. Only one input tape is running at any one time and the input and output tapes are started in synchronism. Therefore, before a signal is given to start tape A, input tape A and output tapes C and D are in the stopped condition, and input tape B is stopped or has received a stop impulse. These control signals are set-up in "and" gate G–27. The indications that output tapes C and D are stopped are supplied through a pair of "brake time delays" D17 and D18 and a duel buffer G–32 to the $S_3$ and $S_4$ inputs of gate G–27. The brake time delay is descriptive of the fact that a given interval of time is required before a tape can be brought to a complete stop. The inputs to brake time delays D17 and D18 are supplied respectively by a two-input "and" gate G–16 (Fig. 3*b*), and a two-input "and" gate G–17 which generate the stop tape C and stop tape D signals. The indication that input tape A is stopped is supplied by a two-input "and" gate G–11 (Fig. 2*b*) which generates the stop tape A signal. The stop tape A signal is passed through the left side of the dual buffer G–28 (as viewed in the drawing, Fig. 3*c*), and a brake time delay D–15 to the S–2 input of "and" gate G–27. The indication that input tape B is stopped is supplied by a two-input "and" gate G–13 (Fig. 2*b*) which generates the stop tape B signal. The stop tape B signal is passed through the right side of dual buffer G–28 (Fig. 3*c*) to the S–5 input of "and" gate G–27. Therefore, if a signal is received at each of the set inputs of the four control flip-flops of "and" gate G–27, the input signal indicating $A=B$ or $A<B$ causes "and" gate G–27 to furnish an output signal which is applied to an input of a flip-flop FF–7. The output signal of FF–7 is passed through the "one step tester" unit (Fig. 4) to the start input of the tape A drive mechanism (Fig. 2). The output signal of flip-flop FF–7 is also furnished to an input of the A memory unit 53 (Fig. 2) and acts to open the recirculation loop of the A memory unit.

(5.1.1.A) *Explanation of the $A=B$, $A<B$ circuit*

In the sorting operation, the messages are rearranged in an ascending sequence on the output tapes. Therefore, the start tape A signal is given conditionally whenever the comparator indicates that the sorting criterion of the message encoded on input tape A is less than, or equal to, the sorting criterion of the message encoded on input tape B. However, three conditions must also be satisfied at the same time as follows:

(*a*) A full string has not been transferred from input tape A because, otherwise, the messages must be transferred from input tape B in order that a sequential grouping on an output tape is comprised of a full string from input tape A and a full string from input tape B as required by the "strings-of-two" method of sorting. Thus, gate G–6 (Fig. 3*a*) is in its open condition.

(*b*) The end of the data encoded on the A input tape has not been reached as indicated by the absence of EDAα signal. Thus, gate G–8 (Fig. 3*a*) is in its open condition.

(*c*) The end of the data encoded on the B input tape has not been reached as indicated by the absence of EDBα signal, i.e. gate G–8 is in its open condition.

(5.1.2) *Circuit responsive to the output signals of predetermined counters A and B*

When a full string has been transferred from input tape B, predetermined counter B (Fig. 3*a*) furnishes an output signal which is applied to an input of gate G–6. Due to the action of a delay unit D–2, gate G–6 remains open until the full string B signal from predetermined counter B passes through. Subsequent to this signal, gate G–6 is closed by the delayed full string B signal which is passed through delay unit D–2 to a close input of gate G–6. The output of gate G–6 is passed through the "S" contact of switch S–2B to an input of gate G–8.

If the EDAα or EDBα signal were detected previously, each signal would have passed through a delay unit D–3 to close gate G–8. The output signal of gate G–8 passes through switch S–2C to an input of buffer G–25 (Fig. 3*c*). The output signal of buffer G–25 is applied to the S1 input of five-input "and" gate G–27. Again, output tapes C and D and input tape A must be in the stopped condition; and input tape B must have been given a stop signal before "and" gate G–27 furnishes an output signal which is applied to the set input of flip-flop FF7.

(5.1.2.A) *Explanation of circuit responsive to the output signal of the predetermined counters A and B (Fig. 3a)*

In the "strings-of-two" method of sorting, when a full string of messages has been transferred from one of the input tapes, the other input tape is advanced until a full string of messages has been likewise transferred therefrom. Thus, if, during a series of comparisons, a full string of messages has been transferred from input tape B, then input tape A should be advanced irrespective of the results of a comparison. However, the conditions necessary for starting input tape A must also be satisfied before tape A is advanced. The conditions are as follows:

(*a*) The EDAα signal is absent indicating that there remain messages untransferred from input tape A. Therefore, gate G–8 is open.

(*b*) The EDBα signal is absent indicating that there also remain messages untransferred from input tape B. Again, gate G–8 is open.

(5.1.3) *Circuit responsive to the EDBα signal*

The end data signal on the B input tape EDBα is applied directly to an input of gate G–8 (Fig. 3*a*). If the end of data symbol on tape A has been detected, the EDAα signal will have passed through delay D–3 to close gate G–8. However, if G–8 is open, its output signal passes through switch S–2C to an input of buffer G–25 (Fig. 3*c*). The output of buffer G–25 is applied to the S1 input of "and" gate G–27. Again, the conditions for starting tape A must be satisfied; that is, output tapes C and D are stopped, input tape A is stopped, and input tape B has received a stop signal.

(5.1.3.A) *Explanation of circuit responsive to the EDBα signal*

If, at any time, all of the messages have been transferred from input tape B, then input A should be started and the messages remaining on it transferred to an output tape unless, of course, all of the messages have also been transferred from input tape A as would be indicated by an EDAα signal. Therefore, gate G–8 is open due to the absence of the EDAα signal.

(5.1.4) *Circuit responsive to the EDAα and the EDBα signals*

Both EDAα and EDBα are supplied as inputs to the S1 and S2 inputs of the two-input "and" gate G–23 (Fig. 3*c*). After both these signals are received, gate G–23 furnishes an output signal which is passed through buffer G–25 to the S1 input of "and" gate G–27. Again, the prerequisites to starting input tape A must be present in the five-input "and" gate G–27. The output signal of "and" gate G–27 is applied to an input of flip-flop FF7. In addition, the output signal of gate G–27 is applied to an input of gate G–33 (Fig. 3*d*) which is open due to the presence of the stop tape B signal which is furnished by the output of gate G–13 (Fig. 3*b*). The output of gate G–33 (Fig. 3*d*) is applied to an input of gates G–34 and G–35. Both these latter gates are in an open condition due to the previous output signal of two-input "and" gate (Fig. 3*c*) having been applied through switch S–6C (Fig. 3*d*) and dual buffer G–36 to their respective open sides. The output signal of gate G–23 passes directly through the "S" contact of switch S–6C to an open input of gate G–35, and through one side of dual buffer G–36 to an open input of gate G–34. The output signals of gates G–34 and G–35 are respectively applied to an input of flip-flop FF–9 and FF–10. The output of flip-flop FF–9 is a start output tape C signal, and the output of flip-flop FF–10 is a start output tape D signal.

(5.1.4.A) *Explanation of the circuit responsive to the EDAα and EDBα signals*

In the present embodiment, the end data symbol is encoded at some distance from the end of the last message encoded on the input tapes. Therefore, in order to expedite the transfer of this special symbol, the end data symbol encoded on input tape A is transferred to both output tapes C and D. This procedure eliminates the necessity of restarting input tape B in order to transfer its end data symbol.

(5.1.5) *Circuit for restarting tape A*

Referring to Fig. 3*c*, it is seen that the seven-channel buffer G–30 corresponds functionally to the seven-channel buffer G–25. In the above description, it was pointed out that each conditional decision to start input tape A is passed through seven-channel buffer G–25. Likewise, each conditional decision to start input tape B is passed through a seven-channel buffer G–30. The conditional decision to start input tape B is also applied to a reset input R2 of a two input "and" gate G–26, thereby closing gate G–26. The EDAβ signal is also applied to the reset input R2 of gate G–26. Therefore, if either of the above conditions exist, i.e. a conditional start tape B signal or an end data on input tape A signal, gate G–26 is closed.

Both the the output signal of "and" gate G–27 and the start pass signal are applied to a set input S2 of gate G–26. The output signal of gate G–27 is also applied to the reset input R1 of gate G–26. Therefore, unless the gate G–26 has been reset due to the receipt of a signal at one of its reset inputs R2 as described above, the gate G–26 is primed to pass the output signals of delay unit D–13. All stop A signals are passed through delay D–13 to the set input S1 of "and" gate G–26; hence, if "and" gate G–26 remains primed due to the absence of a reset signal, the delayed stop A signal passes through "and" gate G–26, and buffer G–25 to the S1 input of five-input "and" gate G–27.

Thus, if the prerequisites to starting input tape A are present, "and" gate G–27 furnishes an output signal which is applied to the set input of flip-flop FF–7.

(5.1.5.A) *Explanation of circuit for restarting tape A*

In the discussion relative to the dead space detector 62 (Fig. 3*d*), it was pointed out that whenever the intermessage spacing between the $n$th and the $(n+1)$th messages of the running input tape is excessive, the corresponding output tape to which the message is to be transferred is stopped and the input tape allowed to run, thereby closing up the inter-message spacing on the output tapes. However, in order to make certain that no information is lost due to the time required for a tape to come up to a proper recording speed, the running input tape is subsequently stopped. Then both the input and the output tapes are restarted in synchronism. Therefore, unless input tape A has been stopped because all of the messages were transferred therefrom, or because a start input tape B signal is present, then input tape A should be restarted.

(5.1.6) *Circuit for starting tape A at the beginning of the sort operation*

At the beginning of the sort operation, the start pass switch 64 shown in Fig. 3*a* is operated and causes the start pass initiator 60 to generate a signal which, besides setting-up various gates, counters and flip-flops for the sort operation, passes through a set-up time-delay unit D–11 (Fig. 3*c*) to an input of a gate G–24 which is in an open condition due to the presence of the undelayed start pass signal. The output signal of gate G–24 passes through seven-channel buffer G–25 and switch S–10B to the S1 input of five-input "and" gate G–27. The start pass signal is applied to each side of the dual buffer G–32. The output signal of the left side of dual buffer G–32 (as viewed in the drawing) is applied to the S–4 input of "and" gate G–27, and the output of the right side of dual buffer G–32 is applied to the S–3 input of "and" gate G–27. The start pass signal is also applied to both sides of dual buffer G–28. The output signal of the left side of dual buffer G–28 (as viewed in the drawing) is passed through brake time-delay D–15 to the S–2 input of "and" gate G–27. The output signal of the right side of dual buffer G–28 is applied to the S–5 input of "and" gate G–27. The output signal of "and" gate G–27 is furnished to the set input of flip-flop FF–7. The output signal of FF–7 is passed through the one-step tester to the start input of the input tape A drive mechanism.

(5.1.6.A) *Explanation of the circuit for starting tape A*

Due to the fact that sorting is commenced by starting input tape A, the system must respond to the start pass signal by causing input tape A to be started.

(5.2.1) *Circuit responsive to the* A>B *signal*

If the comparator 71 indicates that $A>B$, and if a full string has not been transferred from input tape A, and also if the EDA$\alpha$ and EDB$\alpha$ signals are not present, input tape B should be started. Referring to Fig. 3*a* of the logical control unit, the $A>B$ signal passes through switch S–1A to an input of a gate G–5. Gate G–5 is open unless a full string on A or B signal has passed through delay unit D–2 to close G–5. The output signal of gate G–5 is passed through switch S–1B to an input of gate G–7. Gate G–7 remains open unless an EDA$\alpha$ or an EDB$\alpha$ signal has been received by delay unit D–3 and passed to the close input of gate G–7. The output signal of gate G–7 passes through switch S–1C to an input of seven-channel buffer G–30 (Fig. 3*c*). The output signal of buffer G–30 is applied to the S1 input of a five-input "and" gate G–31. If the conditions required by gate G–31 are satisfied at its S2, S3, S4, and S5 inputs, as described above, i.e. output tapes C and D are stopped, input tape B is stopped, and input tape A has received a stop impulse, then the signal from buffer G–30 causes gate G–31 to furnish an output signal which is applied to the set input flip-flop FF–8. The output signal of "and" gate G–31 is also passed through the "S" contact of switch S–5A to an input of gate G–33 (Fig. 3*d*) which, if open, passes a start signal to either output tape C or D, as will be explained in more detail hereinafter. The output signal of flip-flop FF–8 is passed through the one-step tester to the start input of the input tape B drive mechanism.

(5.2.2) *Circuit responsive to the output signal of predetermined counter A*

Predetermined counter A furnishes an output signal upon counting a full string of messages transferred from input tape A. This output signal is applied to an input of gate G–5 (Fig. 3*a*) which is in its open condition due to the absence of the full string B signal which is passed through the delay unit D–2. The signal from predetermined counter A passes through gate G–5 and through the "S" contact of switch S–1B to an input of gate G–7. Gate G–7 remains open unless an EDA$\alpha$ or an EDB$\alpha$ signal has been received by delay unit D–3 and passed to the close input of gate G–7.

The output signal of gate G–7 is applied to an input of seven-channel buffer G–30 (Fig. 3*c*) and thence to the S1 input of five-input "and" gate G–31.

If the conditions for starting input tape B are satisfied, i.e. output tapes C and D are in a stopped condition, input tape B is in a stopped condition, and input tape A has received a stop signal, the "and" gate G–31 furnishes an output signal to the set input of flip-flop FF–8. The output signal of FF–8 passes through the one-step-tester circuit to the start input of the input tape B drive mechanism.

(5.2.2.A) *Explanation of the circuit responsive to the output signal of predetermined counter A*

Tape B is started irrespective of the comparator indications, when predetermined counter A has counted a full string of messages, unless (*a*) a full string has also been transferred from input tape B, and (*b*) the EDA$\alpha$ or EDB$\alpha$ signals have not been detected by the reading heads associated with the input tapes. Therefore, the gates G–5 and G–7 are open.

(5.2.3) *Circuit responsive to the EDA$\alpha$ signal*

The EDA$\alpha$ signal passes through the "S" contact of switch S–2D (Fig. 3*a*) to an input of gate G–7. Unless a previous EDB$\alpha$ signal has passed through delay unit D–3 to the close input of gate G–7, the EDA$\alpha$ signal is passed through gate G–7, switch S–1C, and seven-channel buffer G–30 (Fig. 3*c*) to the S1 input of five input "and" gate G–31. Again, if the conditions for starting input tape B are satisfied, an output signal is furnished to the set input of flip-flop FF–8. The output signal of flip-flop FF–8 is applied to the start input of the tape B drive mechanism.

(5.2.3.A) *Explanation of the circuit responsive to the EDA$\alpha$ signal*

If the EDA$\alpha$ signal is detected but not the EDB$\alpha$ signal, then input tape B should be run and the messages thereon transferred to an output tape.

(5.2.4) *Circuit for restarting tape B*

The function of two-input "and" gate G–29 (Fig. 3*c*) is the same as that of gate G–25 discussed previously. All stop B signals are passed through a delay unit D–14 to the S1 input of gate G–29. Gate G–29 is primed unless an EDB$\alpha$ signal or a start tape A signal has been received at its reset input R2. The EDB$\alpha$ signal is applied directly to the R2 reset input of gate G–29. The start input tape A signals pass through switch S–2C (Fig. 3*a*) to the reset input R2 of gate G–29 (Fig. 3*c*). The output signal of five input "and" gate G–31 is applied directly to the reset input $R_1$ and to the set input $S_2$ of gate G–29. Thus, unless either of the above $R_2$ reset signals has been received, gate G–29 is responsive to the stop tape B signal received from delay unit D–14. The output signal of gate G–29 is applied to the $S_1$ input of five-input "and" gate G–31 which furnishes an output signal to the set input of flip-flop FF–8 provided, of course, the conditions for starting input tape B are set up at other set inputs $S_2$, $S_3$, $S_4$, and $S_5$ of "and" gate G–31.

(5.2.4.A) *Explanation of circuit for restarting tape B*

If, at any time, input tape B is stopped, it is restarted unless stopped because of the presence of the EDBα signal or a signal indicating that input tape A has received a start impulse. This insures that input tape B is restarted, if it has been stopped, because of excessive intermessage spacing.

(5.2.5) *Circuit for starting output tapes C and D*

The output signals of predetermined counters A and B are respectively applied to the $S_1$ and $S_2$ inputs of a two-input "and" gate G–4 (Fig. 3*a*). Thus, when a full string is counted by both predetermined counters A and B, gate G–4 furnishes an output signal. This output signal passes through the closed contact of relay Ry1–B to the set input of a flip-flop FF–11 (Fig. 3*d*). It should be noted here that the output signal of gate G–4 is also passed through a delay unit D–1 to an open input of gates G–5 and G–6. Thus, gates G–5 and G–6 are reopened after a full string has been transferred from each of the input tapes. Flip-flop FF–11 (Fig. 3*d*) has two output sides; one is an odd-signal side and one is an even-signal side. Thus, in response to every other signal from gate G–4, flip-flop FF–11 furnishes an output signal from its even side. This output signal is passed through switch S–6A to an input of each side of a dual buffer G–36.

The output signal of the left side, as viewed in the drawing, of the dual buffer G–36 is applied to the close input of gate G–35, while the output signal of the right side of dual buffer is applied to an open input of gate G–34.

The output signals of the five-input "and" gates G–27 (Fig. 3*c*) and G–31 which are used to start input tapes A and B respectively, are each applied to an input of a gate G–33 (Fig. 3*d*), which is in the open condition due to the receipt of a stop tape B signal. At the commencement of the sorting operation, gate G–33 is closed by the start pass signal, as shown. However, it is subsequently opened by the first stop B signal which occurs prior to the requirement for switching output tapes, as explained below. The output signal of gate G–33 is applied to an input of gates G–34 and G–35, but only gate G–34 is open. Thus, the output signal of gate G–33 is passed to the set input of flip-flop FF–9. The output signal of flip-flop FF–9 is passed through the one-step tester to the start input of the output tape C drive mechanism.

Similarly, the odd-count output of flip-flop FF–11 is applied directly to an open input of gate G–35 and to a close input of gate G–34. A subsequent output signal from gate G–33 is passed through open gate G–35 to the set input of flip-flop FF–10. The output signal of flip-flop 10 is passed through the one-step tester to the start input of output tape D.

At the start of a pass, the start pass signal is applied directly to the close input of gate G–33 and to an open input of gate G–34. The start pass signal is also passed through the left side of dual buffer G–36 to the close input of gate G–35. Therefore, at the start of a pass, the first start A and the first start B signals from "and" gates G–27 and G–31 respectively are blocked by closed gate G–33. However, when input tape B is stopped by a signal received from gate G–13 (Fig. 3*b*) the stop signal from gate G–13 is also applied to the open input of gate G–33 (Fig. 3*d*). This procedure permits the sorting criterion of the first message encoded on input tape A, and the sorting criterion of the first message encoded on input tape B to be stored in the corresponding A and B memory units 53, 57 (Fig. 2) before an output tape is started. The result of the first comparison of the sorting criteria then causes input tape A or input tape B to be started. Gate G–33 (Fig. 3*d*) is then in an open condition and passes the signal to gates G–34 and G–35 to either start output tape C or output tape D.

(5.2.5.A) *Explanation of circuit for starting output tapes C and D*

The "strings-of-two" method of sorting requires that the recording of messages be shifted from output tape C to output tape D when a full string of messages has been transferred from input tapes A and B to output tape C, and vice versa.

(5.3.1) *Circuit responsive to the start pass and SMAα signals*

One of the input signals furnished to two-input "and" gate G–12 (Fig. 3*b*) is the start pass signal which is applied to the $S_1$ input. The second input signal is furnished by the output of delay D–5 which is applied to the $S_2$ input. The SMAα signal is applied to the input of delay D–5 which is set to delay an input signal for a time interval corresponding to the time required for the sorting zone to pass beneath the alpha reading head. The output signal of gate G–12 is applied to the $S_2$ input of gate G–11. The output signal of delay D–5 is also applied to the set input of flip-flop FF–1 (Fig. 3*a*) causing this flip-flop to furnish an output signal to the input of seven-channel buffer G–9. The output of buffer G–9 is applied to the set input of flip-flop FF–3 and the output signal of flip-flop FF–3 is, in turn, applied to the $S_1$ input of "and" gate G–11 (Fig. 3*b*). The output signal of gate G–11 is passed through dual buffer G–20 to the stop input of the tape A drive mechanism. It should be noted that flip-flop FF–1 is responsive only to the signal from delay D–5 at the start of a pass, because only the start pass signal is applied to the reset input R of flip-flop FF–1. Flip-flop FF–3 is reset each time input tape A receives a start signal.

(5.3.1.A) *Explanation of circuit responsive to the start pass SMAα signals*

At the start of a pass, one message is read from each of the input tapes into the corresponding A and B memory units. Because input tape A is started first, the sorting zone of the first message should be read by the alpha reading head before input tape A is stopped.

(5.3.2) *Circuit responsive to the $SMA\alpha_{(n+1)}$ and the $EMA\beta_{(n)}$ signals*

The SMAα signal of the "$(n+1)$th" message or unit of information is applied to an input of delay unit D–5 (Fig. 3*b*), and after a delay period corresponding to the sort zone passing beneath the alpha reading head, the signal is passed through delay unit D–5 to the $S_2$ input of "and" gate G–12.

The EMAβ signal of the *n*th message is applied to an input of dual buffer G–15. The output signal of dual buffer G–15 is applied to the $S_1$ input of "and" gate G–12. The output signal of "and" gate G–12 is applied to the $S_2$ input of "and" gate G–11 which had previously been primed by flip-flop FF–3. The output signal of "and" gate G–11 is passed through dual buffer G–20 to the stop input of the tape A drive mechanism.

(5.3.2.A) *Explanation of circuit responsive to the $SMA\alpha_{(n+1)}$ and $EMA\beta_{(n)}$ signals*

If, during a pass, the comparator 71 (Fig. 2) furnishes an $A>B$ signal, input tape B should be started and input tape A should be stopped, as explained above. Therefore, "and" gate G–11 is primed due to the signal furnished by the output of flip-flop FF–3. The conditions for stopping input tape A are:

(a) That the end of the "nth" message is detected by the beta reading head of input tape A, indicating that the entire "nth" message has been transferred to an output tape; that is, the EMA$\beta_{(n)}$ signal is present, and (b) That the start message symbol and the sort zone of the "(n+1)th" message is detected by the alpha reading head of input tape A; that is, the SMA$\alpha_{(n+1)}$ signal is present.

(5.3.3) *Circuit responsive to the output signal of predetermined counter A*

Predetermined counter A (Fig. 3a) furnishes an output signal which is passed through gates G–5 and G–7 to the set input of flip-flop FF–3. The output signal of flip-flop FF–3 is applied to the $S_1$ input of "and" gate G–11 (Fig. 3b). The conditions for stopping tape A are: that the nth message has been transferred, and that the sorting criterion of the (n+1)th message has been read by the alpha reading head. The SMA$\alpha_{(n+1)}$ signal is delayed by a delay unit D–5 and passed to the $S_2$ input of gate G–12. The EMA$\beta_{(n)}$ signal is passed through a dual buffer G–15 to the $S_1$ input of gate G–12. The output signal of gate G–12 is applied to the $S_2$ input of gate G–11 which, in response to the signals at its $S_1$ and $S_2$ input, furnishes an output signal to the dual buffer G–20. The output signal of buffer G–20 is applied to the stop input of the tape A drive mechanism.

(5.3.3.A) *Explanation of circuit responsive to the output signal of predetermined counter A*

The "strings-of-two" method of sorting requires that input tape A be stopped when a full string has been transferred therefrom to an output tape. Therefore, the output signal of predetermined counter A, which denotes a full string transferred from input tape A, operates to stop input tape A.

(5.3.4) *Circuit responsive to the EMA$\beta$ and EDA$\alpha$ signals*

The EDA$\alpha$ signal is applied to the sort zone time-delay unit D–5 and is passed through delay unit D–5 to the $S_1$ input of "and" gate G–12. The EMA$\beta$ signal is passed through dual buffer G–15 to the $S_1$ input of gate G–12. Gate G–12 thereupon furnishes an output signal to the $S_2$ input of "and" gate G–11. The EDA$\alpha$ signal is also applied directly to one of the inputs of seven-channel buffer G–9 (Fig. 3a). The output signal of buffer G–9 is applied to the set input of flip-flop FF–3 causing flip-flop FF–3 to furnish an output signal to the $S_1$ input of gate G–12. Gate G–12 thereupon furnishes an output signal which is passed through dual buffer G–20 to the stop input of the tape A drive mechanism.

(5.3.4.A) *Explanation of circuit responsive to the EMA$\alpha$ and the EDA$\alpha$ signals*

Input tape A should be stopped when the EDA$\alpha$ signal is detected by the alpha reading head because this signal indicates that no more messages remain on tape A. However, the stop signal is not applied to the stop input of the tape A drive mechanism until the beta reading head of input tape A has detected the last character of the final message. The presence of the EMA$\beta$ signal indicates that the last character of a message has been detected by the beta reading head.

(5.3.5) *Circuit responsive to the EDA$\beta$ signal*

The EDA$\beta$ signal is applied directly to an input of seven-channel buffer G–9 (Fig. 3a). The output signal of buffer G–9 is applied to the set input of flip-flop FF–3 causing the flip-flop FF–3 to furnish an output signal to the $S_1$ input of gate G–11 (Fig. 3b). The EDA$\beta$ signal is also applied directly to the $S_2$ input of gate G–12 and, in addition, the EDA$\beta$ signal is also passed through dual buffer G–15 to the $S_1$ input of gate G–12. Gate G–12 thereupon furnishes an output signal to the $S_2$ input of gate G–11 causing gate G–11 to furnish an output signal which is passed through dual buffer G–20 to the stop input of the tape A drive mechanism.

(5.3.5.A) *Explanation of circuit responsive to the EDA$\beta$ signal*

It was noted earlier in the detailed discussion that the end data symbol (ED) is transferred to both output tapes C and D from input tape A. Thus, input tape A is advanced until its beta reading head detects the ED symbol, then tape A is stopped.

(5.3.6) *Circuit for stopping input tape A when an output tape is caused to be stopped*

The stop signals generated by flip-flops FF–5 and FF–6 (Fig. 3b) are applied directly to the inputs of seven-channel buffer G–9 (Fig. 3a) whose output signal is, in turn, applied to the set input of flip-flop FF–3. The flip-flops FF–5 and FF–6 are used in stopping the output tapes as explained below. The output signal of flip-flop FF–3 is applied to the $S_1$ input of "and" gate G–11. The conditions for stopping input tape A are set up in "and" gate G–12 as described above. The output signal of gate G–12 is applied to the $S_2$ input of gate G–11, thereby causing gate G–11 to furnish an output signal which is passed through dual buffer G–20 to the stop input of the tape A drive mechanism.

(5.3.6.A) *Explanation of circuit for stopping input tape A when an output tape is caused to be stopped*

If, for any reason, either of the output tapes are stopped, the input tapes also receive a stop signal in order that the tapes may be restarted in synchronism.

(5.4.1) *Circuit responsive to the start pass and SMB$\alpha$ signals*

The start pass signal is passed through dual buffer G–15 (Fig. 3b) and switch S–4B to the $S_1$ input of "and" gate G–14. The SMB$\alpha$ signal is applied to an input of a delay unit D7. The delay unit D7 delays the SMB$\alpha$ signal a time interval corresponding to that required for the sorting zone of the B message to pass beneath the alpha reading head of input tape B. The output signal of delay unit D7 is applied to the $S_2$ input of "and" gate G–14 causing it to furnish an output signal to the $S_2$ input of "and" gate G–13. The output signal of delay unit D7 is also applied to the set input of flip-flop FF–2 (Fig. 3a) causing flip-flop FF–2 to furnish an output signal to an input of seven-channel buffer G–10. The output signal of buffer G–10 is applied to the set input of flip-flop FF–4. The output signal of flip-flop FF–4 is furnished to the $S_1$ input of gate G–13 (Fig. 3b). "And" gate G–13 thereupon furnishes an output signal which is passed through dual buffer G–20 to the stop input of the tape B drive mechanism.

(5.4.1.A) *Explanation of the circuit responsive to the start pass and SMB$\alpha$ signals*

At the start of a pass the sorting criterion of the first message encoded on input tape B is read into the B memory unit 57 (Fig. 2) by the alpha reading head of input tape B and thereupon input tape B is stopped. Therefore, the start pass signal and the SMB$\alpha$ signals must be received before input tape B is stopped.

(5.4.2) *Circuit responsive to the $A<B$ or $A=B$ and the SMB$\alpha_{(n+1)}$ and EMB$\beta_{(n)}$ signals*

The $A<B$ or $A=B$ signal is passed through the "S" contact of switch S–2 (Fig. 3a) to the input of gate G–8. The output signal of gate G–8 is passed through the "S"

contact of switch S–2C to the input of seven-channel buffer G–10. The output signal of seven-channel buffer G–10 is applied to the set input of flip-flop FF–4. The output signal of flip-flop FF–4 is applied to the $S_1$ input of gate G–13 (Fig. 3*b*) thereby priming gate G–13.

The EMBβ signal of the "*n*th" message is applied to an input of a dual buffer G–15. The output of dual buffer G–15 passes through switch S–4B to the $S_1$ input of "and" gate G–14. The SMBα signal of the $(n+1)$th message is applied to an input of delay unit D–7 which is arranged to delay an input signal a time interval corresponding to the time required for the sorting zone of the $(n+1)$th message to pass the alpha reading head of input tape B. The output of delay unit D–7 is applied to the $S_2$ input of "and" gate G–14 causing gate G–14 to furnish an output signal to the $S_2$ input of "and" gate G–13. "And" gate G–13 is already primed due to the output signal of flip-flop FF–4 and, therefore, gate G–13 furnishes an output signal which is passed through dual buffer G–20 to the stop input of the tape B drive mechanism.

(5.4.2.A) *Explanation of the circuit responsive to the A<B or A=B, and the SMBα and EMBα signals*

When the comparator unit 71 (Fig. 2) indicates that the sorting criterion of an "A" message is less than, or equal to, the sorting criterion of a "B" message, input tape B is stopped.

The conditions for stopping tape B on the basis of a comparison are that the last character of the *n*th message has been transferred by the beta reading head of input tape B, and that the sorting criterion of the $(n+1)$th message has been read into the B memory unit 57 (Fig. 2) by the alpha reading head of input tape B.

(5.4.3) *Circuit responsive to the output signal of predetermined counter B, the $SMB\alpha_{(n+1)}$ and $EMB\beta_n$ signals*

The output signal of predetermined counter B is passed through gates G–6 and G–8 (Fig. 3*a*) to an input of seven-channel buffer gate G–10.

The output signal of gate G–10 is applied to the set input of flip-flop FF–4 causing it to furnish an output signal to the $S_1$ input of "and" gate G–13 (Fig. 3*b*) thereby priming "and" gate G–13. The EMBβ signal of the "*n*th" message passes through dual buffer G–15 and switch S–4B to the $S_1$ input of "and" gate G–14. The SMBα signal of the $(n+1)$th message is delayed by delay unit D–7 for a time interval corresponding to that required for the sorting criterion of the $(n+1)$th message to pass beneath the alpha reading head of input tape B. The output signal of delay unit D–7 is applied to the $S_2$ input of "and" gate G–14 causing it to furnish a signal to the $S_2$ input of "and" gate G–13. The output signal of primed "and" gate G–13 is passed through dual buffer G–20 to the stop input of the tape B drive mechanism.

(5.4.3.A) *Explanation of circuit responsive to the output signal of predetermined counter B, the $SMB\alpha_{(n+1)}$ and $EMB\beta_n$ signals*

The output signal of predetermined counter B indicates that a full string has been transferred from input tape B; therefore input tape B should be stopped.

The conditions for stopping tape B are that the end message symbol of the "*n*th" message has been transferred, and that the sorting criterion of the $(n+1)$th message has been read into the B memory unit 57 (Fig. 2).

(5.4.4) *Circuit responsive to the EMBβ, the EDBα and the EDBβ signals*

The EMBβ signal is passed through dual buffer G–15 (Fig. 3*b*) and switch S–4B to the $S_1$ input of "and" gate G–14. The EDBα signal is passed through seven-channel buffer G–10 (Fig. 3*a*) to the set input of flip-flop FF–4. The output signal of flip-flop FF–4 is applied to the $S_1$ input of "and" gate G–13 (Fig. 3*b*). The EDBα signal is also applied to an input of delay unit D–7 and, after a suitable delay interval, the output signal of delay unit D–7 is applied to the $S_2$ input of "and" gate G–14 causing "and" gate G–14 to furnish an output signal which is applied to the $S_2$ input of "and" gate G–13. "And' gate G–13 thereupon furnishes an output signal which is passed through dual buffer G–20 to the stop input of the tape B drive mechanism.

(5.4.4.A) *Explanation of the circuit responsive to the EMBβ, the EDBα and the EDBβ signals*

If the EDBα signal is present, input tape B should be stopped because the ED symbol is transferred from input tape A to the output tapes. The conditions for stopping tape B in this situation are that the EMBβ of the *n*th message has been detected by the beta reading head of input tape B and that the alpha reading head of input tape B has read the EDBα symbol.

(5.4.5) *Circuit for stopping input tape B when an output tape is caused to be stopped*

The conditional stop signals for output tapes C and D are furnished by flip-flops FF–5 and FF–6 (Fig. 3*b*) respectively, as explained below. The output signals of flip-flops FF–5 and FF–6 are applied directly to two different inputs of the seven-channel buffer G–10 (Fig. 3*a*). The output signal of buffer G–10 in response to either input signal is applied to the set input of flip-flop FF–4 causing it to furnish a signal to the $S_1$ input of "and" gate G–13. Thereafter, upon the occurrence of conditions for stopping input tape B at the $S_1$ and $S_2$ inputs of "and" gate G–14, a signal is applied to the $S_2$ input of "and" gate G–13 causing it to furnish an output signal which is passed through dual buffer G–20 to the stop input of the tape B drive mechanism. Thus, for example, although one of the output tapes receives a stop signal, input tape B is allowed to run until the sorting criterion of the $(n+1)$th message is read into the B memory unit 57 (Fig. 2).

(5.4.5.A) *Explanation of circuit for stopping input tape B when an output tape is caused to be stopped*

Whenever an output tape is stopped, a stop signal is also applied to the tape drive mechanism of the running input tape, thereby insuring that the input and the output tape next selected are started in synchronism.

(5.5.1) *Circuit for stopping an output tape when a full string from both input tapes have been transferred thereto*

The start C output signal of flip-flop FF–9 (Fig. 3*d*) is applied to the reset input R of flip-flop FF–5 (Fig. 3*b*). Likewise, the start D output signal of flip-flop FF–10 (Fig. 3*d*) is applied to the reset input R of flip-flop FF–6 (Fig. 3*b*). Thus, the flip-flop FF–5 or FF–6 which is associated with the running output tape is placed in its reset condition. "And" gate G–4 (Fig. 3*a*) furnishes an output signal when both predetermined counters A and B have counted a full string. The output signal of "and" gate G–4 is passed through switch S–7B (Fig. 3*b*) to the set input of flip-flop FF–5. The output signal of "and" gate G–4 (Fig. 3*a*) is also passed through switch S–7A (Fig. 3*b*) to the set input of flip-flop FF–6. Thus, the one of the flip-flops FF–5 or FF–6 which is in a reset condition furnishes an output signal. If output tape C is running, the output signal of flip-flop FF–5 is applied to the $S_1$ input of a two-input "and" gate G–16. Likewise, if output tape D is running, the output signal of flip-flop FF–6 is applied to the $S_1$ input of a two-input "and" gate G–17.

The conditions for stopping an output tape are set up in the two-input "and" gate G–19. Thus, if the "*n*th"

message is being transferred, the start message signal SMA$\beta$ or SMB$\beta$ (depending upon which input tape is running) of the $(n+1)$th message is passed through delay unit D–9 to the $S_2$ input of "and" gate G–19. The delay unit D–9 insures that the distance L (of Fig. 1) between the start of the $n$th message and the start of the $(n+1)$th message is maintained greater than the minimum length. The end message signal EMA$\beta$ or EMB$\beta$ of the $n$th message is passed through delay unit D–10 to the $S_1$ input of "and" gate G–19. The output signal of "and" gate G–19 is applied to the $S_2$ input of each of the two-input "and" gates G–16 and G–17. If output tape C is running, "and" gate G–16 is primed due to the output signal of flip-flop FF–5 and, therefore, an output signal is furnished by "and" gate G–16 to an input of the dual buffer G–21. The output signal of dual buffer G–21 is applied to the stop input of the output tape C drive mechanism. If output tape D is running, "and" gate G–17 is primed due to the output signal of flip-flop FF–6, and an output signal is furnished by "and" gate G–17 to an input of dual buffer G–21. The output signal of dual buffer G–21 is applied to the stop input of output tape D.

(5.5.1.A) *Explanation of circuit for stopping an output tape when a full string from both input tapes is transferred thereto*

In the "strings-of-two" method of sorting, when an output tape receives a full string of messages from both input tapes A and B, this output tape is stopped and the other output tape is started provided the necessary conditions for stopping an output tape are satisfied. The above circuit of paragraph (5.5.1) provides the means for maintaining the unit of information in sequential groups as required by the "strings-of-two" method of sorting.

(5.5.2) *Circuit responsive to the EDA$\beta$ signal for stopping the output tapes*

The EDA$\beta$ signal is applied directly to the $S_2$ input of the two-input "and" gate G–19. The EDA$\beta$ signal is also passed through dual buffer G–15 to an input of delay unit D–10. The output of delay unit D–10 is applied to the $S_1$ input of "and" gate G–19. The output signal of "and" gate G–19 is applied to the $S_2$ input of each of the "and" gates G–16 and G–17 priming these gates for operation. As aforementioned, input tape A is stopped when the end data symbol is detected by the beta reading head. Specifically, the output signal of flip-flop FF–3 (Fig. 3*a*) is furnished to an input of seven-channel buffer G–18 (Fig. 3*b*). The output signal of seven-channel buffer G–18 is applied to the set input of both flip-flops FF–5 and FF–6. The output signals of flip-flops FF–5 and FF–6 are respectively applied to the $S_1$ inputs of "and" gates G–16 and G–17. The output signals of "and" gates G–16 and G–17 are passed through dual buffer G–21 to the respective stop input of the output tape C and output tape D drive mechanisms.

(5.5.2.A) *Explanation of the circuit responsive to the EDA$\beta$ signal for stopping the output tapes*

The presence of the EDA$\beta$ signal indicates that all of the units of information have been transferred from the input tapes A and B to the output tapes C and D, and that the end data symbol has been transferred from input tape A to both the output tapes C and D. Therefore, output tapes C and D should be stopped.

(5.5.3) *Circuit for stopping the output tapes when an input tape is caused to be stopped*

The conditional stop tape A signal is furnished at the output of flip-flop FF–3 (Fig. 3*a*). This output signal is applied to an input of seven-channel buffer G–18 (Fig. 3*b*). Likewise, the conditional stop tape B signal is furnished at the output of flip-flop FF–4 (Fig. 3*a*). This latter output signal is also applied to an input of seven-channel buffer G–18 (Fig. 3*b*). The output signal of seven-channel buffer G–18 is applied to the set input of flip-flops FF–5 and FF–6 respectively. The one of the flip-flops FF–5 and FF–6 which corresponds to the running output tape is in the reset condition. Thus, either flip-flop FF–5 or FF–6, in turn, furnishes an output signal to the $S_1$ input of the corresponding "and" gate G–16 or G–17. If the conditions for stopping an output tape, as described above, are satisfied, "and" gate G–19 furnishes an output signal to the $S_2$ input of "and" gates G–16 and G–17. Therefore, the "and" gate G–16 or G–17 which is primed by the output signal of flip-flop FF–5 and FF–6, respectively, furnishes an output signal which is passed through dual buffer G–21 to the stop input of the tape drive mechanism of the running output tape.

(5.5.3.A) *Explanation of the circuit for stopping the output tapes when an input tape is caused to be stopped*

If, at any time, an input tape is stopped, the output tape which is running should also be stopped in order that an input tape and an output tape can be restarted in synchronism.

(5.5.4) *Circuit for stopping an output tape when the intermessage spacing is excessive*

Whenever the intermessage spacing is excessive, a signal is furnished by the dead space detector 62 (Fig. 3*d*). The output signals indicating excessive spacing of messages on input tape A or input tape B are furnished by the dead space detector 62 and the signals are each applied to a different one of the inputs of seven-channel buffer G–18 (Fig. 3*b*). The output signal of buffer G–18 is applied to the set input of flip-flops FF–5 and FF–6. The one of these flip-flops which corresponds to the running output tape is in the reset condition and, therefore, furnishes an output signal to the $S_1$ input of the corresponding "and" gate G–16 or G–17. The conditions for stopping an output tape are set up in "and" gate G–19 as described above. The output signal of "and" gate G–19 is applied to the $S_2$ input of "and" gates G–16 and G–17 respectively. The output signal of the "and" gate G–16 or G–17 which is primed by the output signal of the corresponding flip-flop FF–5 or FF–6 is passed through dual buffer G–21 to the stop input of the drive mechanism of the output tape which is running.

(5.5.4.A) *Explanation of circuit for stopping an output tape when the intermessage spacing is excessive*

If the intermessage spacing of the messages encoded on an input tape is excessive, that particular input tape is allowed to run and the corresponding output tape to which the messages are transferred is stopped. This procedure was previously described in connection with the input tape A and input tape B descriptions.

(5.6.1) *Circuit responsive to the start pass and an input tape start signal*

The start pass signal is applied directly to an open input of gate G–34 (Fig. 3*d*). The start pass signal is also passed through dual buffer G–36 to a close input of gate G–35. Either input tape A or input tape B may be started at the beginning of a pass depending upon the output signal received from the comparator 71 (Fig. 2). The start tape A and start tape B signals which are furnished by the outputs of "and" gates G–27 (Fig. 3*c*) and G–31 respectively, are each applied to an input of gate G–33 (Fig. 3*d*). However, gate G–33 remains closed until the first stop tape B signal is received as explained above. Upon receipt of the first stop tape B signal, gate G–33 is opened and subsequent start tape A or start tape B signals are passed through gate G–33 to an input of gates G–34 and G–35 respectively. But gate G–34 has been opened by the start pass signal and gate G–35 closed by the same start pass signal. Therefore, only gate G–34 passes the signal received from gate G–33 to the set input of flip-flop FF–9. The output signal of flip-flop FF–9 passes through the one-step tester unit to the start input of the tape C drive mechanism.

(5.6.1.A) *Explanation of circuit responsive to the start pass and an input tape start pass signal*

At the start of a pass, the first output tape started is output tape C. This choice is arbitrary since logically either output tape C or output tape D may be selected.

(5.6.2) *Circuit responsive to the output signal of predetermined counters A and B and an input tape start signal for selecting output tape C*

An output signal is furnished by "and" gate G–4 (Fig. 3*a*) whenever both predetermined counters A and B indicate that a full string has been transferred from input tapes A and B respectively. The output signal of gate G–4 (Fig. 3*a*) passes through the RY–1B contacts of relay RY–1 to the set input of flip-flop FF–11 (Fig. 3*d*). Flip-flop FF–11 furnishes either one of two output signals as explained previously. The output signal from flip-flop FF–11 indicating odd occurrences of a set input signal is passed through switch S–6B to a close input of gate G–34 and to an open input of gate G–35 respectively. The output signal from flip-flop FF–11 indicating even occurrences of a set input signal is passed through switch S–6A and dual buffer G–36 to an open input of gate G–34 and to a close input of gate G–35 respectively. Thus, gate G–34 is opened each time an even string is transferred from both input tapes to an output tape.

The output signal of "and" gate G–27 (Fig. 3*c*) which serves to start tape A and the output signal of "and" gate G–31 which serves to start tape B are respectively applied to the input of gate G–33. The output signal of gate G–33 (Fig. 3*d*) passes through gate G–34 to the set input of flip-flop FF–9. The output signal of flip-flop FF–9 is passed through the one-step tester to the start input of the tape C drive mechanism.

(5.6.2.A) *Explanation of circuit for selecting output tape C*

Odd strings of messages are recorded on output C. Therefore, gate G–34 is opened after each even occurrence of an input signal at the set input of flip-flop FF–11.

(5.6.3) *Circuit responsive to the output signal of predetermined counters A and B and an input tape start signal for selecting output tape D*

The output signal of flip-flop FF–11, indicating odd occurrences of a set input signal, is passed through switch S–6B to a close input of gate G–34 and to an open input of gate G–35 respectively. Thus, gate G–35 is opened each time an odd string is transferred to an output tape. The output signal of "and" gate G–27 (Fig. 3*c*) which serves to start tape A, and the output signal of "and" gate G–31 which serves to start tape B, are respectively applied to the input of gate G–33 (Fig. 3*d*). The output signal of gate G–33 is passed through "opened" gate G–35 to the set input of flip-flop FF–10. The output signal of flip-flop FF–10 is passed through the one-step tester unit to the start input of the tape D drive mechanism.

(5.6.3.A) *Explanation of circuit for selecting output tape D*

Even strings of messages are recorded on output tape D. Therefore, gate G–35 is opened after each odd occurrence of an input signal at the set input of flip-flop FF–11.

(5.6.4) *Circuit responsive to the EDAα and EDBα signals for selecting output tapes C and D*

The EDAα and EDBα signals are respectively applied to the $S_1$ and the $S_2$ inputs of the two-input "and" gate G–23 (Fig. 3*c*). The output signal of gate G–23 passes through the closed contacts of relay RY–1D to the switch S–6C (Fig. 3*d*). The signal appearing at switch S–6C is passed through S–6C directly to an open input of gate G–35. The signal appearing at switch S–6C is also passed through dual buffer G–35 to an open input of gate G–34. The start tape A signal is furnished by "and" gate G–27 (Fig. 3*c*) to the set input of flip-flop FF–7. This start signal is also applied to an input of gate G–33 (Fig. 3*d*) which is in an open condition due to a stop tape B signal having been received previously. The output signal of gate G–33 is applied to an input of gates G–34 and G–35 respectively. Because both these latter gates are open, an output signal is furnished to the set inputs of flip-flops FF–9 and FF–10 respectively. The output signal of flip-flop FF–9 is passed through the one-step tester to the start input of the tape C drive mechanism. The output signal of flip-flop FF–10 is passed through the one-step tester to the start input of the tape D drive mechanism.

(5.6.4.A) *Explanation of circuit responsive to the EDAα and EDBα signals for selecting output tapes C and D*

As aforementioned, when the end data symbol is detected by the alpha reading heads of input tapes A and B, both input tapes and output tapes are stopped. Input tape A is then started and the end data symbol is detected by the beta reading head of input tape A and transferred to both output tapes C and D.

(5.7) *Initial split*

The initial split is a separate operation which is automatically performed when a sort operation is ordered. In the usual case, the information which is to be sorted appears on a single input tape. This input tape is placed in the tape A position, and the system automatically transfers the messages from the A tape to the C and D output tapes alternately.

According to the "strings-of-two" method of sorting, the number of messages which constitute a full string is increased by a factor of two as each new pass commences. In order to accomplish the initial split, the predetermined counters A and B are each provided with a stepping relay (not shown) which operates to switch the output of the predetermined counters to the proper flip-flop in the binary chain. Stepping relays are well-known and the manner of connecting them to operate with the predetermined counters A and B will be apparent to those skilled in the art.

The stepping relays are placed in their "homed" position by means of the push-button 66 shown in Fig. 3*a*. The predetermined counters produce one output signal for each input signal when the stepping relays are in the "homed" position.

The relay contacts RY–1 are shown in Fig. 3 in their normal or unenergized condition. However, during the interval wherein the stepping relays are in the "homed" position, a contact (not shown) is made in predetermined counter A which switches the coil of the relay RY–1 to a D.C. potential. With the coil of relay RY–1 energized, the contacts of the relay are in a position opposite to that shown in Fig. 3 and the logic is switched from the sort operation to the initial split operation.

At the start of the initial split operation, the start pass button is operated thereby causing a signal to be generated by the start pass initiator circuit 60 (Fig.. 3*a*). The output signal from the start pass initiator 60 is applied to an input of delay unit D–11 (Fig. 3*c*). The output signal of delay unit D–11 passes through gates G–24 and G–25 to the $S_1$ input of five-input D.C. "and" gate G–27. "And" gate G–27 furnishes an output signal to the set input of flip-flop FF–7. The output signal of flip-flop FF–7 is passed through the one-step tester unit to the start input of the tape A drive mechanism. The output signal of "and" gate G–27 is also passed through the lower contacts of relay RY–1C (Fig. 3*d*) to the input of gate G–34 which is in the opened condition due to the presence of the start pass signal. The output signal of gate G–34 is applied to the set input of flip-flop FF–9. The output signal of flip-flop FF–9 is passed through the one-step tester unit to the start input of the tape C drive mechanism.

During the initial split operation, the first message encoded on tape A is transferred to output tape C, the second message encoded on tape A is transferred to output tape D, the third message encoded on tape A is transferred to output tape C, and so on alternately.

Because the stepping relays associated with predetermined counter A (Fig. 3*a*) is set in the "home" position, predetermined counter A furnishes an output signal upon receipt of each input signal furnished by gate G–1. Gate G–1 is closed by the start pass signal and opened by the SMA$\beta$ signal; therefore, gate G–1 is responsive to each start message signal subsequent to that of the 1st message.

However, the EDA$\alpha$ and the EDB$\alpha$ signals are applied as inputs to the gates G–1 and G–2 respectively to insure, when necessary, that the A and B counters count all the messages read from the input tapes A and B.

The output signal of predetermined counter A passes through the lower contact of relay RY–1B (Fig.. 3*a*) to the input of flip-flop FF–11 (Fig. 3*d*). The odd strings output of flip-flop FF–11 passes through switch S–6B to a close input of gate G–34 and to an open input of gate G–35.

The start pass signal is applied to an input of seven-channel buffer G–10 (Fig. 3*a*) and passed therethrough to the set input of flip-flop FF–3. The output signal of flip-flop FF–3 is applied to the $S_1$ input of "and" gate G–11 (Fig. 3*b*). As previously explained, "and" gate G–12 is responsive to the SMA$\alpha_{(n+1)}$ and EMA$\beta_{(n)}$ signals and furnishes an output signal to the $S_2$ input of "and" gate G–11. The output signal of "and" gate G–11 is passed through dual buffer G–20 to the stop input of the tape A drive mechanism. Thus, tape A is stopped after the first message is read out to output tape C.

It was previously pointed out that each stop tape A signal furnished by "and" gate G–11 is passed through delay D–13 (Fig. 3*c*) to the $S_1$ input of gate G–26, and that gate G–26 is primed by the start tape A output signal of "and" gate G–27. Therefore, unless gate G–26 is reset by a start tape B signal or the EDA$\beta$ signal, input tape A is restarted each time it is stopped until the EDA$\beta$ signal resets gate G–26.

The output signal of gate G–27 is passed through the upper contacts of relay RY–1C (Fig. 3*d*) to the inputs of gates G–34 and G–35.

Therefore, gate G–35, which is opened by the odd string output signal of flip-flop FF–11, furnishes an output signal to the set input of flip-flop FF–10 each time input tape A is restarted subsequent to the transfer of an odd string. The output signal of flip-flop FF–10 is passed through the one-step tester unit to start output tape D. In a like manner, the even string output signal from flip-flop FF–11 operates to open gate G–34 and close gate G–35. Thus, each time input tape A is restarted, subsequent to the transfer of an even string, an output signal is furnished by gate G–34 to the set input of flip-flop FF–9. The output signal of flip-flop FF–9 is passed through the one-step tester unit to start output tape C. It should be noted that during the initial split operation, a string consists of a single message.

Each of the start output tape C or start output tape D signals furnished by flip-flops FF–9 and FF–10 is respectively applied to the corresponding reset input of flip-flops FF–5 and FF–6 (Fig. 3*b*). The output signal of predetermined counter A (Fig. 3*a*) is passed through the lower contacts of relay RY–1B (Fig. 3*a*), and the "S" contacts of switches S–7B and S–7A (Fig. 3*b*) to the set inputs of flip-flops FF–5 and FF–6 respectively. Thus, the one of the flip-flops FF–5 or FF–6, which previously was reset, furnishes an output signal to the $S_1$ input of the corresponding "and" gate G–16 or G–17. The $S_2$ inputs of "and" gates G–16 and G–17 receive an input signal from the two-input "and" gate G–19. Again, "and" gate G–19 does not furnish an output signal until an entire message has been transferred to the running output tape. The output signal of gate G–16 is passed through dual-buffer G–21 to the stop input of the tape C drive mechanism; the output signal of gate G–17 is passed through dual-buffer G–21 to the stop input of the tape D drive mechanism. Thus, output tapes C and D are started and stopped alternately.

Input tape A is stopped as soon as the end data symbol is detected by the alpha reading head because the EDA$\alpha$ symbol indicates that there are no messages remaining on input tape A. The EDA$\alpha$ signal is passed through seven-channel buffer G–9 (Fig. 3*a*) to the set input of flip-flop FF–3. The output signal of flip-flop FF–3 is applied to the $S_1$ input of two-input "and" gate G–11 (Fig. 3*b*). The $S_2$ input of "and" gate G–11 is actuated by the output signal of "and" gate G–12 wherein the conditions for stopping tape A are set up as described in connection with the description of the sort operation above. The output signal of gate G–11 is passed through dual buffer G–20 to the stop input of the tape A drive mechanism.

The output signal from flip-flop FF–3 (Fig. 3*a*) is also applied to an input of seven-channel buffer G–18 (Fig. 3*b*). The output signal of buffer G–18 is applied to the set inputs of flip-flops FF–5 and FF–6, thereby causing the one of the output tapes which is running to be stopped, as described above.

In the initial split operation, the end data symbol is transferred to both output tapes C and D from input tape A. Thus, when the ED symbol is detected by the alpha reading head of tape A, an EDA$\alpha$ signal is passed through the lower contacts of relay RY–1D (Fig. 3*c*) and through switch S–6C (Fig. 3*d*) to an open input of gate G–36. In addition, the EDA$\alpha$ signal is passed through dual buffer G–36 to an open input of gate G–34. Tape A is brought to a stop when the EDA$\alpha$ signal is received. However, as described in the above paragraphs, if the EDA$\beta$ signal is not present, tape A is restarted due to the operation of gate G–26 (Fig. 3*c*) which furnishes an output signal to the $S_1$ input of gate G–27. The output signal of gate G–27 is passed through the upper contacts of switch RY–1C (Fig. 3*d*) to the inputs of gates G–34 and G–35 respectively. The output signals of gates G–34 and G–35 are applied to the set inputs of flip-flops FF–9 and FF–10 respectively. Tapes C and D are thus both started along with input tape A and the end data symbol is detected by the beta reading head of input tape A and transferred to both output tapes C and D.

After the end data symbol is transferred, both output tapes C and D, and input tape A are stopped as described previously in connection with the sort operation.

During the initial split operation, input tape B is not started. Relay RY–1A (Fig. 3*a*) disconnects the output of gate G–7 from the remainder of the system. It is necessary to disconnect gate G–7 because, as explained previously, during the sort operation, gate G–7 furnishes a conditional start B signal when the comparator 71 (Fig. 2) output signal indicated that $A>B$, and also when predetermined counter A (Fig. 3*a*) indicated that a full string has been transferred from input tape A.

The EDA$\beta$ signal is also applied to an open input of gate G–3 (Fig. 3*a*). The EDA$\beta$ signal is also applied to the rewind input of each of the tape drive mechanisms as described hereinafter. Upon the completion of the rewinding of each of the tapes, a signal is generated by each of the aforementioned photoelectric devices which detects the passage of the physical front end of each of the tapes. The output of the "and" gate associated with each of the photoelectric devices is applied as a rewind completed signal to an input of gate G–3. The output signal of gate G–3 is applied to the stepping relays associated with the predetermined counters A and B causing these stepping relays to advance from the "home" position to the first pass position. Relay RY-1 thereupon is deenergized because the D.C. potential which is applied to its coil when the stepping relays are in the "home" position is removed. Thus, the circuits of the logical control unit (Figs. 3*a*–3*d*) are switched to that required for the sorting operation.

(6) *Merging*

In the merging operation, it is assumed that the messages on the input tapes have been previously arranged thereon in an ascending order. The sorting criterion of the first message on the A tape is compared with the sorting criterion of the first message on the B tape, and the lesser is transferred to output tape C. The input tape from which the message was transferred is advanced and the sorting criterion of the second message is compared with the sorting criterion of the first message on the other input tape. The lesser of these latter two messages is then transferred to output tape C following the first message previously transferred. This procedure is continued until all the messages on the input tapes are transferred to output tape C. In case the physical end-of-tape C signal ET (Phy) C is detected by the detector 50 (Fig. 2) which is associated with output tape C, the merging operation is stopped and then started again with the remainder of the messages being transferred to output tape D.

The merging operation is a single-pass operation. Thus, as soon as the end data symbol is detected by the beta reading head of input tape A, all tapes are stopped and a rewind signal is furnished to the tape drive mechanisms.

During the merging operation, the four-position switches in the logical control unit are set to the "M" position. In order to reduce duplication in the description of the merge operation, the description is given in a brief fashion because of its similarity to the sorting operation. Just as was the case in the sorting operation, a conditional start or stop signal is generated for each of the tapes but does not become effective until certain conditions have been satisfied. In the following subparagraphs, a brief description of the circuit of the logical control unit 73 (Fig. 2) which are responsive to the various combinations of input signals is set out in terms of the tapes operated thereby. Although the explanation refers to messages, it is to be understood that the merging operation may be accomplished in a like manner when the unit of information is a document. In the case of documents, the sorting criterion is selected from individual "header" messages.

(6.1.1) *Circuit responsive to the A=B or A<B signals*

Input tape A is started when the output signal of the comparator 71 (Fig. 2) indicates that the sorting criterion of the first message encoded on input tape A is equal to, or less than, the sorting criterion of the first message encoded on input tape B unless the end data symbol has been detected by the alpha reading head of input tape A, or the end data symbol has been detected by the alpha reading head of input tape B.

The circuit for this condition is the same as that set out in paragraph 5.1.1 above, except that gates G-5 and G-6 are bypassed by the leads connected respectively to switches S-1A—S-1B, and S-2A—S-2B. The gates G-5 and G-6 are bypassed because the predetermined counters A and B are not required for the merge operation.

(6.1.2) *Circuit responsive to the EDBα signal*

When the end data symbol is detected by the alpha reading head of input tape B and, in addition, the end data symbol has not been detected by the alpha reading head of input tape A, input tape A should be started because there are no additional messages remaining on input tape B.

The circuit for this situation is the same as that of paragraph 5.1.3 above.

(6.1.3) *Circuit responsive to the EDAα and EDBα signals*

The end data symbol is transferred to both output tapes by the beta reading head of input tape A just as is the case in the sorting operation. Therefore, when the end data symbol is detected by the alpha reading heads of input tape A and input tape B, input tape A should be started.

This circuit is the same as that described in paragraph 5.1.4 above.

(6.1.4) *Circuit for restarting input tape A*

If, at any time, input tape A receives a stop signal, for example, because of inter-message spacing, input tape A should be restarted unless the end data symbol has been detected by the beta reading head of input tape A, or unless a previous start signal has been sent to the start input of the tape B drive mechanism.

This circuit is the same as that described in paragraph 5.1.5 above.

(6.1.5) *Circuit responsive to the start pass signal*

Because the merge operation is commenced by starting input tape A, the system responds to the start pass signal by causing input tape A to be started. The circuit is the same as that described in paragraph 5.1.6, with the exception that the start pass signal now serves to set up the various gates and flip-flops for the merge operation. The four-position switches are placed in position "M."

(6.2.1) *Circuit responsive to the A>B signal*

At the start of the merge operation, the sorting criterion of the first message encoded on input tape A is read into the A memory unit 53 (Fig. 2), then input tape B is started and the sorting criterion of the first message encoded on input tape B is read into the B memory unit 57 (Fig. 2). Because the B memory unit is empty at the start of a pass, the comparator output signal indicates that *A>B*. Likewise, because the end data symbol has not been detected by the alpha reading heads of the A or B input tapes, input tape B is started.

The circuit is the same as that described in paragraph 5.2.1 except that gates G-5 and G-6 (Fig. 3*a*) are bypassed as aforementioned and gate G-33 (Fig. 3*d*) is closed because the first stop B signal has not been received.

(6.2.2) *Circuit responsive to the EDAα signal*

Input tape B should be started when the end data symbol is detected by the alpha reading head of input tape A indicating that there are no messages remaining on input tape A, unless the end data symbol has also been detected by the alpha reading head of input tape B.

The circuit is the same as that described in paragraph 5.2.3.

(6.2.3) *Circuit for restarting input tape B*

If, at any time, input tape B is stopped, it is restarted unless the end data symbol is detected by the alpha reading head, or a start signal has been sent to the start input of the tape A drive mechanism.

The circuit is the same as that described in paragraph 5.2.4.

(6.3.1) *Circuit for starting an output tape in response to the start pass signal and the start signal for an input tape*

In the merge operation, the messages are transferred to output tape C. However, if output tape C becomes filled, then the remaining messages on the input tapes are transferred to output tape D. The contacts of switch S–6A and S–6B (Fig. 3*d*) are disconnected from the output of flip-flop FF–11 during the merge operation.

The circuit is the same as that described in paragraph 5.6.1 with the exception that gate G–34 remains in its open condition and gate G–35 remains in its closed condition until the ET (Phy) C signal is received. The ET (Phy) C signal is passed through the "M" contact of switch S–6B to the close input of gate G–34 and the open input of gate G–35. The next start tape A or start tape B signal of gates G–27 (Fig. 3*c*) and G–31 respectively is passed through gate G–33 (Fig. 3*d*) to the input of gate G–35. The output signal of gate G–35 is applied to the set input of flip-flop FF–10. The output signal of flip-flop FF–10 is applied to the start input of the tape D drive mechanism.

(6.4.1) *Circuit responsive to the start pass and SMAα signals*

The sorting criterion of the first message on input tape A must be read into the A memory unit 53 (Fig. 2) before input tape A is stopped. The conditions for stopping input tape A are set up in gate G–12 (Fig. 3*b*) as was the case in the sort operation.

The circuit for stopping input tape A at the beginning of the merge operation is the same as that described in paragraph 5.3.1.

(6.4.2) *Circuit responsive to the $A>B$, the $SMA\alpha_{(n+1)}$ and the $EMA\beta_{(n)}$ signals*

Input tape A should be stopped when the comparator unit indicates that $A>B$ provided the entire "nth" message has been transferred and the sorting criterion of the $(n+1)$th message has been detected by the alpha reading head of input tape A.

The circuit is the same as that described in paragraph 5.3.2.

(6.4.3) *Circuit responsive to the EMAβ and EDAα signals*

When the end data symbol is detected by the alpha reading head of input tape A, it indicates that there are no remaining messages on input tape A. Thus, input tape A should be stopped when the beta reading head has indicated the last character of the final message has been detected.

The circuit is the same as that set out in paragraph 5.3.4.

(6.4.4) *Circuit responsive to the EDAβ signal*

Input tape A is stopped when the beta reading head detects the end data symbol indicating that the end data symbol has been transferred to output tapes C and D as is the case in the sort operation.

The circuit is the same as that described in paragraph 5.3.5.

(6.4.5) *Circuit for stopping input tape A when an output tape is caused to be stopped*

If, for any reason, either of the output tapes is stopped, then the input tapes are also stopped in order that the tapes may be restarted in synchronism.

The circuit is the same as that described in paragraph 5.3.6.

(6.5.1) *Circuit responsive to the start pass and SMBα signals*

At the start of a pass, the sorting criterion of the first message encoded on input tape B is read into the B memory unit and thereupon input tape B is stopped. The conditions for stopping input tape B are set-up in gate G–14.

The circuit is the same as that set out in paragraph 5.4.1.

(6.5.2) *Circuit responsive to the $A<B$ or $A=B$ and the SMBα and EMBβ signals*

If the comparator indicates that the sorting criterion of a message encoded on input tape $A\leqslant B$, then input tape B should be stopped.

The circuit is the same as that described in paragraph 5.4.2 with the exception that the switches S–2A, S–2B, and S–2C are set to the "M" position.

(6.5.3) *Circuit responsive to the EDBα and EMBβ signals*

If the end data signal is detected by the alpha reading head of input tape B, input tape B should be stopped because no more messages remain on this tape.

The circuit is the same as that described in paragraph 5.4.4.

(6.5.4) *Circuit for stopping input tape B when an output tape is caused to be stopped*

Whenever an output tape is stopped, a stop signal is also applied to the input tapes in order to insure that the tapes are restarted in synchronism.

The circuit is the same as that described in paragraph 5.4.5.

(6.5.5) *Circuit responsive to the ET (Phy) C signal for stopping tape C*

The signal indicating the physical end of output tape C is applied directly through the "M" contact of switch S–7B (Fig. 3*b*) to the set input of flip-flop FF–5. The output signal of flip-flop FF–5 is applied to the $S_1$ input of the two-input "and" gate G–16. The conditions for stopping output tape C are set up in "and" gate G–19. Thus, output tape C is not stopped until both the start message and the end message symbols of the "*n*th" message have been detected by the beta reading head of the input tape from which the "*n*th" message is being transferred. The start message signal SMBβ or SMAβ (depending upon which input tape is running) is passed through delay unit D–9 to the $S_2$ input of "and" gate G–19. The corresponding end message signal EMAβ or EMBβ is passed through delay unit D–10 to the $S_2$ input of "and" gate G–19. The output signal of "and" gate G–19 is applied to the $S_2$ input of the two-input "and" gate G–16 causing this gate to furnish an output signal which is passed through dual buffer G–21 to the stop input of the tape C drive mechanism.

(6.5.5.A) *Explanation of circuit responsive to the ET (Phy) C signal for stopping tape C*

In the merge operation, the messages are transferred to output tape C. However, if the physical end of tape C signal is received, as indicated by the presence of the ET (Phy) C signal, output tape C should be stopped.

(6.5.6) *Circuit for stopping the running output tape when an input tape is caused to be stopped*

If, at any time, an input tape is stopped, the output tapes are also stopped in order that the tapes can be restarted in synchronism.

The circuit is identical to that described in paragraph 5.5.3.

(6.5.7) *Circuit for stopping an output tape when the intermessage spacing on the running input tape is excessive*

If the intermessage spacing of the messages encoded on an input tape is excessive, the output tapes should be stopped.

The circuit is the same as that described in paragraph 5.5.4.

(7) *Extract by class*

The third basic operation performed by the system is the extract-by-class operation. In the extract-by-class operation, input tape B is used only to insert the class item into the B memory unit 57 (Fig. 2). The class item is recirculated in the B memory unit as each new sort criterion is read into the A memory unit from input tape A. The messages which are selected are transferred to output tape C. The nonselected messages are transferred to output tape D. Messages may be selected on the basis of $A<B$ or $A=B$ or $A>B$. The extract-by-class operation is commenced by starting input tape B and reading the class item into the B memory unit 57. The four position switches in the logical control unit (Figs. 3*a*–3*d*) are set to position C. In addition, switch S–10–A (Fig. 3*c*) is placed on the inject position "INJ."

The start pass button (Fig. 3*a*) is closed causing the start pass initiator 60 to generate an output signal thereby, setting up the various gates and flip-flops of the logical control unit (Figs. 3*a*–3*d*). The output signal of the start pass initiator 60 is also passed through delay unit D–11 (Fig. 3*c*), and switch S–10–A to an input of seven-channel buffer G–30. The output of buffer G–30 is applied to the S1 input of five-input "and" gate G–31. The start pass signal is applied to both sides of the dual buffer G–28. The output signal of the right side of dual buffer G–28 (as viewed in the drawing) is passed through the brake time delay D–16 to the S2 input of "and" gate G–31. The output signal of the left side of dual buffer G–28 is applied to the S3 input of "and" gate G–31. The start pass signal is also applied to both sides of dual buffer G–32. The output signal of the right side of dual buffer G–32 (as viewed in the drawing) is applied to the S4 input of "and" gate G–31, and the output signal of the left side of dual buffer G–28 is applied to the S5 input of "and" gate G–31. The output signal of "and" gate G–31 is applied to the set input of flip-flop FF–8. The output signal of flip-flop FF–8 is passed through the one-step-tester unit to the start input of the tape B drive mechanism.

Switch S–10–B disconnects the output of seven-channel buffer G–25 from the input of "and" gate G–27. As soon as the class item is read into the B memory unit 57 (Fig. 2) input tape B is stopped as described hereinafter. Switch S–10–A (Fig. 3*c*) and switch S–10–B are returned manually to their normal position "norm."

The criteria for the extract-by-class operation are set up by switch S–8–C (Fig. 3*c*). In the extract by class operation, the predetermined counters A and B (Fig. 3*a*) are unnecessary; therefore, gates G–5 and G–6 (Fig. 3*a*) are bypassed by the leads connected respectively to switches S–1–A—S–1–B and S–2–A—S–2–B. At the start of the operation, the sorting criterion of the first message encoded on input tape A is read into the A memory unit 53 (Fig. 2). The comparator 71 then operates to compare the sorting criteria and furnishes an appropriate output signal. If the output signal of the comparator 51 is in accordance with the extract criteria set up by switch S–8–C (Fig. 3*c*) output tape C is started. On the other hand, if the output signal of the comparator 71 (Fig. 2) is not in accordance with the extract criteria set up by switch S–8–C (Fig. 3*c*), output tape D is started. The first message encoded on input tape A is then transferred to one or the other of the output tapes and the sorting criterion of the second message encoded on input tape A is read into the A memory unit, etc. The extract-by-class operation is a single-pass procedure. Thus, as soon as the end data symbol is detected by the beta reading head of input tape A, all tapes are stopped and a rewind signal is furnished to the tape drive mechanisms. The detailed description of the extract-by-class operation is given in terms of the tapes which are controlled by the various combinations of signals. The circuits which are analogous to those of the sorting operation are referenced thereto. It should be noted that the class item may consist of any item selected from the sorting criterion of a message encoded on input tape B.

(7.1.1) *Circuit responsive to the start pass signal*

At the start of the extract-by-class pass, the sorting criterion of the first message encoded on input tape A is read into the A memory unit 57 (Fig. 2). The circuit is the same as that described in paragraph 5.1.6.

(7.1.2) *Circuit for restarting input tape A*

If, for any reason, input tape A is stopped, it must be started again unless the end data symbol has been detected by the beta reading head of input tape A. The circuit is the same as that described in paragraph 5.1.5.

(7.2.1) *Circuit responsive to the start tape A signal for starting an output tape*

The first start A signal from gate G–27 (Fig. 3*c*) is applied to an input of gate G–33 (Fig. 3*d*). However, gate G–33 is closed by the start pass signal which is applied to its close input. Gate G–33 is not opened until the first stop A signal is passed through the "C" contact of switch S–5–B to its open input. Subsequent start A signals are passed through gate G–33. The output signal of gate G–33 is applied to the input of gates G–34 and G–35. The gates G–34 and G–35 are used for selecting the output tape which is to be started.

(7.2.1.A) *Explanation of circuit responsive to the start tape A signal for starting an output tape*

At the start of a pass, neither of the output tapes are started because the sorting criterion of the first message encoded on input tape A must be read into the A memory unit 53 (Fig. 2) in order that a comparison may be made between the class item previously stored and the sorting criterion of the first message. The selection of either output tape C or output tape D is determined by the output signal furnished by the comparator 71 (Fig. 2).

(7.3.1) *Circuit responsive to the start pass and SMAα signals*

Input tape A should be stopped when the sorting criterion of the first message is read by the alpha reading head in order that input tape A and the selected output tape can be started in synchronism. The circuit is the same as that described in paragraph 5.3.1.

(7.3.2) *Circuit responsive to the EMAβ and EDAα signals*

Input tape A should be stopped when the alpha reading head detects the end data symbol indicating that there are no additional messages encoded on input tape A. However, the last character of the final message must have been detected by the beta reading head before input tape A is stopped. The circuit is the same as that described in paragraph 5.3.4.

(7.3.3) *Circuit responsive to the EDAβ signal*

Input tape A should be stopped when the EDAβ symbol is present, indicating that the end data symbol has been detected by the beta reading head of input tape A, and transferred to output tapes C and D. The circuit is the same as that described in paragraph 5.3.5.

(7.3.4) *Circuit for stopping input tape A when an output tape is caused to be stopped*

If, for any reason, either of the output tapes are stopped, input tape A should also be stopped in order that the tapes may be restarted in synchronism. The circuit is the same as that described in paragraph 5.3.6.

(7.4.1) *Circuit responsive to the non-selected signals furnished by comparator 51 (Fig. 2)*

The non-selected signals (in this example $A>B$ and $A<B$) are applied to an input of the right-hand side of dual buffer G–22 (Fig. 3*c*). The output signal of gate G–22 is passed through the "C" contact of switch S–6–B (Fig. 3*d*) to the close input of gate G–34 and to the open input of gate G–35. The output signal of dual buffer G–22 is also applied through the "C" contact of switch S–7–B (Fig. 3*b*) to the set input of flip-flop FF–5. The output signal of flip-flop FF–5 is applied to the $S_1$ input of two-input "and" gate G–16. The input to the S2 side of "and" gate G–16 is furnished by the output of gate G–19 wherein the prerequisites to stopping output tape C are set up as described heretofore (i.e. a complete message has been transferred from an input tape). The output signal of gate G–16 is passed through dual buffer G–21 to the stop input of the tape C drive mechanism.

(7.1.4.A) *Explanation of circuit responsive to the non-selected signals of comparator 71 (Fig. 2)*

As aforementioned, the extraction criterion is set up by switch S–8–C (Fig. 3*c*). If, for example, the extraction is made on the basis of the sorting criterion of the A message being equal to the class item stored in the memory unit B, 53 (Fig. 2) and if, while a message is being transferred to output tape C, the new comparison indicates that the sorting criterion of the $(n+1)$th message is greater, or less than, the class item then output tape C should be stopped.

(7.4.2) *Circuit for stopping an output tape when input tape A is stopped*

Whenever input tape A is stopped for any reason, then the running output tape is also stopped so that input tape A and the appropriate output tape can be restarted in synchronism. The circuit is the same as that described in paragraph 5.5.3.

(7.4.3) *Circuit for stopping output tape C when the intermessage spacing on input tape A is excessive*

Whenever the intermessage spacing of the messages encoded on input tape A is excessive, output tape C is stopped in order to allow the intermessage spacing on output tape C to be corrected. The circuit is the same as that described in paragraph 5.5.4.

(7.5.1) *Circuit responsive to the selected signals furnished by the comparator 71 (Fig. 2)*

When the output signal of comparator 71 (Fig. 2) corresponds to the setting of switch S–8–C (Fig. 3*c*) the signal from the comparator unit 71 (Fig. 2) passes through the contacts of switch S–8–C and through the "C" contact of switch S–6–A (Fig. 3*d*) to an input of each side of dual buffer G–36. The output signal of the left side of gate G–36 (as viewed in the drawing) is applied to the close input of gate G–35. The output signal of the right side of gate G–36 is applied to the open input of gate G–34. The selected signal is also passed through the contacts of switch S–8–C and through the "C" contact of switch S–7–A (Fig. 3*b*) to the set input of flip-flop FF–6. As previously described flip-flop FF–6 is reset each time the output tape D is started. The resetting signal is furnished by the output signal of flip-flop FF–10 (Fig. 3*d*). The output signal of flip-flop FF–6 (Fig. 3*b*) is applied to the $S_1$ input of two-input "and" gate G–17. The conditions for stopping output tape D are set up in gate G–19 (i.e. a complete message is transferred). Therefore, gate G–19 responds to the SMA$\beta$ and EMA$\beta$ signals. The output signal of gate G–19 is applied to the $S_2$ input of "and" gate G–17. The output signal of gate G–17 is passed through dual buffer G–21 to the stop input of the output tape D drive mechanism.

(7.5.1.A) *Explanation of the circuits responsive to the selected signals furnished by the comparator 71 (Fig. 2)*

If, during the extract-by-class operation, the sorting criterion of a message encoded on input tape A has the desired relationship to the class item which is stored in the B memory unit 53 (Fig. 2), then this message is transferred to output tape C. Accordingly, output tape D should be stopped if it is running.

(7.5.2) *Circuit for stopping output tape D when input tape A is caused to be stopped*

Whenever input tape A is caused to be stopped, the output tape which is running at that time should also be stopped in order that input tape A and the selected output tape can be restarted in synchronism. The circuit is the same as that described in paragraph 5.5.3.

(7.5.3) *Circuit for stopping output tape D when the intermessage spacing on input tape A is excessive*

If the dead space detector 62 (Fig. 3*d*) detects an excessive intermessage spacing while output tape D is running, then output tape D is stopped in order to allow the intermessage spacing to be corrected. The circuit is the same as that described in paragraph 5.5.4.

(7.6.1) *Circuit responsive to the output signal of comparator 71 (Fig. 2) for selecting output tape C*

The output signal from the comparator unit 71 (Fig. 2) ($A>B$, $A<B$, $A=B$ as selected) passes through the appropriate contact of switch S–8–C (Fig. 3*c*) and through the "C" contact of switch S–6–A (Fig. 3*d*) to an input of each side of dual buffer G–36. The output signal from the left side (as viewed in the drawing) of dual buffer G–36 is applied to the close input of gate G–35. The output signal from the right side of gate G–36 is applied to the open input of gate G–34. The first stop tape A signal is applied through the "C" contact of switch S–5–B to the open input of gate G–33. Subsequent start tape A signals, furnished by the output of five-input "and" gate G–27 (Fig. 3*c*), are passed through gate G–33 and the lower contact of relay RY 1–C to the inputs of gates G–34 and G–35 (Fig. 3*d*). Gate G–34, which is open, passes the output signal of gate G–33 to the set input of flip-flop FF–9. The output signal of flip-flop FF–9 is passed through the one-step-tester unit to the start input of the tape C drive mechanism.

(7.6.1.A) *Explanation of circuit responsive to the comparator 71 (Fig. 2) output signal for selecting output tape C*

When the sorting criterion of a message encoded on input tape A corresponds to the setting of switch S–8, as indicated by the output signal ($A=B$, $A<B$ or $A>B$) of the comparator unit 71 (Fig. 2), tape C is selected to receive the transferred message.

(7.6.2) *Circuit responsive to the EDA$\alpha$ signal for selecting output tape C and output tape D*

The EDA$\alpha$ signal passes through the "C" contact of switch S–6–C (Fig. 3*d*) to the open input of gate G–35 and to the input of the right side of dual buffer G–36 (as viewed in the drawing). The output signal of the right side of dual buffer G–36 is applied to the open input of gate G–34. The subsequent output signal of "and" gate G–27 (Fig. 3*c*) is passed through gate G–33 (Fig. 3*d*) to the input of gates G–34 and G–35. The output signal of gate G–34 is applied to the set input of flip-flop FF–9 and the output signal of gate G–35 is applied to the set input of flip-flop FF–10. The output signal of flip-flop FF–9 is applied to the start input of the tape C drive mechanism, and the output signal of flip-flop FF–10 is applied to the start input of the tape D drive mechanism.

(7.6.2.A) *Explanation of the circuit responsive to the EDAα signal for selecting output tape C and output tape D*

The end data symbol is transferred from input tape A to both output tapes C and D. Therefore, when the end data symbol is detected by the alpha reading head of input tape A output tape C, as well as output tape D, should be selected.

(7.6.3) *Circuit responsive to the comparator 71 (Fig. 2) output signal for selecting output tape D*

The signals from the comparator unit 71 (Fig. 2) which correspond to a nonselected message, as outlined above, are passed through the S–8–A or S–8–B contacts of switch S–8 (Fig. 3*c*) to the right side (as viewed in the drawing) of dual buffer of G–22. The output signal of the right side of dual buffer G–22 is passed through the "C" contact of switch S–6–B (Fig. 3*d*) to the close input of gate G–34 and to the open input of gate G–35. The start tape A signals furnished at the output of gate G–27 (Fig. 3*c*) are passed through opened gate G–33 and the lower contact of relay RY 1–C to the inputs of gates G–34 and G–35. However, only gate G–35 is primed to furnish an output signal which is applied to the set input of flip-flop FF–10. The output signal of flip-flop FF–10 is passed through the one-step-tester unit to the start input of the tape D drive mechanism.

(7.6.3.A) *Explanation of circuit responsive to the comparator 71 (Fig. 2) output signal for selecting output tape D*

The output signals from the comparator unit which do not correspond to the setting of switch S–8 ($A \geqq B$, $A \gtreqless B$ or $A \lesseqgtr B$, depending upon the setting of switch S–8), indicate that the message encoded on input tape A should be transferred to output tape D.

(8) *Extract by list*

The fourth basic operation performed by the system is the extract-by-list operation. In the extract-by-list operation, the messages or units of information are encoded in an ordered arrangement on input tape A. The list of ordered items, for example, an address or a stock number, which form the basis for the extraction, are encoded on input tape B. The extracted messages are transferred to output tape C. At the start of the operation, the sorting criterion of the first message encoded on input tape A is read into the A memory unit 53 (Fig. 2), and the first ordered item encoded on input tape B is read into the B memory unit 57. The basis for the extraction is that the sorting criterion of the A message is equal to the first item encoded on the B input tape. If the comparator unit 71 indicates that the sorting criterion of the first message encoded on input tape A is less than the first item encoded on input tape B, the first message is transferred from input tape A to output tape D; and the sorting criterion of the second message encoded on input tape A is read into the A memory unit 53 (Fig. 2). The messages encoded on input tape A continue to be transferred to output tape D until the comparator unit indicates that the sorting criterion of a message encoded on input tape A is equal to, or greater than, the item stored in the B memory unit 57 (Fig. 2). If the sorting criterion of a message encoded on input tape A is equal to the item stored in the B memory unit, this message is transferred from input tape A to output tape C and the sorting criterion of the following message encoded on input tape A is read into the A memory unit 53. If the comparator unit 71 indicates that the sorting criterion of the message encoded on input tape A is greater than the item stored in the B memory unit 57, input tape B is advanced one position and the following item is read into the B memory unit 57. If the comparator 71 still indicates that the sorting criterion of the message encoded on input tape A is greater than this latter item read from input tape B, input tape B is again advanced and the subsequent item is read into the B memory unit 57. This procedure is continued until the comparator unit 71 indicates that the sorting criterion of the A message is less than, or equal to, the item stored in the B memory unit at which time the input tape A as well as the proper output tapes are then advanced as described above. The extract-by-list operation is also a single-pass procedure. Accordingly, as soon as the end data symbol is detected by the beta reading head of input tape A, all tapes are stopped and a rewind signal is furnished by the tape drive mechanisms. The four position switches of the logical control unit (Figs. 3*a*–3*d*) are set to the "L" position. The list of items encoded on input tape B may consist of messages from each of which a particular item is selected. During the extract-by-list operation no information is transferred from input tape B to an output tape. The circuits are described in terms of the tapes which are controlled by the various combinations of signals. Reference is made to circuits which have been described previously.

(8.1.1) *Circuit responsive to the start pass signal*

At the start of a pass, the sorting criterion of the first message encoded on input tape A is read into the A memory unit 53 (Fig. 2); therefore, input tape A should be started. The circuit is the same as that described in paragraph 5.1.6.

(8.1.2) *Circuit responsive to the $A=B$ or $A<B$ signal*

The $A=B$ and $A<B$ signals are passed through the "L" contacts of switch S–8A and S–8B to the right side of dual buffer G–22 (Fig. 3*c*) as viewed in the drawing. The output signal of dual buffer G–22 is passed through the "L" contact of switch S–2–A (Fig. 3*a*) and the "L" contact of switch S–2–B to an input of gate G–8. It should be noted that gates G–5 and G–6 are bypassed by switches S–1–A—S–1–B and switches S–2–A—S–2–B because the predetermined counters A and B are not required in the extract-by-list operation. The gate G–8 is opened by the start pass signal. Therefore, unless the EDAα or the EDBα signal has passed through delay unit D–3 to the close input, gate G–8 responds to the input signal. The output signal furnished by gate G–8 is passed through the "L" contact of switch S–2–C to an input of seven-channel buffer G–25 (Fig. 3*c*). The output signal of buffer G–25 is applied to the $S_1$ input of five-input "and" gate G–27. If, at this time, all four tapes are stopped, "and" gate G–27 passes the input signal to the set input of flip-flop FF–7. The output signal of flip-flop FF–7 is passed through the one-step tester unit to the start input of the tape A drive mechanism.

(8.1.2.A) *Explanation of circuit responsive to the $A=B$ or $A>B$ signal*

When the comparator unit 71 (Fig. 2) indicates that the sorting criterion of A message is equal to, or less than, the item stored in the B memory unit, input tape A should be started unless the EDAα or the EDBα symbols have been detected by the alpha reading head of input tape A or input tape B. The latter symbols indicate that there are no remaining messages on the respective tapes.

(8.1.3) *Circuit responsive to the EDBα signal*

If the end data symbol is detected by the alpha reading head of input tape B and, at the same time, the end data symbol has not been detected by the alpha reading head of input tape A, input tape A should be started because the list of items encoded on input tape B is exhausted. Therefore, the remaining messages on input tape A should be transferred to output tape D. The circuit is the same as that described in paragraph 5.1.3 with the exception that the output signal of gate G–8 is passed through the "L" contact of switch S–2C (Fig. 3*a*).

(8.1.4) *Circuit responsive to the EDAα and EDBα signals*

The end data symbol is transferred by the beta reading head of input tape A to both output tapes, therefore, when the EDAα and the EDBα signals are present, input tape A should be started. The circuit is the same as that described in paragraph 5.1.4 with the exception that gate G–33 (Fig. 3*d*) is opened by the first stop tape A signal.

(8.1.5) *Circuit for restarting input tape A*

If, for any reason, input tape A is stopped, it should be restarted unless the EDAβ signal is present, or a start signal has been applied to the start mechanism of input tape B. The circuit is the same as that described in paragraph 5.1.5.

(8.2.1) *Circuit responsive to the A>B signal*

The *A>B* signal is applied through the "L" contact of switches S–1–A—S–1–B (Fig. 3*a*) to an input of gate G–7. The EDAα and the EDBα signals are passed through delay unit D–3 to the close input of gate G–7. Thus, if either the EDAα signal or the EDBα signal is present, gate G–7 is unresponsive to the *A>B* signal. Otherwise, the *A>B* signal is passed through gate G–7 and the "L" contact of switch S–1–C to an input of seven-channel buffer G–30 (Fig. 3*c*). The output signal of buffer G–30 is applied to the $S_1$ input of five-input "and" gate G–31. "And" gate G–31 is primed to pass the signal applied to its $S_1$ input when the four tapes have received a stopped signal. The output signal of gate G–31 is applied to the set input of flip-flop FF–8. The output signal of flip-flop FF–8 is passed through the one-step-tester unit to the start input of the tape B drive mechanism.

(8.2.1.A) *Explanation of the circuit responsive to the A>B signal*

In accordance with the extract-by-list procedure, input tape B should be started when the comparator unit 71 (Fig. 2) indicates that the sorting criterion of the A message is greater than the item stored in the B memory unit 57 (Fig. 2). However, input tape B is not started if the EDAα or the EDBα symbols have been detected indicating that there are no remaining messages on input tape A or input tape B. Therefore, gate G–7 (Fig. 3*a*) is open unless an EDAα or EDBα signal has previously closed gate G–7.

(8.2.2) *Circuit for restarting input tape B*

If, for any reason, input tape B is stopped, it is restarted unless the EDBα signal is present or unless a conditional start tape A signal has been furnished by gate G–8 (Fig. 3*c*). The circuit is the same as that described in paragraph 5.2.4.

(8.3.1) *Circuit responsive to the start pass and SMAα signal*

Input tape A should be stopped after the sorting criterion of the first message is read into the A memory unit in order that the proper input and output tapes may be selected on the basis of the output signal of comparator unit 71 (Fig. 2). The circuit is the same as that described in paragraph 5.3.1.

(8.3.2) *Circuit responsive to the A>B, the $SMA\alpha_{(n+1)}$ and the $EMB\beta_{(n)}$ signals for stopping input tape A*

Input tape A should be stopped when the comparator unit 71 (Fig. 2) indicates that the sorting criterion of a message encoded on input tape A is greater than the item stored in the B memory unit 57. The circuit is the same as that described in paragraph 5.3.2 except that the *A>B* signal passes through the "L" contact of switches S–1–A and S–1–B and the output signal of gate G–7 is passed through the "L" contact of switch S–1–C. The presence of the $SMA\alpha_{(n+1)}$ and the EMBβ signals indicate that an entire message has been transferred from input tape A.

(8.3.3) *Circuit responsive to the EDAα signal*

Input tape A should be stopped when the alpha reading head detects the end data symbol encoded on input tape A before the alpha reading head of input tape B has detected the end data symbol encoded on input tape B. This situation arises when there are no messages remaining on input tape A and the list of items encoded on input tape B is not exhausted. The circuit is the same as that described in paragraph 5.3.4.

(8.3.4) *Circuit responsive to the EDAβ signal*

Input tape A should be stopped when the end data symbol is detected by the beta reading head indicating that this symbol has been transferred to both output tapes. The circuit is the same as that described in paragraph 5.3.5.

(8.3.5) *Circuit for stopping input tape A when an output tape is caused to be stopped*

If either of the output tapes are caused to be stopped, input tape A should also be stopped in order that the tapes may be restarted in synchronism. The circuit is the same as that described in paragraph 5.3.6.

(8.4.1) *Circuit responsive to the start pass and SMBα signals*

At the start of a pass, the first item encoded on input tape B is read into the B memory unit by the alpha reading head of input tape B. The input tape B is then stopped in order that the proper input and output tapes can be started on the basis of the output signal furnished by the comparator 71 (Fig. 2). The output signal indicates the relationship between the sorting criterion of the first message encoded on input tape A and the first item encoded on input tape B. The circuit is the same as that described in paragraph 5.4.1 except that both inputs of "and" gate G–14 (Fig. 3*b*) are actuated by the SMBα signal which is passed through delay unit D–7 to the $S_2$ input and delay unit D–7 and the "L" contact of switch S–4C to the $S_1$ input.

(8.4.2) *Circuit responsive to the A=B or A<B signals for stopping input tape B*

The A=B and A B signals are passed through the "L" contact of switch S–8–A and switch S–8–B to the input of one side of gate G–22 (Fig. 3*c*). The output signal of gate G–22 is passed through the "L" contact of switches S–2–A and S–2–B (Fig. 3*a*) to the input of the gate G–8. Gate G–8 is open unless a previous EDAα or EDBα signal has passed through delay unit D–3 to its close input. The output signal of gate G–8 is passed through seven-channel buffer G–10 to the set input of flip-flop FF–4. The output signal of flip-flop FF–4 is applied to the $S_1$ input of "and' gate G–13 (Fig. 3*b*). The conditions for stopping input tape B are set up in "and" gate G–14; that is, "and" gate G–14 furnishes an output signal when an entire item has been read by the alpha reading head of input tape B. The SMBα signal is passed through delay unit D–7 to the $S_2$ input of "and" gate G–14. The output of delay unit D–7 is also passed through the "L" contact of switch S–4–C to the $S_1$ input of "and" gate G–14, thereby rendering G–14 operative. The output signal of gate G–14 is applied to the $S_2$ input of "and" gate G–13 causing gate G–13 to furnish an output signal which is passed through dual buffer G–20 to the stop input of the tape B drive mechanism.

(8.4.2.A) *Explanation of circuit responsive to the A=B or A<B signals for stopping tape B*

When the comparator unit 71 (Fig. 2) indicates that the sorting criterion of a message encoded on input tape A is equal to, or less than, the item stored in the B memory unit 57, input tape B should be stopped unless, at the same time, the EDAα or the EDBα signals are present. Therefore, the $A=B$ or $A<B$ signal is passed through opened gate G–8 to the $S_1$ input of gate G–13.

(8.4.3) *Circuit responsive to the EDBα signal*

The EDBα signal is applied directly to an input of seven-channel buffer G–10 (Fig. 3*a*). The output signal of buffer G–10 is applied to the set input of flip-flop FF–4 and the output signal of flip-flop FF–4, is applied to the $S_1$ input of "and" gate G–13 (Fig. 3*b*). The conditions for stopping input tape B are set-up in "and" gate G–14. The conditions are: that the end data symbol is detected by the alpha reading head, and that the end message symbol is detected by the beta reading head. The EDBα signal is passed through delay unit D–7 to the $S_2$ input of "and" gate G–14. The EDBα signal is also passed through delay unit D–7 and the "L" contact of switch S–4–C to the $S_1$ input of "and" gate G–14. The output signal of "and" gate G–14 is applied to the $S_2$ input of "and" gate G–13, thereby causing gate G–13 to furnish an output signal which is passed through dual buffer B–20 to the stop input of the tape B drive mechanism.

(8.4.3.A) *Explanation of the circuit responsive to the EDBα signal*

When the end data symbol is read by the alpha reading head of input tape B, input tape B should be stopped because all the items of the list have been exhausted.

(8.5.1) *Circuit responsive to the start pass signal*

At the start of a pass, the start pass signal is applied to the close input of gate G–33 (Fig. 3*d*). Switch S–5–B is set to the "L" position and, therefore, gate G–33 does not receive an open signal until the first stop A signal is received. Because the output signal of gate G–33 is applied to the inputs of gates G–34 and G–35 which respectively control the start of the output tapes, neither output tape receives a start signal until the sorting criterion of the first message encoded on input tape A and the first item encoded on input tape B has been read into their respective memory units 53, 57 (Fig. 2). Subsequent start A signals from the output of gate G–27 (Fig. 3*c*) are passed through gate G–33 to an input of gates G–34 and G–35. Thus, one or the other of the output tapes is started when input tape A is restarted. The circuits for selecting an output tape are described below:

(8.6.1) *Circuit responsive to the A=B signal for starting output tape C*

The $A=B$ signal is passed through the "L" contact of switch S–6–A (Fig. 3*d*) to an input of each side of dual buffer G–36. The output of the left side (as viewed in the drawing) of dual buffer G–36 is applied to the close input of gate G–35. The output of the right side of dual buffer G–36 is applied to the open side of gate G–34. Subsequent start A signals are passed through gate G–33 to the inputs of gates G–34 and G–35 as described above. The output signal of open gate G–34 applied to the set input of flip-flop FF–9 and the output signal of flip-flop FF–9 is passed through the one-step-tester unit to the start input of the tape C drive mechanism.

(8.6.1.A) *Explanation of the circuit responsive to the A=B signal for starting tape C*

When the comparator unit indicates that the sorting criterion of a message encoded on input tape A is equal to an item encoded on input tape B, the message is transferred from input tape A to output tape C. Therefore, output tape C is started.

(8.6.2) *Circuit responsive to the EDAα signal for selecting output tape C*

The The EDAα signal is passed through the "L" contact of switch S–6–C (Fig. 3*d*), directly to an open input of gate G–35 (Fig. 3*d*). The EDAα signal is also passed through the "L" contact of switch S–6–C to an input of the right side (as viewed in the drawing) of dual buffer G–36. The output signal of the right side of buffer G–36 is applied to an open input of gate G–34. Subsequent start tape A signals are passed through gate G–33 and gates G–34 and G–35 to the set input of flip-flops FF–9 and FF–10 respectively. The output signal of flip-flop FF–9 is passed through the one-step-tester unit to the start input of the tape C drive mechanism. The output signal of flip-flop FF–10 is passed through the one-step tester unit to the start input of the tape D drive mechanism.

(8.6.2.A) *Explanation of the circuit responsive to the EDAα signal for selecting output tape C and output tape D*

When the EDAα symbol is detected by the alpha reading head of input tape A, both output tapes should be started in order that the end data symbol may be transferred from the beta reading head of input tape A to both output tapes.

(8.6.3) *Circuit responsive to the A<B signal for starting output tape D*

The $A<B$ signal is passed through dual buffer G–22 (Fig. 3*c*) and the "L" contact of switch S–6–B (Fig. 3*d*) to the close input of gate G–34 and the open input of gate G–35. The subsequent start tape A signal furnished by "and" gate G–27 (Fig. 3*c*) is passed through gate G–33 (Fig. 3*d*) to the inputs of gates G–34 and G–35. The output signal of opened gate G–35 is applied to the input of flip-flop FF–10. The output signal of flip-flop FF–10 is passed through the one-step-tester unit to the start input of the tape D drive mechanism.

(8.6.3.A) *Explanation of the circuit responsive to the A<B signal for starting output tape D*

When the comparator unit 71 (Fig. 2) indicates that the sorting criterion of a message encoded on input tape A is less than the item stored in the B memory unit 57, then this message is transferred from input tape A to output tape D.

(8.7.1) *Circuit for stopping an output tape when input tape A is caused to be stopped*

When input tape A is caused to be stopped, the running output tape should also be stopped in order that the tapes may be restarted in synchronism. The circuit is the same as that described in paragraph 5.5.3 with the exception that neither of the output tapes is started when input tape B is started. Switch S–5A (Fig. 3*c*) disconnects the output of "and" gate G–31 from the input of gate G–33. Therefore, neither of the flip-flops FF–5 or FF–6 is reset when input tape B is running.

(8.7.2) *Circuit responsive to the A=B signal for stopping output tape D*

The $A=B$ signal is applied directly through the "L" contact of switch S–7–A (Fig. 3*b*) to the set input of flip-flop FF–6. The output signal of flip-flop FF–6 is applied to the $S_1$ input of "and" gate G–17. Again, the second input signal is furnished to the $S_2$ input of "and" gate G–17 by the output signal furnished by gate G–19 wherein the conditions for stopping output tape D are set up as previously described. The output signal of gate G–17 is passed through dual buffer G–21 to the stop input of the tape D drive mechanism.

(8.7.2.A) *Explanation of the circuit responsive to the A=B signal for stopping output tape D*

When the comparator unit 71 (Fig. 2) indicates that the sorting criterion of a message encoded on input tape A is equal to the item stored in the B memory unit, output tape D should be stopped, if output tape D is running, because the message encoded on input tape A should be transferred to output tape C.

(8.7.3) *Circuit for stopping an output tape when the intermessage spacing between the messages encoded on input tape A is excessive*

When the dead space detector (Fig. 3*d*) indicates that the intermessage spacing between the messages encoded on input tape A is excessive, a signal is furnished by the dead space detector unit to an input of seven-channel buffer G–18 (Fig. 3*b*). The output signal of gate G–18 is applied to the set input of flip-flop FF–5 and FF–6. One of these flip-flops is in the reset condition due to the presence of a corresponding start signal furnished respectively by flip-flop FF–9 or FF–10 (Fig. 3*d*). This flip-flop furnishes an output signal to the $S_1$ input of the corresponding "and" gate G–16 or G–17. Again, the conditions for stopping an output tape are set up in "and" gate G–19. The output signal of "and" gate G–19 is applied to the $S_2$ input of gates G–16 and G–17 respectively. Thus, the one of the gates G–16 or G–17 which is primed by its associated flip-flop FF–5 or FF–6 furnishes an output signal which is passed through dual buffer G–21 to the stop input of the corresponding tape-drive mechanism. With reference to gates G–16 and G–17 (Fig. 3*b*), it should be noted that the output signal of two-input "and" gate G–19, wherein the conditions for stopping an output tape are set up, is applied to the set input $S_2$ of gates G16 and G17 respectively. However, the conditional stop signal is supplied to only one of these gates at any one time. Therefore, the output signal of gate G–19 is also passed through delay unit D8 to the reset input $R_2$ of gates G–16 and G–17. This insures that the control flip-flop associated respectively with the $S_2$ and $R_2$ inputs is reset even though a conditional start signal is not received. Likewise, delay units D4 and D6 are used to reset a control flip-flop of gates G–11 and G–13 respectively in case the corresponding conditional stop A or conditional stop B signal does not appear within a predetermined time interval.

ONE-STEP-TESTER UNIT (FIG. 4)

In machines of the complexity of the present information handling system, it is desirable that some provision be made for checking its operation in order to insure that the various components are functioning correctly. In the present state of the art, several different methods of checking are known. One method uses a marginal checking procedure, for example, the supply voltage of the various tubes of the machine are dropped a fixed percentage below the rated value, thereby precipitating the failure of marginal tubes. However, this type of apparatus check requires an interpretation of the results by a highly skilled person. Another method of checking machine operation uses a programming technique. A fixed set of instructions is made up in advance and supplied at the input of the machine. By the proper selection of a program, the operation of each individual component of the machine can be checked by observing the result furnished at the machine output. In the programming method of checking, however, the machine is unavailable for processing data while it is undergoing the check operation. It is apparent from the description of the logical control unit (Fig. 3*a*–3*d*) that the present information handling system is a self-programming device, that is, under certain circumstances a preliminary decision based upon the output signals furnished by the comparator unit 71 (Fig. 2) may be overridden by the logical control unit.

The one-step-tester unit (Fig. 4) is associated with the logical control unit and provides a simple means for changing from fully automatic operation to a test operation at any point in a sort, extraction, or merge pass. The machine can then be restored to full automatic operation by operating a toggle switch. The toggle switch may be located at a point remote from the one-step-tester unit, for example, on a console unit. When the machine is restored to automatic operation, the interrupted pass is completed without the loss of any information. Furthermore, because the input information is available in written form, a special programming tape is not required, although one may be used, if desired.

Figure 4:
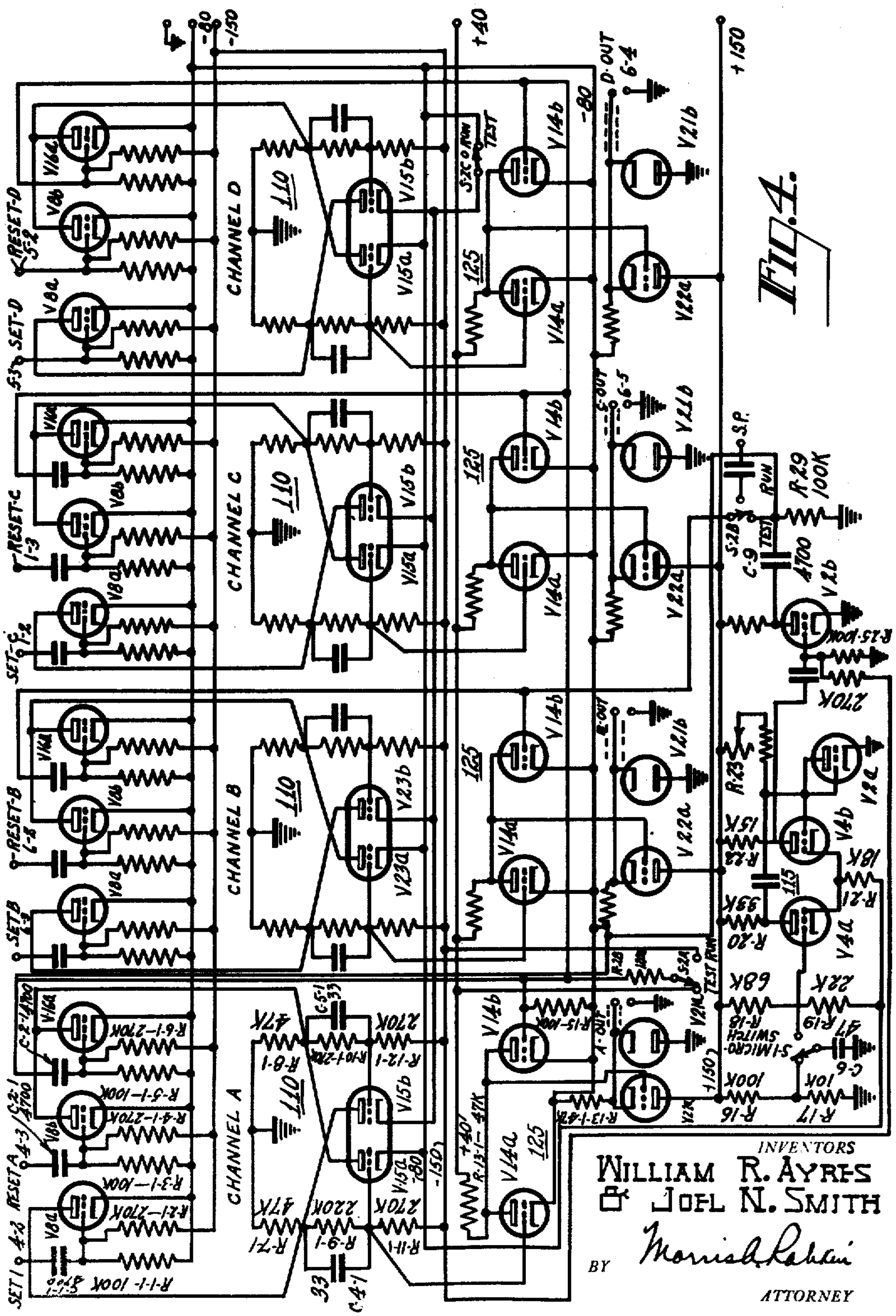
Fig. 4 is a detailed drawing of the one-step-tester unit which is associated with the information handling system.

Referring to Fig. 4 which shows a detailed arrangement of the one-step-tester unit 75 of Fig. 2, the one-step-tester unit is provided for testing the information handling system in terms of unit decisions which require a particular input or output tape to be started. In test operation the decision as to which tape is next to run is stored until released by a manually-operated push-button switch. When the contact of the push-button switch is closed, the drive mechanism of the tape last selected by the logical control unit (Figs. 3*a*–3*d*) receives a start signal and the tape continues to advance until a stop signal is furnished by the logical control unit. In full automatic operation, the start signal is passed through the one-step-tester unit to the start input of the proper tape drive mechanism. Four identical channels are shown in Fig. 4. Each of the channels is provided with an Eccles-Jordan flip-flop 110, comprising tubes **V15*a* and V15*b*, which is used for storing the start decision. A Rossi-type gate 125 comprising tubes V14*a* and V14*b* is also provided. The anode of set tube V8*a* is connected to the grid of tube V15*a*. All start tape A signals furnished by the output of flip-flop FF–7** (Fig. 3*c*) are applied to the grid of tube **V8*a*. The anodes of reset tubes V8*b* and V16*a* are connected in parallel to the grid of tube V15*b*. The start pass signal generated by the start pass initiator circuit 60** of Fig. 3*a* is passed via the run contact of switch **5–2*b* (Fig. 4) to the control grid of reset tube V–16*a*. The grid of a cathode follower output tube V–22*a* is connected to the common plate resistor R–13–1 of Rossi gate 125. A clipping diode V–21*a* is connected between the cathode of tube V–22*a* and ground potential. A single monopulse generator 115 of the delay multivibrator type, comprising tubes V–4*a* and V–4*b*, is provided for all four channels. Triode tube V–2*a* connected as a diode, is connected between the grid of tube V–4*b* and ground potential. The grid of an inverter tube V–2*b* is connected to the output of tube V–4*b* of the monopulse generator 115. The anode of the inverter tube V–2*b* is connected via the test contact of switch S–2B to the grid of the second tube V–14*b* of the Rossi gate 125. In addition, the anode of tube V–2*b* is connected to the grid of reset tube V–16*a*. A two-position switch S–1 is used to connect one side of capacitor C6 to the control grid of tube V–4*a* of the monopulse generator 115. Three two-position switches S–2A, S–2B and S–2C** are also provided and are connected as shown in the drawing. Representative voltage potentials are also shown associated with the electrodes of the various vacuum tubes.

The specific operation in the test position is as follows:

A push button or toggle switch S–1 normally connects capacitor C6 to the junction of voltage divider R16 and R17. The potential on the upper plate of capacitor C6 is then normally held at approximately +13 volts. At the same time, the voltage divider R18 and R19 maintains the control grid of tube **V–4*a* of the monopulse generator 115 at a suitable value below its triggering potential. Upon closure of switch S–1, the grid bias of tube V–4*a* is momentarily raised by capacitor C6 to +13 volts, thereby causing the monopulse generator 115 to generate a positive-going square-wave pulse. Capacitor C6 discharges rapidly through the voltage divider R–18, R–19, so that the grid potential of tube V–4*a*** is not materially influenced by the potential from the upper plate of capacitor C6 by the time conduction is shifted back to tube V–4*b*. The details of the operation of a delay type multivibrator are well-known in the art and it is not necessary to describe the specific operation, at this point, beyond stating that a positive-going, square-wave pulse is furnished by the monopulse generator 115 to the grid of inverter tube V–2*b*. The duration of the pulse is regulated by the setting of potentiometer R–23. The inverter tube V–2*b* changes the pulse received at its grid to a negative-going pulse which appears at its plate anode. The output signal of inverter tube V–2*b* is passed through the test contact of switch S–2*b* to the control grid of tube V–14*b* of each of the Rossi "and" gates 125. At the commencement of a pass, the start pass signal generated by the start pass initiator (Fig. 3*a*) is applied via the run contact of switch S–2 to the grid of each reset tube V–16*a*. The output signal of reset tube V–16*a* is applied to the control grid of tube V–15*b* of the Eccles-Jordan flip-flop 110 causing conduction to be shifted to the left-hand tube V–15*a*. Thus, in the reset state, tube V–15*a* of the Eccles-Jordan flip-flop 110 is conducting with its grid essentially at cathode potential. The bias on the grid of cathode follower tube V–14*a* of the Rossi gate 125, which is connected to the grid of tube V–15*a*, is likewise at approximately ground potential, so that tube V–14*a* is conducting, thereby holding the potential at its anode to approximately 15 volts positive relative to its cathode. By conduction of clamping tube V–21*a*, the cathode of the cathode follower tube V–22*a* is held at substantially ground potential and tube V–22*a* is cut off. Thus, if a negative-going signal of cutoff proportions were furnished by inverter tube V–2*b* to the grid of tube V–14*b* of Rossi gate 125, the grid potential of cathode follower tube V–22*a* would change very slightly due to the continued conduction of tube V–14*a* of the Rossi gate.

Now consider the operation of the start-A channel as a representative example of the one-step-tester unit operation. Switches S–2*a*, S–2*b* and S–2*c* are moved to the test position. Tube V–15*a* of the Eccles-Jordan multivibrator 110 is conducting as are tubes V–14*a* and V–14*b* of the Rossi gate 125. Cathode follower tube V–22*a* is cut off due to the conduction of diode V–21*a*. The start tape A signal of flip-flop FF–7 (Fig. 3*c*) is applied to the grid of set tube V–8*a* causing it to conduct momentarily. The output signal of tube V–8*a* is applied to the grid of tube V–15*a* thereby rendering tube V–15*b* of the Eccles-Jordan multivibrator 110 conducting. Also tube V–14*a* of the Rossi gate 125 is rendered nonconducting due to the decrease of the grid potential of tube V–15*a*. However, the grid potential of cathode follower tube V–22*a* is not appreciably affected because of the continued conduction of tube V–14*b* of the Rossi gate 125. Now when the switch S–1 connects the upper plate of capacitor C6 to the control grid of tube V–4*a* of the monopulse generator 115, a positive-going pulse is generated. Inverter tube V–2*b* changes the positive-going pulse to a negative-going pulse which is passed through the test contact of switch S–2B to the grid of tube V–14*b* causing tube V–14*b* to be cut off. The grid potential of tube V–22*a* is thus made more positive and rendered conducting for the duration of the test pulse. By cathode follower action, a positive-going signal is furnished by tube V–22*a* to the "A" output conductor. The trailing edge of the negative-going pulse furnished by tube V–2*b* is applied to the grid of reset tube V–16*a* causing tube V–16*a* to conduct momentarily. The output signal of tube V–16*a* is applied to the grid of tube V–15*b* of the Eccles-Jordan flip-flop 110 causing conduction to be shifted back to tube V–15*a*. The rise in grid potential of tube V–15*a* is applied to the grid of tube V–14*a* of the Rossi gate 125 causing it to become once again conducting. Tube V–15*a* of the Eccles-Jordan flip-flop 110 continues to conduct until a subsequent start tape A signal is received from the output of flip-flop FF–7 (Fig. 3*c*).

In automatic operation, switches S–2*a*, S–2*b* and S–2*c* are placed in the run position. In the run position, tube V–14*b* of the Rossi gate 125 is biased to cutoff due to the high negative grid potential applied via the run contact of switch S–2*a* to the grid of tube V–14*b*. The run contact of switch S–2*b* disconnects the grid of tube 14*b* of the Rossi gate 125 from the output of inverter tube V–2*b* and connects it to a terminal to which the start pass signal is applied at the beginning of each pass. The start pass signal causes tube V–14*b* of each Rossi gate 125 to conduct thereby preventing the possibility of a spurious signal starting one of the tape drive mechanisms. The start pass signal is also applied to the grid of each of the reset tubes V–8*b* thereby insuring that the corresponding Eccles-Jordan flip-flop 110 is in its reset condition. In the run position, the contact of switch S–2*c* opens the cathode circuit of the right-hand tube V–15*b* of the Eccles-Jordan flip-flop. For example, in the case of Eccles-Jordan flip-flop 110, it is not necessary to have the right-hand tube V–15*b* conducting during automatic operation because the left-hand tube V–15*a* controls the action of the Rossi gate 125 as it is momentarily switched off by the start tape A signal. Although the present embodiment of the one-step tester unit shows a four-channel arrangement, it is apparent that the number of channels could be extended to control more than four tape drive mechanisms.

PARITY ERROR INDICATOR

There are six places in the present system where parity checkers are employed. Parity checkers themselves are well-known in the art as odd-even check circuits or parity error-checking circuits. In general, they may comprise an assemblage of either but not both gates. In the present embodiment, the seventh (parity) channel may or may not carry a bit as determined by the number of information bits comprising a character. In case an odd number of information bits represents a character, a parity check bit is added so that the total number of bits is always an even number. With the arbitrary choice of each code character having an even number of bits or binary "ones," a parity checker is basically an odd-number responsive device. The six information bits are applied in pairs of two to the inputs of three different "either but not both" gates. The output signals of the first and second "either but not both" gates are connected to the inputs of a fourth "either but not both" gate. The output signal of the third "either but not both" gate is applied to one of the inputs of a fifth "either but not both" gate. The parity bit is also connected to the input of the fifth "either but not both" gate. The output signals of the fourth and fifth "either but not both" gates are connected to a sixth "either but not both" gate. Thus, it is apparent that the sixth "either but not both" gate furnishes an output signal only if an odd number of signals is received at its input and, therefore, a parity error is indicated when an output signal is furnished by the sixth "either but not" both gate.

Referring now to Fig. 2, a first parity checker 200 is associated with the output side of the alpha reading head of input tapes A and B. A second parity checker 201 is associated with the output side of the alpha reading head of input tape B. A third parity checker 202 is associated with the output side of the A memory unit. A fourth parity checker 203 is associated with the output side of the B memory unit. A fifth parity checker 204 is associated with the output side of the rewind reading head of output tape C, and a sixth parity checker 205 is associated with the output side of the rewind reading head of output tape D. The output signal of each parity checker is supplied to the parity error-indicator circuit.

Figure 5:
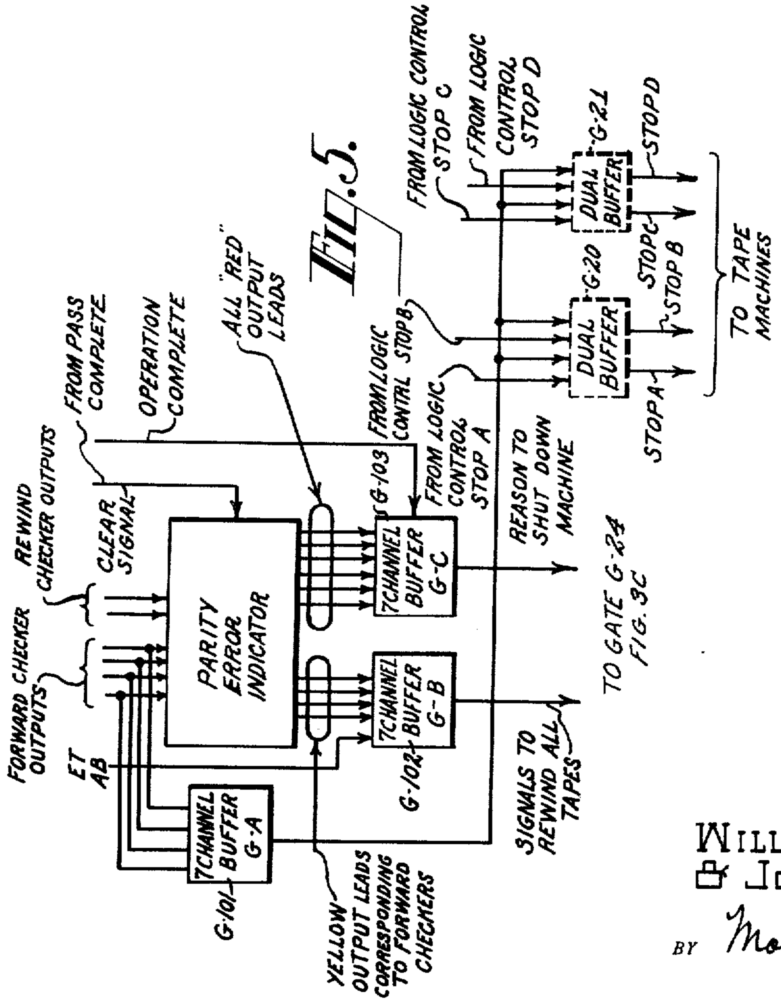
Fig. 5 is a block drawing of the parity-error indicating circuit and its associated components.

Referring now to Fig. 5, a block diagram of the parity error-indicator and its associated circuits is shown. Because of the possibility of intermittent spurious signals which have no relationship to the malfunctioning of the system, the parity error-indicator circuit is arranged to furnish a stop signal immediately to all tapes when a parity error is detected by any one of the first four parity checkers, 200, 201, 202, and 203. Also, a rewind signal is generated, as described hereinafter, in the event of such a parity error-indication, and the pass then in process is automatically repeated. In the event a second error is detected by the same parity checker during the repeated pass, the assumption that the parity error was caused by a spurious signal is negatived, and a shutdown signal is generated causing all mechanisms to stop immediately. If a parity error is detected by a parity checker associated with the output tapes C and D, a pass is merely repeated. However, if a second error occurs in the rewind operation, the system completes the rewind and a shutdown signal is generated which prevents the operation from starting again. Indicator lights are provided to indicate which of the checkers has detected the parity error.

The output signals from the first four parity checker circuits are supplied to the input of the parity error-indicator (Fig. 5) and also to the input of seven-channel buffer G–101. The output signal of seven-channel buffer G–101 is supplied as an input to each side of dual buffers G–20 and G–21 (Fig. 3*b*). The dual buffers G–20 and G–21 are located in the logical control unit and are shown in Fig. 5 as dotted blocks. The output signal of one side of dual buffer G–20 is applied to the stop input of the tape A drive mechanism, and the output signal of the other side of dual buffer G–20 is applied to the stop input of the tape B drive mechanism. Likewise, the output signal of each side of dual buffer G–21 is supplied to the respective stop input of the tape C and tape D drive mechanism. A detailed drawing of the parity error-indicator circuit is set out in Fig. 6. In general, when the first signal is received from one of the first four parity checker circuits a relay is energized in the parity error-indicator. The closing of this first relay lights an appropriate warning indicator and furnishes an output signal to seven-channel buffer G–102. The output signal of seven-channel buffer G–102 is applied to the rewind input of each of the tape drive mechanisms. A parity error detected by the forward checkers is also passed through each side of the dual buffers G–20 and G–21 (Fig. 3*b*) to the stop input of the corresponding tape drive mechanism. Therefore, all of the tapes are in a stopped condition before the rewind signal from seven-channel buffer G–102 (Fig. 5) is received. As soon as the rewinding operation is completed, a rewind completed signal is generated as aforementioned which is applied to the input of the start pass initiator (Fig. 3*a*) to begin the pass anew. The rewind completed signal does not pass through the single channel gate G–3 (Fig. 3*a*) because, in the case of a parity error detected by the first four parity error checkers, gate G–3 is closed as the EDAβ signal has not been received. Therefore, the stepping relays associated with the A and B message counters are not advanced and the pass is merely repeated. In the case of a rewind parity error, the signal from the output of the parity checker associated with the output tapes is applied directly to a close input of gate G–3 and again the preceding pass is merely repeated. In the case of a merge or extract operation which are single-pass procedures, the "end" operation signal is not generated until the rewind completed signal passes through gate G–3.

If, on a repeat pass, the same parity checker again detects a parity error, a different relay is operated in the parity error-indicator circuit (Fig. 5). When this relay is energized, a different indicator light is lighted and an output signal is furnished to an input of seven-channel buffer G–103. As before, the output signal of buffer G–101 furnishes a signal which is passed through the buffers G–20 and G–21 to the stop inputs of the tape drive mechanisms. The output signal of seven-channel buffer G–103 is passed through delay unit D–12 (Fig. 3*c*) to the close input of gate G–24 (Fig. 3*b*) thus stopping the operation. If, on a repeat pass, no errors are detected, the pass complete signal furnished by gate G–3 (Fig. 3*a*) is passed through switch S–9*b* to an input of the parity error-indicator (Fig. 5) and operates to deenergize the warning relay.

PARITY ERROR INDICATOR (FIG. 6)

Figure 6:
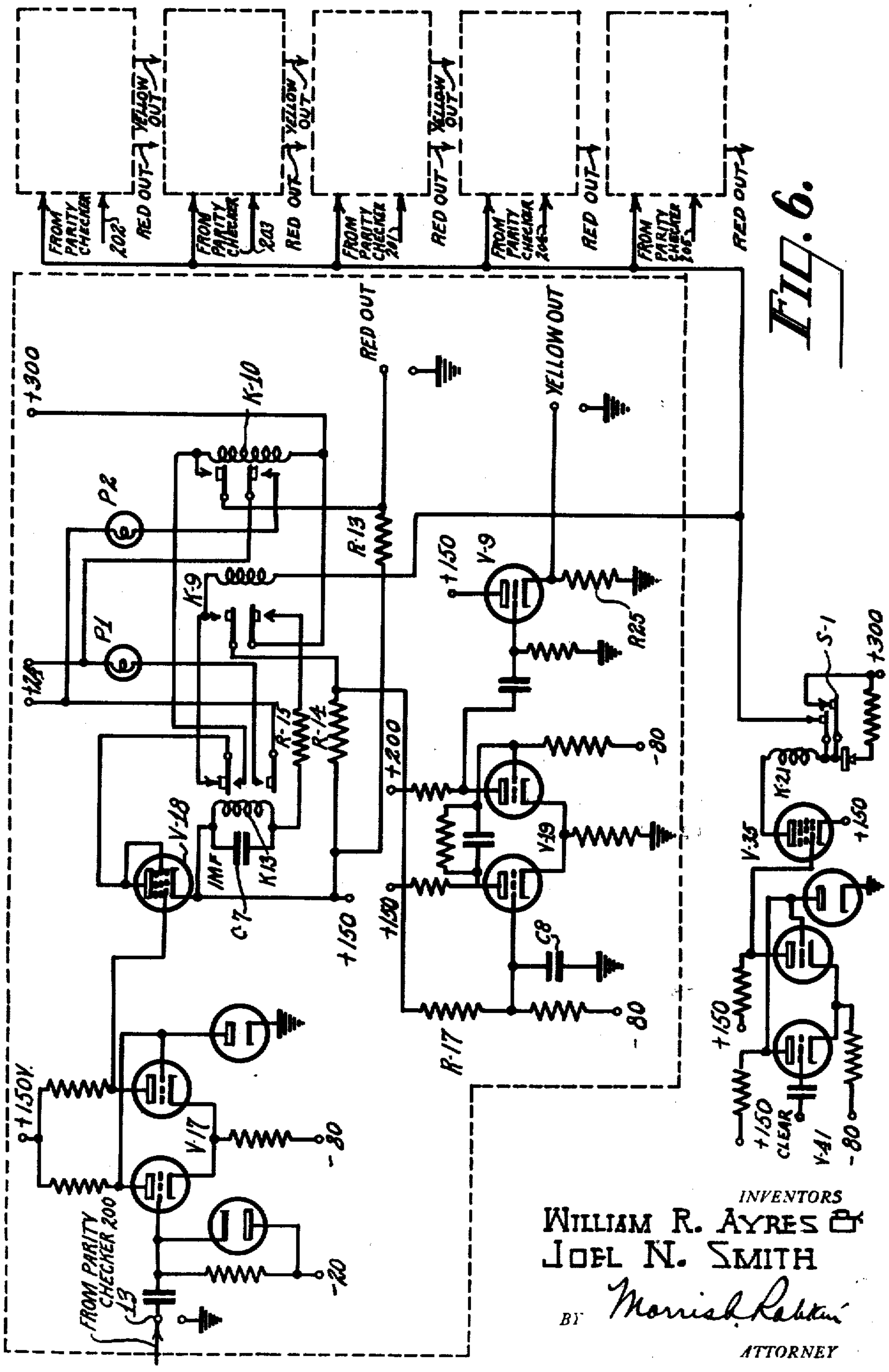
Fig. 6 is a more detailed drawing of the parity-error indicating circuit.

Referring now to Fig. 6, which shows in detail a drawing of the parity error-indicator circuit. The parity error indicator consists of six identical channels and one common clear circuit. Each one of the six individual channels is associated with a different parity checker. The function of each channel is to energize a yellow-light circuit upon the receipt of a first input signal, and to energize a red-light circuit upon the receipt of a second signal on the same input lead unless a clear input signal has been received prior to the second input signal. Only one channel need be described in detail, the remaining channels being set out in block form. Channel A is associated with the parity checker 200 which is connected to the alpha reading head of the input tape A. When the parity checker 200 detects a parity error, the positive-going input pulse applied to terminal 13 of channel A actuates one-shot multivibrator V–17. The multivibrator V–17 acts to lengthen the duration of the input signal to approximately 20 milliseconds because the conventional relay will not respond to a coil current impulse which is in the order of the 20 microsecond input pulse. The output signal of the multivibrator V–17 is applied to the control grid of tube V–18 causing tube V–18 to begin conduction. The output signal of tube V–18 is passed through the normally closed contacts of relay K–13 and the coil of relay K–9. Tube V–18 conducts for a time interval sufficient to energize relay K–9 thereby closing the normally open contacts of relay K–9. Relay K–9 remains energized due to the holding current flowing from the +300 bus through the coil of relay K–9, the upper contacts of the relay which are now closed and the limiting resistor R–14 to the +150 bus. The lower set of contacts of relay K–9 completes the coil circuit of relay K–13. The coil current of relay K–13 flows from the +150 bus through the coil of relay K–13, the limiting resistor R–15, and the lower set of contacts of relay K–9 to the +300 bus. Because of the time required for the charging of shunt capacitor C–7, relay K–13 does not pull in until after the signal generated by multivibrator V–17 has terminated and tube V–18 again is nonconducting. The closure of the lower set of contacts of relay K–13 completes the circuit for the yellow warning light P–1 to indicate that a single parity error has been detected by parity checker 200. If a second parity error is detected by parity checker 200, the positive-going pulse again trips one-shot multivibrator V–17 which furnishes an output signal to the control grid of V–18 causing tube V–18 to begin conduction. Because the center contact of relay K–13 is now closed, the conduction of tube V–18 completes a series circuit from the +300 bus through the coil of relay K–10, the center contacts of relay K–13 and, the conducting path of tube V–18 to the +150 bus. The closure of the lower contact of relay K–10 completes a series circuit including the red warning light P–2. Because of the closure of the upper contacts of the relay K–10, a series circuit is completed from the +300 bus, through the coil of relay K–10, the upper contact of relay K–10 and limiting resistor R–13 to the +150 bus. The signal taken from across resistor R–13 is applied to an input of seven-channel buffer G–103 (Fig. 5). When the first input signal is received by channel A, the voltage drop across resistor R–14 is passed through resistor R–17 and capacitor C–8 to the input grid of Schmidt trigger V–19. Resistor R–17 and capacitor C–8 act as an integrating circuit in order to prevent Schmidt trigger V–19 from responding to spurious input signals, such as noise spikes, caused by the bouncing or scratching of the contacts of relay K–9 during closure. The output signal of Schmidt trigger V–19 is applied to the control grid of cathode follower tube V–9. The output signal taken from across the cathode resistor R–25 is applied to an input of seven-channel buffer G–102 (Fig. 5).

A common, clear signal is provided for all of the six channels. Upon the successful completion of a pass, the clear impulse is applied to the input of one-short multivibrator V–41. The output signal of multivibrator V–41 is applied to the control grid of clear tube V–35 rendering tube V–35 conductive. The coil of relay K–21 is located in the plate circuit of clear tube V–35 and, upon conduction of tube V–35, the normally closed contacts of relay K–21 are opened. When the contacts of relay K–21 are opened the +300 bus is momentarily opened thereby deenergizing the coils of the relays in each of the six channels. Push-button switch S–1 is provided for automatic clearing of the indicator lights upon the completion of a merge or extract operation or when the machine is shut down. By pressing push button switch S–1, the +300 bus is likewise disconnected from the coils of the relays in each of the channels.

MODIFICATION USING A SINGLE INPUT SELECTOR (FIG. 7)

Figure 7:
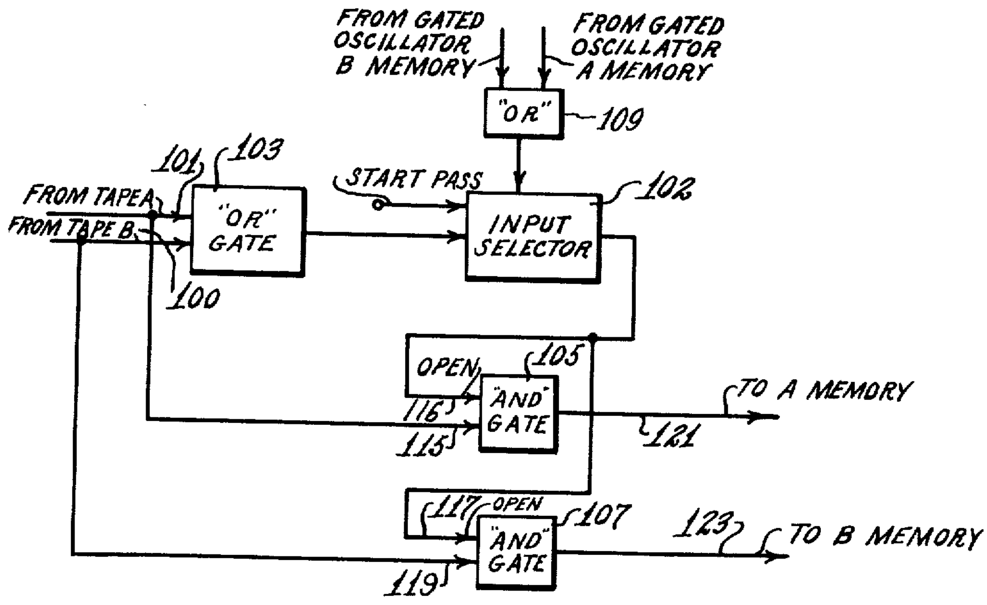
Fig. 7 is a modification of the invention where but a single data selector is used.

Referring now to Fig. 7, which shows a modification of the information handling system, wherein but one input selector unit is required. In the embodiment shown in Fig. 2, input selector A is associated with tape A in order to select one or more particular items as a sorting criterion of the units of information encoded on input tape A. Input selector B may be set to select one or more different items for the sorting criterion of the units of information encoded on input tape B.

For example, assume the basis of an operation were to be names of individuals which are set out in a group of the information-identifying characters of the messages encoded on input tape A, and the third item contained the individual names in the messages encoded on input tape A and the fifth item contained the individual names in the messages encoded on input tape B. Then the input selector A of Fig. 2 could be set to select the third item, and input selector B could be set to select the fifth item. However, in the situation where the name is contained in the same item of the messages encoded on input tape A and input tape B, only one input selector is required. Thus, if the basis of an operation were the name of an individual which was contained in the third item of the messages, an input selector 102 of Fig. 7 could be set to select the third item of the messages encoded on input tape A and input tape B.

The "or" gate 103 of Fig. 7 consists of seven different "or" gates each having two inputs and a single output. The seven channels of the α reading head of input tape A are separately connected to an input of each of the seven "or" gates. Likewise, the seven channels of the α reading head of input tape B are also separately connected to the seven inputs of the "or" gates 103. The seven outputs of "or" gate 103 are connected to the inputs of the input selector 102.

"And" gates 105 and 107 each consist of seven different "and" gates. Each of the fourteen "and" gates are primed by an open signal furnished by the input selector 102 on leads 116 and 117 respectively. The seven channels of the α reading head of input tape A are connected via conductor 115 to the seven inputs of the "and" gates 105. Likewise, the seven channels of the α reading head of input tape B are connected via conductor 119 to the seven inputs of the "and" gates 107.

The seven output leads 121 of "and" gate 105 are connected to the inputs of an A memory unit such as shown in Fig. 2, and the seven outputs of "and" gate 107 are connected to the inputs of the B memory unit. The operation of the embodiment shown in Fig. 7 is as follows:

Input tape A is started by the start pass signal previously described in connection with Fig. 2 and Figs. 3a–3d. The start pass signal is also applied to input selector 102 to open and close various gates therein. As the characters are detected by the alpha reading head of input tape A, they are passed through "or" gate 103 to the inputs of input selector 102, the signals representing the item separator symbols are counted by input selector 102 and, upon the preset item being counted, input selector 102 furnishes an open signal via conductors 116 and 117 to the "and" gates 105 and 107, thereby priming both these "and" gates. As the selected characters are detected by the alpha reading head of input tape A, they are passed through opened "and" gate 105 to the inputs of the A memory unit. The input selector continues to count the item separator symbols and, upon counting the item separator symbol following that of the selected item, the open output signal applied to "and" gates 105 and 107 is removed. Therefore, the following signals detected by the α reading head of input tape A are blocked by closed "and" gate 105.

The operation of the gated oscillator of the A and B memory units is similar to that described in connection with Fig. 2. Thus, if the number of characters of the selected items is less than thirty-two, the gated oscillator is started and artificially generates an advance signal to advance the selected characters to the thirty-second stage of the memory unit A, after which the gated oscillator is stopped.

The signals from the gated oscillators of the A and B memory units are also applied to the inputs of "or" gate 109. The output signal of "or" gate 109 is applied to input selector 102 and operates to advance the character counter thereof to a count of thirty-two whereupon the counter is reset.

As described in a copending application by Joel N. Smith and William R. Ayres, filed concurrently herewith, entitled "Serial Memory," but one gated oscillator is required for both A and B memory units. The present embodiment describing separate gated oscillators for the A and B memory units is for purposes of illustration only.

It should be noted that a common ground (not shown) is provided for, both in the general arrangement shown in Fig. 2 and the modification thereof shown in Fig. 7.

CONCLUSION

There has been described a novel information handling system for rearranging information in accordance with a sorting criterion selected from each of the units of information. The novel apparatus described herein is capable of performing the four basic operations of sorting, merging, extracting by class or extracting by list. The system of the present invention is a variable word-length system due to the fact that the sorting may consist of one or more characters, or one or more items contained in a plurality of information identifying characters. However, the present invention is compatible with so-called fixed word-length systems because the data selectors may be set to select a fixed block of characters.

The information-identifying characters may be extended to more than sixty-four characters by increasing the spacing between the alpha and beta reading heads of the input tapes and by a suitable adjustment of the sort zone time-delay units of the logical control unit.

Recording media other than magnetic tape may be employed so long as the input translating apparatus is capable of furnishing appropriate electrical signals to the input of the present invention, and the output translating apparatus is responsive to the output signals of the present invention. For example, punched paper-tape may be employed wherein the encoded information is read from and to the punched tape by tape-sensing and marking devices which are well-known in the electrical telegraph art. Another example may be information encoded on photographic film where the translating device comprises a photo-electric scanning means.

A novel one-step tester unit has also been described. The one-step tester unit described is particularly suitable for diagnostic purposes because it provides an indefinite time interval during which circuit-testing apparatus such as oscilloscopes or meters may be arranged at various points as required. Further, no loss of information is involved because the start decision remains stored.

The parity error-indicator circuit described herein provides a novel means for maintaining a continuous check on the parity of the encoded characters at various critical points and, in response to the detection of one or more different parity errors, appropriate control signals are caused to be generated. Such a system is especially desirable when an operation is being carried out in the absence of a human operator. Further, because of the time required to charge capacitor C-7 Fig. 6, the parity error-indicator furnishes but a single parity error-signal in response to a series of parity errors occurring within the charging interval of the capacitor C-7. A series of parity errors may occur, for example, when a particle of dirt causes a parity error in each character of a block of characters. Thus, instead of a shut-down signal being generated, a tape rewind signal is generated. The latter response is preferable, for example, because the dirt particle frequently becomes dislodged and a time interval, wherein the system is unavailable for processing information, is avoided.

The system described herein is operated in a parallel mode, that is, signals representing the bits of a character occur simultaneously in the various channels. The storage elements of the present embodiments may be adapted for operation in a series mode. A serial system, for example, may be one in which the signals representing the bits of a character occur in a dynamic form as a train of pulses where the value of each pulse depends upon its position in the train. In such a serial system, the bits defining a character are compared serially, rather than in parallel, as is the present case.

While the invention has been described and illustrated in certain specific embodiments which are deemed desirable, it is understood that the present system is capable of many further embodiments within the scope of the appended claims.

What is claimed is:

1. An information handling system for selectively rerecording units of information appearing on at least one input record member onto at least one output record member, each of said units of information being characterized by one or more characters including a plurality of information identifying symbols and special symbols comprising selecting means for selecting a predetermined one or more of said information identifying symbols, first and second memory units responsive to said selecting means for storing said selected identifying symbols, comparing means responsive to said first and second memory units for comparing said stored identifying symbols, a control unit responsive to said comparing means and to said special symbols, and transfer means responsive to said control unit for transferring a selected unit of information from an input to an output record member.

2. The invention as claimed in claim 1 wherein said selecting means includes a first selecting means for selecting a predetermined one or more of said information identifying symbols from a first input record member, and a second selecting means for selecting a predetermined one or more of said information identifying symbols from a second input record member.

3. An information handling system for selectively rerecording units of information encoded on a first and second input tape in an ordered arrangement on at least one output tape, a separate drive mechanism for each of said tapes, each of said units of information being characterized by a plurality of characters including one or more identifying characters and special symbols, said system comprising selecting means responsive to said special symbols on said first and second input tapes for selecting a group of said identifying characters termed herein a sorting criterion, a first and second memory unit coupled to said selecting means for respectively storing a sorting criterion selected from said first input tape and a sorting criterion selected from said second input tape, comparing means coupled to said first and second memory units for determining the relative order of precedence of two sorting criteria and for furnishing an appropriate output signal, control means responsive to said output signal and to said special symbols for furnishing appropriate start-stop signals to said separate drive mechanisms, and transfer means responsive to said start-stop signals for transferring a unit of information from an input tape to an output tape.

4. The invention as claimed in claim 3, said control means including means to delay the start-stop signals until a predetermined number of information identifying characters have been changed by said translating means into corresponding identifying signals.

5. The invention as claimed in claim 3 wherein said control means includes means to regulate the furnishing of said start-stop signals such that the spacing between the first character of the $n$th unit of information and the first character of the $(n+1)$th unit of information transferred to an output tape is not less than a predetermined minimum spacing.

6. The invention as claimed in claim 3 wherein said control means includes means to regulate the furnishing of said start-stop signals such that the spacing between the last character of the $n$th unit of information and the first character of the $(n+1)$th unit of information is at least equal to a predetermined minimum spacing.

7. The invention as claimed in claim 3 wherein said control means includes means to prevent the furnishing of a start signal unless each of the input tapes and output tapes are presently stopped or have been furnished a previous stop signal.

8. The invention as claimed in claim 3 including means responsive to said special signals for reading the last special symbol of one input tape to the output tapes.

9. The invention as claimed in claim 3 including means to restart an input tape automatically a predetermined time after a stop signal has been received provided another input tape has not received a start signal or provided units of information remain encoded on the input tape.

10. The invention as claimed in claim 3 including means responsive to a last special symbol encoded on an input tape to cause the remaining units of information encoded on the other input tape to be transferred to an output tape.

11. The invention as claimed in claim 3 including means responsive to said special signals to prevent the generating of a stop signal for an input tape unless an entire unit of information has been transferred therefrom.

12. The invention as claimed in claim 3 including first counting means for counting the number of units of information transferred from said first input tape, second counting means for counting the number of units of information transferred from said second input tape, gating means coupled to said first and second counting means and responsive to said special signals to automatically cause said first and second counting means to advance one count in response to the transfer of a predetermined number of units of information from said first and second input tapes.

13. In an information handling system for selectively rearranging units of information appearing on at least two input tapes into a predetermined sequence on at least one output tape, a separate drive mechanism for each of said tapes, each of said units of information being characterized by a plurality of characters including one or more identifying characters and special symbols, said system comprising selecting means coupled to said first and second input tapes and responsive to said special symbols for selecting a group of identifying characters termed herein a sorting criterion, a first and second memory unit responsive to said selecting means, a comparing means coupled to said first and second memory units for determining the relative order of precedence of two sorting criteria and furnishing an appropriate output signal, control means coupled to said comparing means and said input tapes and responsive to said output signal and said special symbols for furnishing appropriate start-stop and gating signals, transfer means including said separate drive mechanisms responsive to said start-stop signals for transferring a unit of information from an input tape to an output tape, means for connecting the gating signals to said selecting means and to said first and second memory units, said control means including counting means to count a predetermined number of units of information transferred from each of said input tapes.

14. In an information handling system for selectively rearranging units of information encoded on at least two input tapes into an ordered arrangement on an output tape, each of said units of information being characterized by a plurality of characters including a plurality of identifying characters and special symbols, said units of information being entered on each input tape in accordance with a group of identifying characters termed herein a sorting criterion, said system comprising translating means for changing said identifying characters and special symbols into corresponding identifying and special signals, selecting means coupled to said first and second input tapes and responsive to said identifying and special signals for selecting the sorting criterion of a unit of information encoded on said first and second input tapes, a first and second memory unit coupled to said selecting means for respectively storing said first and second sorting criteria, comparing means coupled to said first and second memory units for determining the relative order of precedence of said stored sorting criteria and furnishing an appropriate output signal, control means coupled to said comparing means and said input tapes and responsive to said output signal and said special signals for furnishing appropriate start-stop and gating signals, transfer means responsive to at least one start signal of said start-stop signals for transferring a unit of information from said input tapes to said output tape, said control means including counting means responsive to count a predetermined number of units of information transferred from each of said input tapes, and means to selectively disconnect said counting means and said control means.

15. The invention as claimed in claim 14 including a second output tape, detecting means adjacent the path of said output tape for detecting the physical end of said output tape and furnishing an appropriate signal to said control means whereby subsequent units of information are transferred to said second output tape.

16. An information handling system for selectively transferring units of information encoded on a first input tape to one or the other of two output tapes in accordance with an item of information encoded on a second input tape, a separate drive mechanism for each of said tapes, each of said units of information being characterized by a plurality of characters including one or more information identifying characters and special symbols, a group of identifying characters being termed herein a sorting criterion, and said item of information being characterized by a group of identifying characters, comprising translating means adjacent the path of said first and second input tapes for changing said identifying characters and special symbols into corresponding identifying signals and special signals, a first memory unit for storing said item identifying signals, means including switch means for inserting said item identifying signals into said first memory unit, selecting means responsive to said information identifying signals and said special signals for selecting a group of signals representing a sorting criterion, a second memory unit associated with said selecting means for storing said selected group of signals, comparing means coupled to said first and second memory units for determining the relative order of precedence between said stored item identifying signals and said selected group of signals and furnishing an appropriate output signal, a logical control unit responsive to said comparing means output signal and said special signals for furnishing start-stop and gating signals, said start-stop signals being applied to respective ones of said tape drive mechanisms, transfer means responsive to said start-stop signals for transferring a unit of information from said first input tape to one of said output tapes, and means for applying said gating signals to said memory units.

17. An information handling system for selectively transferring units of information encoded on a first input tape to one or the other of two output tapes in accordance with a list of ordered items encoded on a second input tape, each of said units of information being characterized by a plurality of characters including a plurality of identifying characters and special symbols, a group of said identifying characters being termed herein a sorting criterion, said units of information being arranged in a logical sequence on said input tape in accordance with the relative order of precedence of their respective sorting criteria, each of said items being characterized by a group of items identifying characters and special symbols, said system comprising translating means adjacent the path of said first and second input tapes for translating said information and item identifying characters and said special symbols into corresponding information and item identifying signals and special signals, selecting means coupled to said translating means and responsive to said information and item identifying signals and said special signals for selecting the information identifying signals corresponding to a sorting criterion and for selecting the item identifying signals corresponding to an item, a first memory unit coupled to said selecting means for storing said item identifying signals, a second memory unit coupled to said selecting means for storing said selected information identifying signals, comparing means coupled to said first and second memory units for determining the relationship between said item identifying signals and said selected information identifying signals and furnishing an appropriate output signal, a logical control unit coupled to said translating means and said comparing means and responsive to said special signals and said output signal for furnishing gating signals, transfer means including other translating means adjacent the path of said first input tape for transferring a unit of information to one of said output tapes, and means connecting said gating signals to said first and second memory units.

18. In an information handling system for selectively re-recording units of information encoded on a first and second input tape onto at least one output tape, a separate drive mechanism for each of said tapes, each of said units of information being characterized by a plurality of characters including a plurality of information identifying characters and special symbols, said system comprising translating means adjacent the path of each of said first and second input tapes for translating said identifying characters and special symbols into corresponding identifying and special electrical signals, selecting means coupled to said translating means and responsive to said electrical signals for selecting a group of said identifying signals, a first and second memory unit coupled to said selecting means, means associated with said selecting means for gating identifying signals to said first memory unit, means coupled to said selecting means for gating identifying signals to said second memory unit, comparing means coupled to said first and second memory units, control means responsive to said comparing means and said special signals for furnishing appropriate start-stop and gating signals, transfer means including said tape drive mechanisms responsive to said start-stop signal for transferring a unit of information from an input tape to an output tape, said control means including means for maintaining said units of information in sequential groups on said output tape, and means connecting said gating signals to said first and second memory units.

19. An information handling system for selectively rearranging units of information encoded on two input tapes on at least one output tape, each of said units of information including a plurality of identifying items, each of said items having one or more identifying characters, one or more satellite information characters and special symbols, said system comprising translating means responsive to said identifying characters and special symbols for changing said identifying characters and special symbols into corresponding identifying and special signals, selecting means responsive to said identifying and special signals for selecting identifying signals representing corresponding items of said units of information encoded on said first and second input tapes, a first memory unit coupled to said selecting means for storing the identifying signals representing items selected from said first input tape, a second memory unit coupled to said selecting means for storing the identifying signals representing items selected from said second input tape, comparing means coupled to said first and second memory units for determining the relative order of precedence of said stored identifying signals and furnishing an appropriate output signal, control means responsive to said comparing means, output signal and said special signals for furnishing signals including start signals and gating signals, and transfer means including other separate translating means, each adjacent the path of said input and output tapes and responsive to certain ones of said start signals for transferring a unit of information from one of said input tapes to one of said output tapes.

20. In an information handling system having units of information encoded on input tapes, each of said units of information being characterized by a plurality of characters and special symbols, each of said characters and special symbols normally characterized by a predetermined parity, a parity error indicating circuit comprising a plurality of parity checker circuits for detecting an occurrence of a parity error, circuit means coupled to said parity checker circuits and responsive to said detected parity error for generating a rewind signal for each of said tapes and responsive to a second parity error detected by the same parity checker for generating a shut-down signal.

21. The invention as claimed in claim 20 including means for clearing the indication furnished by the circuit means in the event that a parity error is not detected subsequent to the rewind signal.

22. In an information handling system having an input tape with encoded characters normally characterized by a predetermined parity and having a tape drive mechanism capable of rewind, a parity error circuit comprising a parity checker circuit for detecting an occurrence of a parity error in said encoded characters as the tape is advanced by said mechanism, circuit means coupled to said checker circuit and responsive to said detected parity error for generating a tape rewind signal for said tape and responsive to a second parity error detected by the said parity checker for generating an output signal.

23. In an information handling system for rearranging units of information encoded on two input tapes on at least one output tape, a separate drive mechanism for each of said tapes, each of said units of information including a plurality of special symbols, the combination comprising a group of translating means respectively adjacent the paths of said input tapes for changing said special symbols to corresponding special signals, code recognition gates, each of said code recognition gates being responsive to a particular one of said special signals for generating an activating signal, a logical control unit for furnishing start-stop signals for said drive mechanisms, circuit means connecting said activating signals to said logical control unit whereby predetermined start and stop signals are generated in response to combinations of said activating signals.

24. An information handling system for selectively rerecording units of information encoded on a first and second input tape in a predetermined sequence on at least one output tape, a separate drive mechanism for each of said tapes, each of said units of information being characterized by a plurality of information identifying characters arranged in groups, satellite information characters following said information identifying characters and special symbols, said special symbols including a start message symbol, item separator symbols each preceding a group of information identifying characters, an end message symbol and an end data symbol, said system comprising a first and second reading head adjacent the path of said first input tape for detecting information encoded thereon, a first and second reading head adjacent the path of said second input tape for detecting information encoded thereon, code recognition gates coupled to said first and second reading heads, each of said code recognition gates being responsive to a particular special symbol for generating an activating signal, selecting means coupled to said first reading heads and responsive to said start message activating signal and said item separator activating signals for selecting a predetermined group of said information identifying characters detected by said first reading head adjacent said first input tape and said first reading head adjacent said second input tape, a first memory unit coupled to said selecting means for storing said group of information identifying characters selected from said first input tape, a second memory unit for storing said group of information identifying characters selected from said second input tape, comparing means coupled to said first and second memory units for determining the relative order of precedence of said groups of information identifying characters and furnishing an appropriate output signal, a control means coupled to said comparing means and said code recognition gates and responsive to said output and activating signals for furnishing appropriate start-stop signals, transfer means including said drive mechanisms for said input and output tapes and responsive to said start-stop signals for transferring a unit of information detected by said second reading head of an input tape to an output tape.

25. The invention as claimed in claim 24 including circuit means to prevent a stop-signal for an input tape from being generated unless a start-message activating signal for the $(n+1)$th unit of information and the end-message activating signal for the $n$th unit of information are present, said circuit means comprising a two-input "and" gate having set inputs, reset inputs, and an output, delay means connecting the start message activating signal corresponding to the start message of the $(n+1)$th unit of information to one of the set inputs of said "and" gate, means connecting the end message activating signal corresponding to the $n$th unit of information detected by said second reading head to a second set input of said "and" gate, and means connecting a signal on the output of said "and" gate to the reset inputs.

26. The invention as claimed in claim 24 including circuit means for preventing a stop signal for an input tape from being generated before all the information identifying characters of the first unit of information have been detected by said first reading head, wherein said rerecording is carried out by one or more passes, each of said passes being initiated by a start pass signal, said circuit means comprising an "and" gate having two set inputs and reset inputs and a single output, means to connect said start pass signal to one input of said "and" gate, delay means connecting the start message activating signal corresponding to the start message symbol of the first unit of information detected by said first reading head to the second input of said "and" gate, said delay means having a predetermined delay interval corresponding to the time required for the information identifying characters of the first unit of information to pass beneath said first reading head, and means connecting a signal on the output of said "and" gate to the reset inputs.

27. The invention as claimed in claim 24 including circuit means for preventing the generation of start signals for said output tape until the information identifying characters of the first unit of information encoded on said first input tape have passed beneath that said first reading head adjacent thereto and the information identifying characters of the first unit of information encoded on said second input tape have passed beneath that said first reading head adjacent thereto wherein said recording is carried out by a number of passes initiated by a start pass signal, said circuit means including a gate having open, close, and signal inputs and an output, means connecting the start pass signal to the close input of said gate thereby blocking signals appearing at its signal inputs, means connecting the stop signal furnished to said second input tape to the open input of said gate thereby rendering the gate responsive to signals appearing at said signal inputs.

28. The invention as claimed in claim 24 including circuit means to regulate the spacing between successive units of information transferred to an output tape, said circuit means comprising an "and" gate having two set inputs, two reset inputs, and an output, a first delay means connecting the activating signal corresponding to the end message symbol of the $n$th unit of information detected by a second reading head to a first set input of said "and" gate, said first delay means delaying said end message activating signal for a time interval corresponding to the start-stop tolerance of an input tape, a second delay means connecting the activating signal corresponding to the start message symbol of the $(n+1)$th unit of information to the second set input of said "and" gate, said second delay means delaying said start-message activating signal for a time interval corresponding to that required for the information identifying characters of the $(n+1)$th unit of information to pass beneath the first reading head of an input tape plus the start-stop tolerance of said input tapes, and means connecting the ouput of said "and" gate to its reset inputs.

29. The invention as claimed in claim 24 including circuit means to transfer the end data symbol from one input tape to the output tapes, each of said tapes having a start-stop mechanism, said circuit means comprising an "and" gate having set inputs, reset inputs, and an output, means connecting the activating signal corresponding to the end data symbol detected by the first reading head adjacent said first input tape to a first set input, means connecting the activating signal corresponding to the end data symbol detected by the first reading head adjacent said second input tape to a second set input, a pair of gates having open, close, and signal inputs for furnishing a start signal to the start-stop mechanism of said output tapes, means connecting the output of said "and" gate to its reset inputs and to the respective open inputs of said pair of gates, and means including gating means connecting the output of said "and" gate to the start mechanism of said first input tape, means connecting the output of said gating means to the signal inputs of said pair of gates.

30. The invention as claimed in claim 24 including circuit means to stop the started tapes when the end-data symbol has been read by the second reading head adjacent said first input tape, said circuit means comprising a first and second two-input "and" gate for generating a stop signal for said input tape, means connecting the activating signal corresponding to the end data symbol detected by the second reading head adjacent said first input tape to both inputs of said first two-input gate and to one of the inputs of said second two-input gate, means connecting the output of said first two-input gate to the second input of said second two-input gate, means connecting the output of said second input gate to the start-stop mechanism of said input tape, a pair of output "and" gates each having a pair of inputs and an output, a third "and" gate having a pair of inputs and an output, means connecting the said end data activating signal to the input of said third "and" gate, means connecting the output of said third "and" gate to an input of each of said output "and" gates, a pair of flip-flops each having a set and reset input respectively connected to the outputs of said output "and" gates, means connecting said end data activating signal to the set input of each of said flip-flops and means connecting the output of said flip-flops to the respective second inputs of said output "and" gates, and means connecting the output of said output "and" gates to the respective drive mechanisms of said output tapes.

31. The invention as claimed in claim 24 including gating means responsive to the activating signal corresponding to the end-data symbol read by the second reading head adjacent said first input tape for generating a rewind signal for all tapes.

32. The invention as claimed in claim 24 including gating means responsive to said activating signal corresponding to the end-data symbol read by that said second reading head adjacent said first input tape to pass signals, means including separate detecting means adjacent the path of said output tapes for furnishing a rewind completed signal when all said output tapes are rewound, means connecting said rewind completed signal to said gating means, a first predetermined counting means coupled to said first input tape, a second predetermined counting means coupled to said second input tape, and means connecting the output signal of said gating means to advance said counting means one count for each signal received.

33. The invention as claimed in claim 24 including a start pass initiator circuit responsive to an input signal to generate a start pass signal and means connecting the rewind completed signal to said start-pass initiator circuit.

34. In an information handling machine for re-recording units of information encoded on input tapes on at least one output tape wherein said tapes are advanced in response to a start signal furnished to the start input of a respective tape drive mechanism, and said input and output tapes are selectively started in accordance with a start signal furnished by a logical control unit to a start input, a one step tester unit having first and second conditions of operation and comprising separate signal storing means for storing the respective start signals furnished by said logical control unit, said start signal being passed directly to one of said drive mechanisms in said first condition of operation, and said start signal being stored in one of said signal storing means in said second condition of operation, and test signal generating means operatively connected to said signal storing means for releasing the stored signal to start the corresponding tape and for returning said storing means to its initial condition.

35. The invention as claimed in claim 34 wherein each of said signal storing means comprises a flip-flop having a set and a reset input, an "and" gate having a first and second input, means connecting the set input of said flip-flop to a first input of said "and" gate, a pulse generating circuit common to each of said storing means for generating a test pulse, circuit means connecting said pulse generating circuit to the second input of each of said "and" gates, means connecting said pulse generating circuit to the reset input of each of said flip-flops, and means connecting the output of each of said "and" gates to the corresponding input of said tape drive mechanism.

36. The invention as claimed in claim 35 wherein said one step tester unit includes switch means having a test position and a run position, means connecting said switch means such that the second input of said "and" gate is primed for operation when the switch means is in said run position.

37. The invention as claimed in claim 36 wherein said one-step tester unit includes switch means having a test position and a run position and means connecting said switch means such that the second input of said "and" gate is primed when the switch means is in said run position, except for the duration of the start-pass signal.

References Cited in the file of this patent

UNITED STATES PATENTS

| | | |
|---|---|---|
| 2,588,049 | Rowley | Mar. 4, 1952 |
| 2,702,380 | Brustman et al. | Feb. 15, 1955 |

UNITED STATES PATENT OFFICE
CERTIFICATION OF CORRECTION

Patent No. 2,961,643 November 22, 1960

William R. Ayres et al.

It is hereby certified that error appears in the above numbered patent requiring correction and that the said Letters Patent should read as corrected below.

Column 1, line 15, for "handing" read -- handling --; column 2, line 16, for "symbod" read -- symbol --; column 7, line 11, for "Nmmber" read -- Number --; column 10, line 31, for "make" read -- made --; column 14, line 23, for "te" read -- the --; column 22, line 56, strike out "the", second occurrence; column 43, line 21, for "(7.1.4.A)" read -- (7.4.1.A) --; column 57, line 28, strike out "wherein"; column 65, lines 21 and 22, for "recording" read -- re-recording --.

Signed and sealed this 6th day of June 1961.

SEAL)
ttest:

RNEST W. SWIDER
ttesting Officer

DAVID L. LADD
Commissioner of Patents